US012283779B2

(12) United States Patent
Lee et al.

(10) Patent No.: US 12,283,779 B2
(45) Date of Patent: Apr. 22, 2025

(54) HIGH-SPEED CONNECTOR

(71) Applicant: Cheng Uei Precision Industry Co., LTD., New Taipei (TW)

(72) Inventors: Yun-Chien Lee, New Taipei (TW); Yi-Ching Hsu, New Taipei (TW); Pei-Yi Lin, New Taipei (TW); Yu-Hung Su, New Taipei (TW); Sheng-Yuan Huang, New Taipei (TW); Chun-Fu Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 391 days.

(21) Appl. No.: 17/894,538

(22) Filed: Aug. 24, 2022

(65) Prior Publication Data

US 2023/0144251 A1 May 11, 2023

(30) Foreign Application Priority Data

Nov. 10, 2021 (CN) ......................... 202111324968.6

(51) Int. Cl.

*H01R 13/6597* (2011.01)
*H01R 13/405* (2006.01)
*H01R 13/506* (2006.01)
*H01R 13/6471* (2011.01)
*H01R 13/6585* (2011.01)

(52) U.S. Cl.

CPC ....... *H01R 13/6597* (2013.01); *H01R 13/405* (2013.01); *H01R 13/506* (2013.01); *H01R 13/6471* (2013.01); *H01R 13/6585* (2013.01)

(58) Field of Classification Search

CPC .......................... H01R 2103/00; H01R 23/662
USPC ............................ 439/607.05, 108, 497, 579
See application file for complete search history.

(56) References Cited

U.S. PATENT DOCUMENTS

| | | | | |
|---|---|---|---|---|
| 7,824,197 | B1 * | 11/2010 | Westman | H01R 13/6586 439/607.07 |
| 2005/0075009 | A1 * | 4/2005 | Ko | H01R 13/6593 439/579 |
| 2012/0077380 | A1 * | 3/2012 | Minich | H01R 13/6589 439/607.05 |
| 2016/0336692 | A1 * | 11/2016 | Champion | H01R 13/6471 |
| 2017/0162984 | A1 * | 6/2017 | Liao | H01R 4/023 |
| 2018/0115117 | A1 * | 4/2018 | Yu | H01R 13/6585 |
| 2020/0212612 | A1 * | 7/2020 | Yang | H01R 12/775 |
| 2021/0210907 | A1 * | 7/2021 | Liu | H01R 13/646 |
| 2021/0399485 | A1 * | 12/2021 | Song | H01R 12/585 |

* cited by examiner

*Primary Examiner* — Gary F Paumen
(74) *Attorney, Agent, or Firm* — Cheng-Ju Chiang

(57) ABSTRACT

A high-speed connector includes an insulating housing, a first terminal assembly received in the insulating housing, a second terminal assembly received in the insulating housing, a third terminal assembly received in the insulating housing, and a fourth terminal assembly received in the insulating housing. The second terminal assembly is opposite to the first terminal assembly along an up-down direction. The third terminal assembly is disposed between the first terminal assembly and the second terminal assembly. The fourth terminal assembly is corresponding to the third terminal assembly. The fourth terminal assembly is disposed between the second terminal assembly and the third terminal assembly.

20 Claims, 24 Drawing Sheets

HIGH-SPEED CONNECTOR

CROSS-REFERENCE TO RELATED APPLICATION

The present application is based on, and claims priority from, China Patent Application No. 202111324968.6, filed Nov. 10, 2021, the disclosure of which is hereby incorporated by reference herein in its entirety.

BACKGROUND OF THE INVENTION

1. Field of the Invention

The present invention generally relates to a high-speed connector, and more particularly to a high-speed connector which is capable of adjusting a dielectric coefficient of a peripheral structure of a terminal of the high-speed connector to improve an electromagnetic characteristic and a crosstalk interference for improving transmission quality of a high-frequency signal of the high-speed connector.

2. The Related Art

Nowadays, a high-speed connector usually includes a grounding plate and a plurality of grounding terminals. The plurality of the grounding terminals are connected to the grounding plate for reducing an insertion loss and a crosstalk interference. The grounding plate has a main body, and a plurality of elastic arms extended from the main body. The main body is a sheet shape. The plurality of the elastic arms are mostly integrally stamped with the main body in forms of cantilever beams. However, a structural strength of the grounding plate is insufficient, and the grounding plate hardly shields differential signal terminals of the high-speed connector, so it is necessary to improve the grounding plate for enhancing the structural strength and an electromagnetic characteristic of the high-speed connector.

A conventional high-speed connector includes a housing, an insulating core inserted into the housing, a plurality of terminals fixed to the insulating core, a shielding structure and a transmission module. The plurality of the terminals include a plurality of first conductive terminals fixed to the insulating core, and a plurality of second conductive terminals fixed to the insulating core. The plurality of the first conductive terminals are arranged along a transverse direction. The plurality of the first conductive terminals include two differential signal terminals and two grounding terminals. The two grounding terminals are adjacent to two outer sides of the two differential signal terminals. The shielding structure has a dielectric base assembled to the housing, and a metallic plating layer plated to the dielectric base. The metallic plating layer contacts with the two grounding terminals to establish an electrical connection between the two grounding terminals. The metallic plating layer is positioned at the two outer sides of the two differential signal terminals, so the metallic plating layer shields the two differential signal terminals along the transverse direction.

However, the above-mentioned shielding structure of the high-speed connector is fully covered with the metallic plating layer to achieve a shielding function, the high-speed connector has following disadvantages. When a signal is radiated towards the metallic plating layer, and the signal contacts with the metallic plating layer, a signal reflection is generated and an oscillation is easily caused to generate many unnecessary resonance points. When the high-speed connector transmits higher speed signals, a high-frequency characteristic of the high-speed connector becomes poorer due to the unnecessary resonance points. When high-frequency signals are transmitted among adjacent terminals, a crosstalk interference of the high-speed connector is hardly avoided. Moreover, the above-mentioned shielding structure of the high-speed connector is fully covered with the metallic plating layer to make the high-frequency characteristic poorer, so a crosstalk effect is affected.

Thus, it is essential to provide an innovative high-speed connector which improves an electromagnetic characteristic and a crosstalk interference of the high-speed connector by adjusting a dielectric coefficient of a peripheral structure of a terminal of the high-speed connector, so transmission quality of a high-frequency signal of the high-speed connector is improved.

SUMMARY OF THE INVENTION

An object of the present invention is to provide a high-speed connector. The high-speed connector includes an insulating housing, a first terminal assembly received in the insulating housing, a second terminal assembly received in the insulating housing, a third terminal assembly received in the insulating housing, and a fourth terminal assembly received in the insulating housing. The second terminal assembly is opposite to the first terminal assembly along an up-down direction. The third terminal assembly is disposed between the first terminal assembly and the second terminal assembly. The fourth terminal assembly is corresponding to the third terminal assembly along the up-down direction. The fourth terminal assembly is disposed between the second terminal assembly and the third terminal assembly. The third terminal assembly and the fourth terminal assembly are positioned between the first terminal assembly and the second terminal assembly. Each of the first terminal assembly, the second terminal assembly, the third terminal assembly and the fourth terminal assembly includes a base body, a plurality of terminals and a metal plate, the plurality of the terminals include a plurality of grounding terminals and a plurality of differential signal terminals, a surface of the base body is recessed inward to form a fastening groove, the plurality of the terminals are fastened to the base body, the metal plate is fastened in the fastening groove, each terminal has a fastening portion, a contacting portion connected to a front end of the fastening portion, and a soldering portion connected to a rear end of the fastening portion, the base body surrounds the fastening portion of each terminal, the contacting portion of each terminal projects beyond a front surface of the base body, the soldering portion of each terminal is exposed to a rear of the base body, the fastening portions of the plurality of the grounding terminals and the differential signal terminals of two sides of each of the first terminal assembly, the second terminal assembly, the third terminal assembly and the fourth terminal assembly are exposed outside to the fastening groove, the metal plate electrically contacts with the fastening portions of the plurality of the grounding terminals of the two sides of each of the first terminal assembly, the second terminal assembly, the third terminal assembly and the fourth terminal assembly to form a grounding structure. Each of the third terminal assembly and the fourth terminal assembly includes a sheet structure, the sheet structure is made of a plastic material, the base body of each of the third terminal assembly and the fourth terminal assembly has a locating groove opposite to the fastening groove of each of the third terminal assembly and the fourth terminal assembly, the fastening portions of the plurality of the grounding terminals and the differential signal terminals of each of the third terminal assembly and the fourth terminal assembly are exposed to the locating groove of each of the third terminal assembly and the fourth terminal assembly, the sheet structure is located in the locating groove, the fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction, the fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly, the fastening portions of the grounding terminals of each of the third terminal assembly and the fourth terminal assembly contact with the inner surface of the sheet structure of each of the third terminal assembly and the fourth terminal assembly.

Another object of the present invention is to provide a high-speed connector. The high-speed connector includes an insulating housing, a first terminal assembly received in the insulating housing, a second terminal assembly received in the insulating housing, a third terminal assembly received in the insulating housing, and a fourth terminal assembly received in the insulating housing. The second terminal assembly is opposite to the first terminal assembly along an up-down direction. The third terminal assembly is disposed between the first terminal assembly and the second terminal assembly. The fourth terminal assembly is corresponding to the third terminal assembly along the up-down direction. The fourth terminal assembly is disposed between the second terminal assembly and the third terminal assembly. The fourth terminal assembly includes a metal structure. Each of the first terminal assembly, the second terminal assembly, the third terminal assembly and the fourth terminal assembly includes a base body, a plurality of terminals and a metal plate. The metal structure is disposed in a front of a rear end of the base body of the fourth terminal assembly. The plurality of the terminals include a plurality of grounding terminals and a plurality of differential signal terminals. A surface of the base body is recessed inward to form a fastening groove. The plurality of the terminals are fastened to the base body. The metal plate is fastened in the fastening groove. Each terminal has a fastening portion, a contacting portion connected to a front end of the fastening portion, and a soldering portion connected to a rear end of the fastening portion. The base body surrounds the fastening portion of each terminal. The contacting portion of each terminal projects beyond a front surface of the base body. The soldering portion of each terminal is exposed to a rear of the base body. The fastening portions of the plurality of the grounding terminals and the differential signal terminals of two sides of each of the first terminal assembly, the second terminal assembly, the third terminal assembly and the fourth terminal assembly are exposed outside to the fastening groove. The metal plate electrically contacts with the fastening portions of the plurality of the grounding terminals of the two sides of each of the first terminal assembly, the second terminal assembly, the third terminal assembly and the fourth terminal assembly to form a grounding structure. Front surfaces of rear ends of the grounding terminals of the plurality of the terminals of the two sides of the fourth terminal assembly are exposed to the front of the rear end of the base body of the fourth terminal assembly. The metal structure contacts with front surfaces of rear ends of the grounding terminals of the plurality of the terminals of two sides of the fourth terminal assembly to form the grounding structure. Each of the third terminal assembly and the fourth terminal assembly includes a sheet structure. The sheet structure is made of a plastic material. The base body of each of the third terminal assembly and the fourth terminal assembly has a locating groove opposite to the fastening groove of each of the third terminal assembly and the fourth terminal assembly. The fastening portions of the plurality of the grounding terminals and the differential signal terminals of each of the third terminal assembly and the fourth terminal assembly are exposed to the locating groove of each of the third terminal assembly and the fourth terminal assembly. The sheet structure is located in the locating groove. The fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction. The fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly. The fastening portions of the grounding terminals of each of the third terminal assembly and the fourth terminal assembly contact with the inner surface of the sheet structure of each of the third terminal assembly and the fourth terminal assembly.

Another object of the present invention is to provide a high-speed connector. The high-speed connector includes an insulating housing, a first terminal assembly received in the insulating housing, a second terminal assembly received in the insulating housing, a third terminal assembly received in the insulating housing, and a fourth terminal assembly received in the insulating housing. The second terminal assembly is opposite to the first terminal assembly along an up-down direction. The third terminal assembly is disposed between the first terminal assembly and the second terminal assembly. The fourth terminal assembly is corresponding to the third terminal assembly along the up-down direction. The third terminal assembly and the fourth terminal assembly are positioned between the first terminal assembly and the second terminal assembly. The fourth terminal assembly includes a blocking element. Each of the first terminal assembly, the second terminal assembly, the third terminal assembly and the fourth terminal assembly includes a base body, a plurality of terminals and a metal plate. The plurality of the terminals include a plurality of grounding terminals and a plurality of differential signal terminals. The blocking element is disposed in a front of a rear end of the base body of the fourth terminal assembly. A surface of the base body is recessed inward to form a fastening groove. The plurality of the terminals are fastened to the base body. The metal plate is fastened in the fastening groove. Each terminal has a fastening portion, a contacting portion connected to a front end of the fastening portion, and a soldering portion connected to a rear end of the fastening portion. The base body surrounds the fastening portion of each terminal. The contacting portion of each terminal projects beyond a front surface of the base body. The soldering portion of each terminal is exposed to a rear of the base body. The fastening portions of the plurality of the grounding terminals and the differential signal terminals of two sides of each of the first terminal assembly, the second terminal assembly, the third terminal assembly and the fourth terminal assembly are exposed outside to the fastening groove. The metal plate electrically contacts with the fastening portions of the plurality of the grounding terminals of the two sides of each of the first terminal assembly, the second terminal assembly, the third terminal assembly and the fourth terminal assembly to form a grounding structure. Front surfaces of rear ends of the grounding terminals of the plurality of the terminals of two sides of the fourth terminal assembly are exposed to the front of the rear end of the base body of the fourth terminal assembly. Each of the third terminal assembly and the fourth terminal assembly includes a sheet structure. The sheet structure is made of a plastic material. The base body of each of the third terminal assembly and the fourth terminal assembly has a locating groove opposite to the fastening groove of each of the third terminal assembly and the fourth terminal assembly. The fastening portions of the plurality of the grounding terminals and the differential signal terminals of each of the third terminal assembly and the fourth terminal assembly are exposed to the locating groove of each of the third terminal assembly and the fourth terminal assembly. The sheet structure is located in the locating groove. The fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction. The fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly. The fastening portions of the grounding terminals of each of the third terminal assembly and the fourth terminal assembly contact with the inner surface of the sheet structure of each of the third terminal assembly and the fourth terminal assembly. The front surfaces of the rear ends of each two differential signal terminals of the two sides of the fourth terminal assembly are spaced from an inner surface of the blocking element to form an interstice.

As described above, a first metal plate of the first terminal assembly contacts with first grounding terminals of the first terminal assembly to form the grounding structure, a second metal plate of the second terminal assembly contacts with second grounding terminals of the second terminal assembly to form the grounding structure, a third metal plate of the third terminal assembly contacts with third grounding terminals of the third terminal assembly to form the grounding structure, and a fourth metal plate contacts with fourth grounding terminals of the fourth terminal assembly to form the grounding structure, so a signal noise is able to be effectively absorbed and the signal noise is able to be effectively restrained. Furthermore, the high-speed connector is capable of adjusting a dielectric coefficient of a peripheral structure of the terminal of the high-speed connector, a first internal space and a plurality of first gaps of a first dielectric structure, a second internal space and a plurality of second gaps of a second dielectric structure, a third internal space and a plurality of first clearances of a first sheet structure, and a fourth internal space and a plurality of second clearances of a second sheet structure are used for adjusting a dielectric coefficient of a peripheral structure of each first terminal of the first terminal assembly to improve an electromagnetic characteristic and a crosstalk interference of the high-speed connector. As a result, transmission quality of a high-frequency signal of the high-speed connector is improved.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
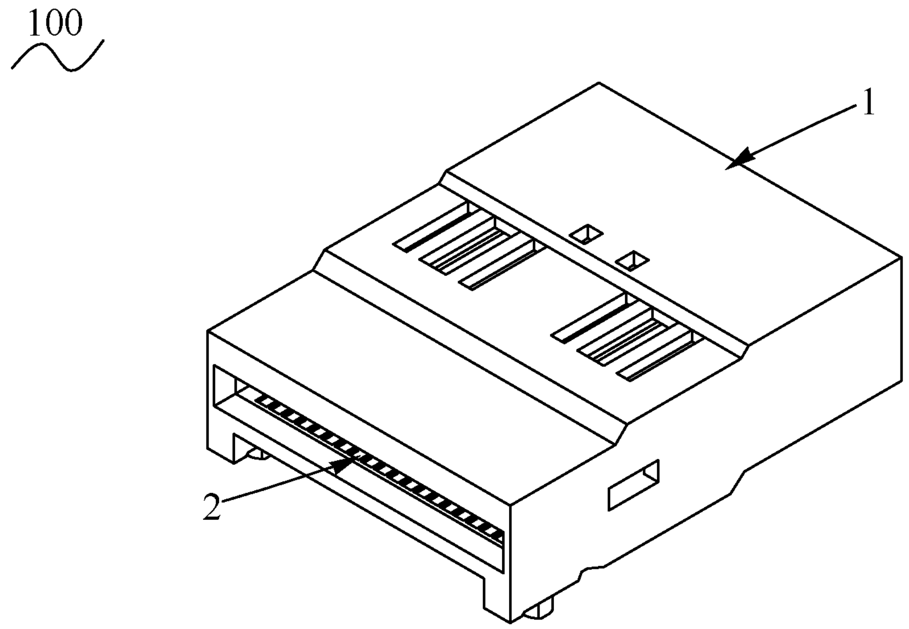
FIG. 1 is a perspective view of a high-speed connector in accordance with a first preferred embodiment of the present invention.
Figure 2:
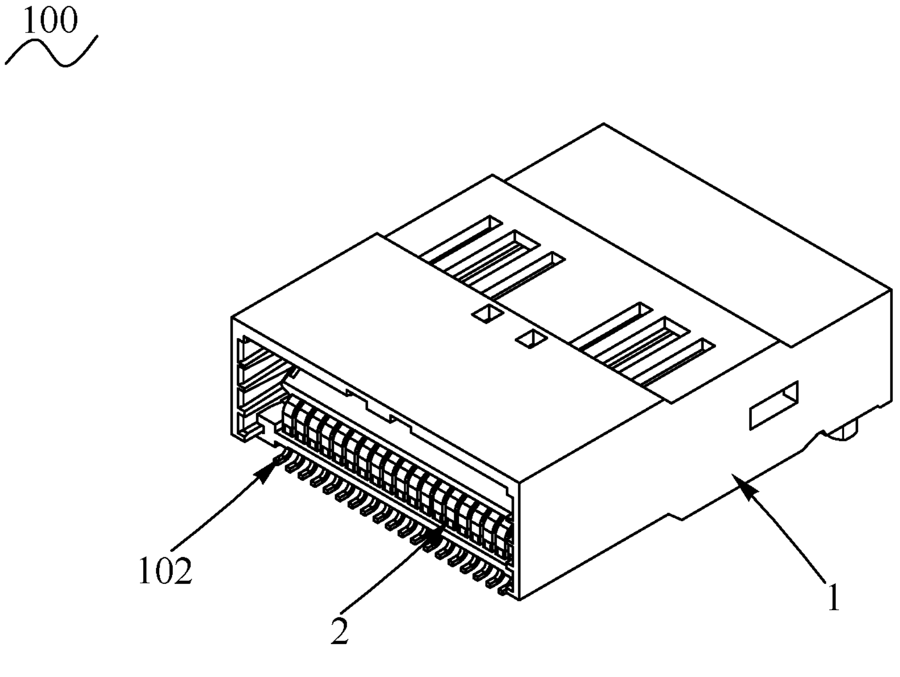
FIG. 2 is another perspective view of the high-speed connector of FIG. 1.

With reference to FIG. 1 and FIG. 2, a high-speed connector 100 in accordance with a first preferred embodiment of the present invention is shown. The high-speed connector 100 includes an insulating housing 1 and a terminal module 2. The terminal module 2 is disposed in the insulating housing 1.

Figure 3:
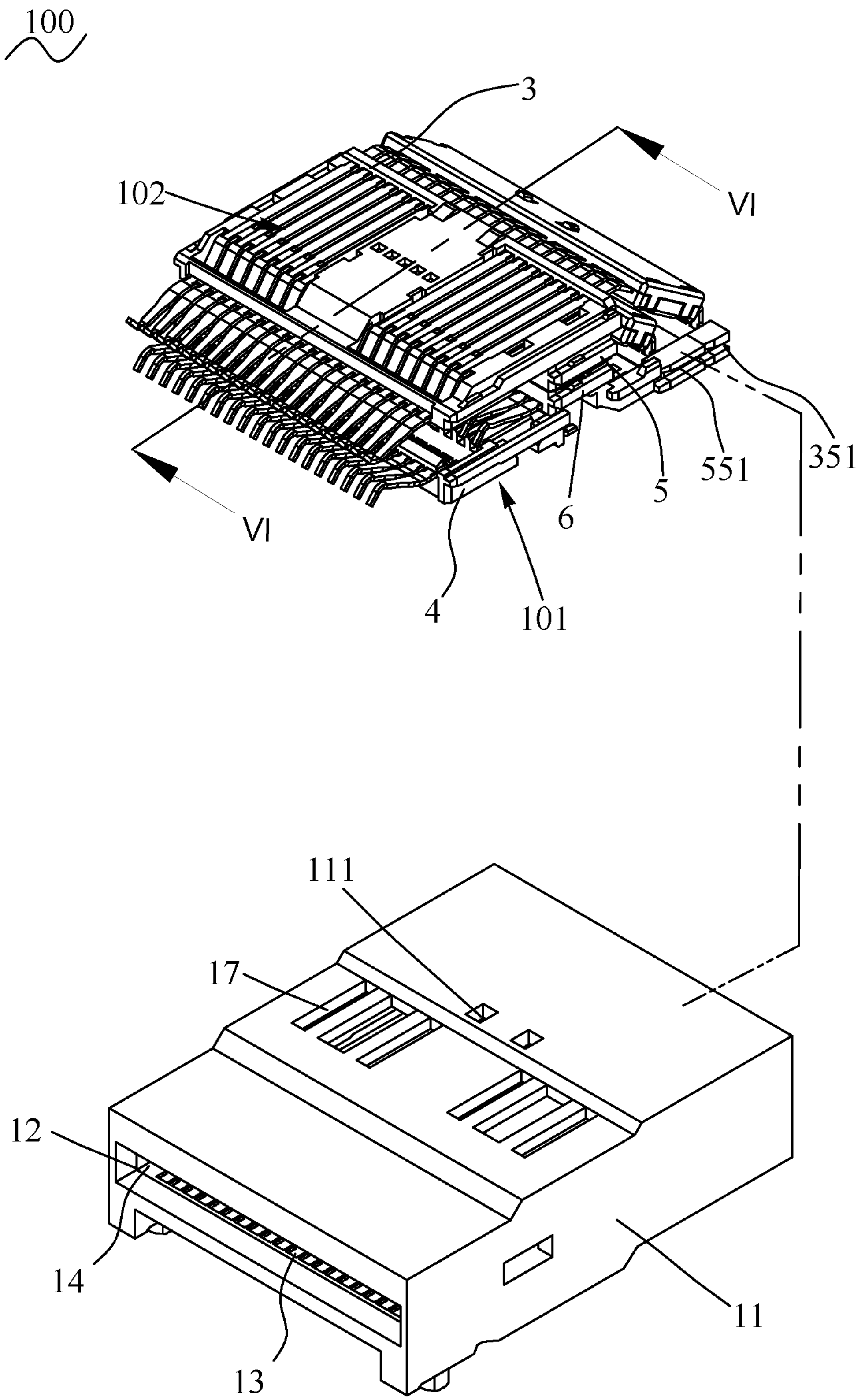
FIG. 3 is a partially exploded view of the high-speed connector of FIG. 1.
Figure 4:
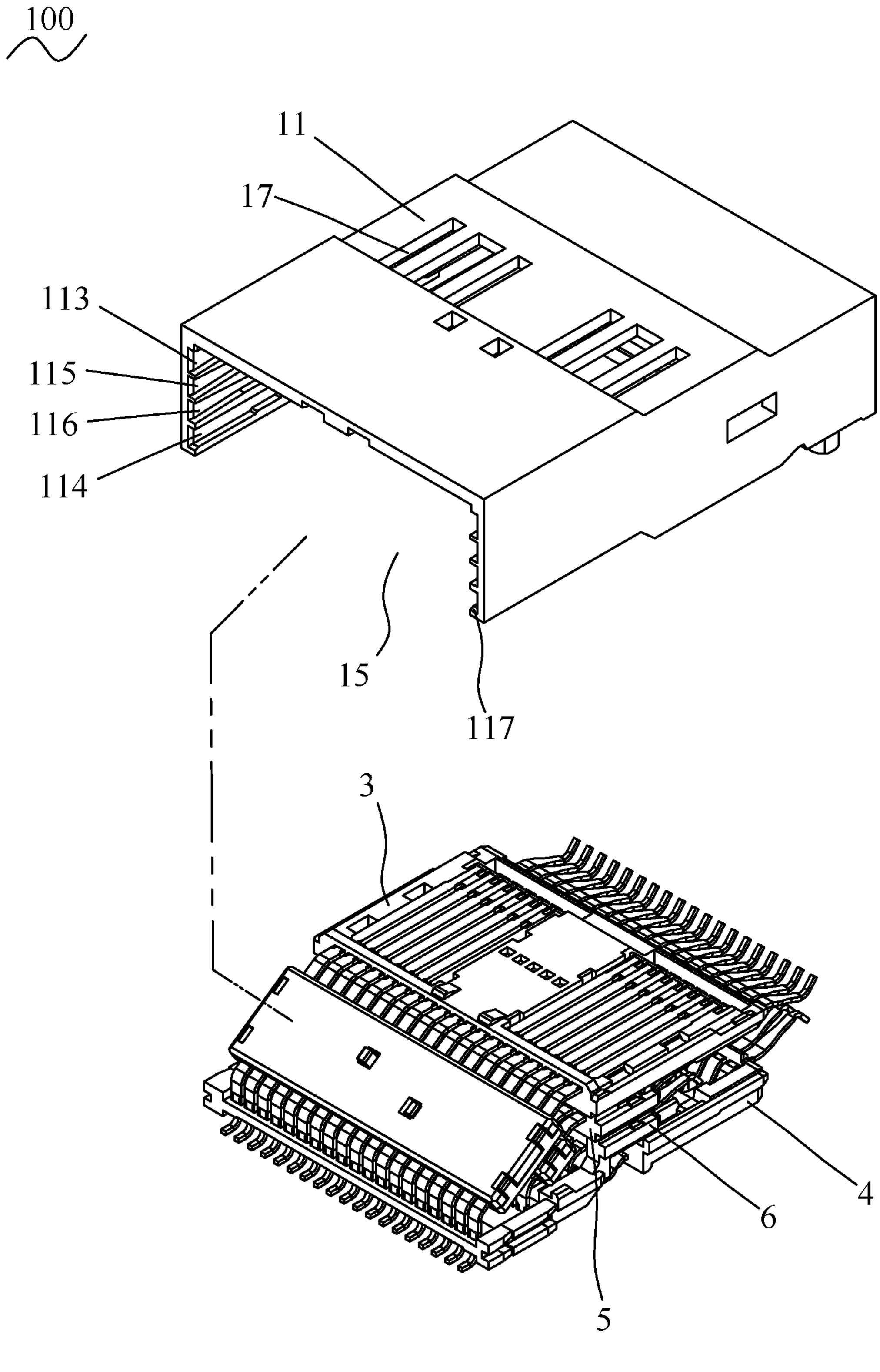
FIG. 4 is another partially exploded view of the high-speed connector of FIG. 3.
Figure 5:
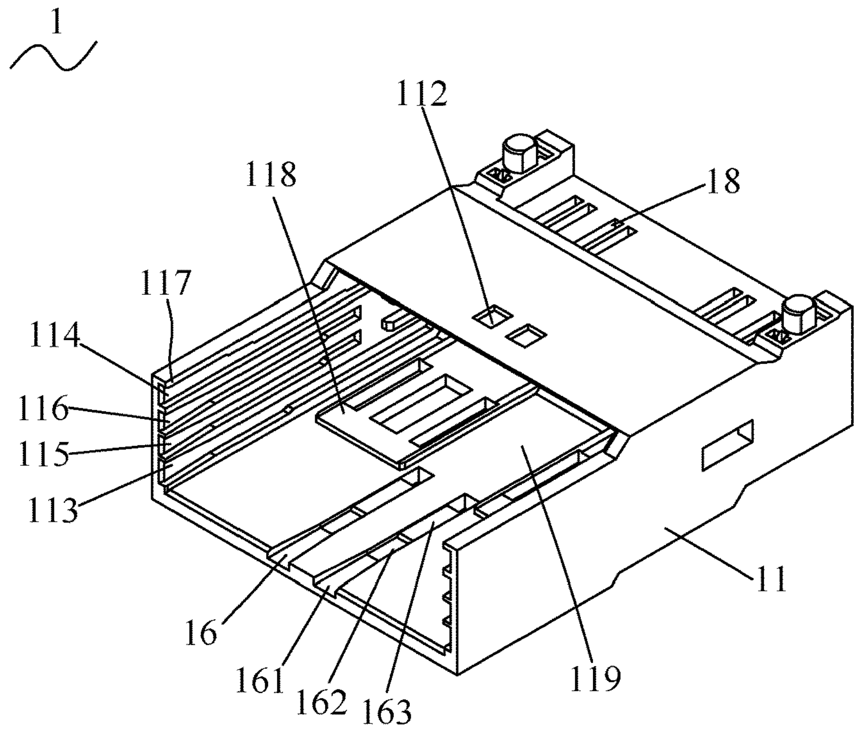
FIG. 5 is a perspective view of an insulating housing of the high-speed connector of FIG. 3.
Figure 6:
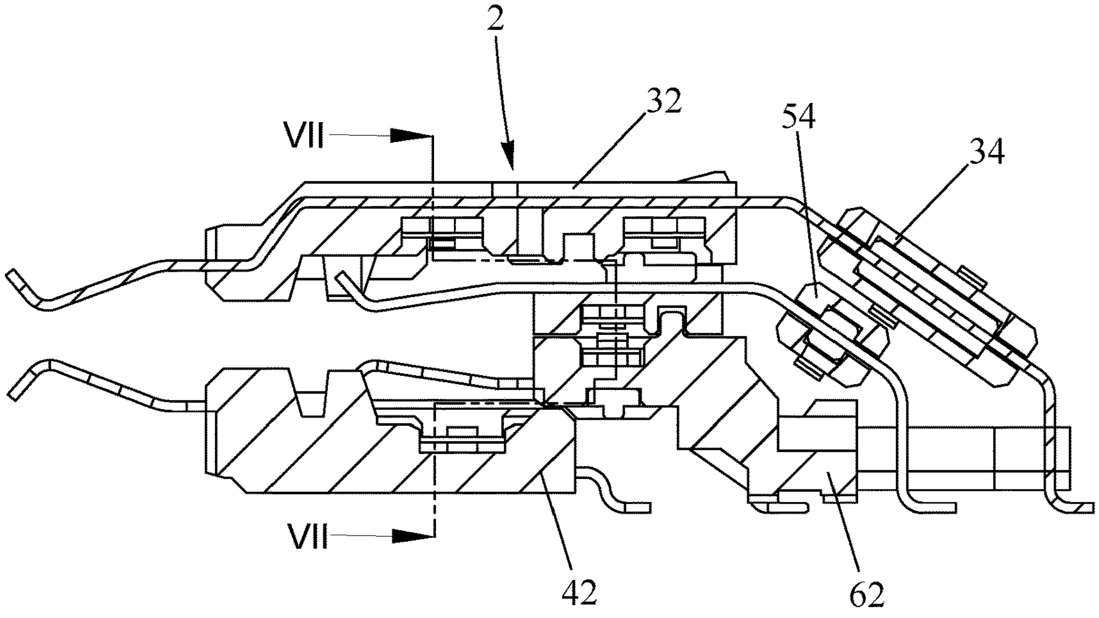
FIG. 6 is a sectional view of the high-speed connector along a line VI-VI of FIG. 3.

Referring to FIG. 3 to FIG. 5, the insulating housing 1 has a main portion 11, an accommodating space 12, a plurality of first terminal slots 13, an insertion groove 14 and an assembling groove 15. An inside of the main portion 11 defines the accommodating space 12. The accommodating space 12 penetrates through a rear end of a bottom surface of the main portion 11. Several portions of a front of the inside of the main portion 11 are recessed inward to form the plurality of the first terminal slots 13. Two fronts of an upper inner wall and a lower inner wall of the accommodating space 12 of the main portion 11 are recessed inward to form the plurality of the first terminal slots 13. The plurality of the first terminal slots 13 are arranged in an upper row and a lower row. Several portions of an upper portion of the front of the inside of the main portion 11 are recessed inward to form the upper row of the first terminal slots 13 penetrating through a bottom surface of the upper portion of the front of the inside of the main portion 11. Several portions of a lower portion of the front of the inside of the main portion 11 are recessed inward to form the lower row of the first terminal slots 13 penetrating through a top surface of the lower portion of the front of the inside of the main portion 11. The plurality of the first terminal slots 13 are located in front of the accommodating space 12. The plurality of the first terminal slots 13 are communicated with the accommodating space 12.

A middle of a front end of the main portion 11 defines the insertion groove 14. The insertion groove 14 longitudinally penetrates through the front end of the main portion 11. The insertion groove 14 is communicated with the plurality of the first terminal slots 13. The insertion groove 14 is positioned between the upper row of the first terminal slots 13 and the lower row of the first terminal slots 13. The insertion groove 14 is communicated between the upper row of the first terminal slots 13 and the lower row of the first terminal slots 13. A rear end of the main portion 11 defines the assembling groove 15 penetrating through a rear surface of the main portion 11. The insertion groove 14 is located in front of the accommodating space 12. The insertion groove 14 is communicated with the accommodating space 12. The assembling groove 15 is located behind the accommodating space 12. The assembling groove 15 is communicated with the accommodating space 12.

Referring to FIG. 3 to FIG. 6, the terminal module 2 is inserted into the accommodating space 12 from the assembling groove 15 of the insulating housing 1. The terminal module 2 includes a first terminal assembly 3, a second terminal assembly 4, a third terminal assembly 5 and a fourth terminal assembly 6 which are mounted in the insulating housing 1. In a concrete implementation, the terminal module 2 is without being limited to include the first terminal assembly 3, the second terminal assembly 4, the third terminal assembly 5 and the fourth terminal assembly 6. The second terminal assembly 4 is corresponding to the first terminal assembly 3 along an up-down direction. The fourth terminal assembly 6 is corresponding to the third terminal assembly 5 along the up-down direction.

The first terminal assembly 3 is received in the insulating housing 1. The second terminal assembly 4 is received in the insulating housing 1. The second terminal assembly 4 is opposite to the first terminal assembly 3 along the up-down direction. The third terminal assembly 5 is received in the insulating housing 1. The third terminal assembly 5 is disposed between the first terminal assembly 3 and the second terminal assembly 4. The fourth terminal assembly 6 is received in the insulating housing 1. The fourth terminal assembly 6 is disposed between the second terminal assembly 4 and the third terminal assembly 5. The third terminal assembly 5 and the fourth terminal assembly 6 are positioned between the first terminal assembly 3 and the second terminal assembly 4.

In the first preferred embodiment, the first terminal assembly 3 and the second terminal assembly 4 form a QSFP (Quad Small Form-Factor Pluggable) terminal assembly. The third terminal assembly 5 and the fourth terminal assembly 6 form another QSFP terminal assembly. In the concrete implementation, the high-speed connector 100 includes the first terminal assembly 3, the second terminal assembly 4, the third terminal assembly 5 and the fourth terminal assembly 6 to form a QSFP-DD (Quad Small Form Factor Pluggable-Double Density) high-speed connector.

The high-speed connector 100 is able to include the first terminal assembly 3 and the second terminal assembly 4 to form the QSFP high-speed connector. The high-speed connector 100 is also able to include the third terminal assembly 5 and the fourth terminal assembly 6 to form the QSFP high-speed connector.

A top of the main portion 11 of the insulating housing 1 has at least one first aperture 111 vertically penetrating through the top of the main portion 11. In the first preferred embodiment, the top of the main portion 11 of the insulating housing 1 has two first apertures 111 arranged transversely. The two first apertures 111 vertically penetrate through the top of the main portion 11. A corresponding mechanism of the first terminal assembly 3 is fastened in the at least one first aperture 111 of the insulating housing 1, so that the first terminal assembly 3 is located to the insulating housing 1, and the first terminal assembly 3 is fastened to the insulating housing 1. A bottom of the main portion 11 of the insulating housing 1 has at least one second aperture 112 vertically penetrating through the bottom of the main portion 11. In the first preferred embodiment, the bottom of the main portion 11 of the insulating housing 1 has two second apertures 112 arranged transversely. The two second apertures 112 vertically penetrate through the bottom of the main portion 11. A corresponding mechanism of the second terminal assembly 4 is fastened in the at least one second aperture 112 of the insulating housing 1, so that the second terminal assembly 4 is located to the insulating housing 1, and the second terminal assembly 4 is fastened to the insulating housing 1.

Two upper portions of two opposite inner side surfaces of the rear end of the main portion 11 are recessed oppositely to form two first locating slots 113. Two upper portions of two rears of two inner side walls of the accommodating space 12 of the main portion 11 are recessed oppositely to form the two first locating slots 113. Two lower portions of the two opposite inner side surfaces of the rear end of the main portion 11 are recessed oppositely to form two second locating slots 114. Two lower portions of the two rears of the two inner side walls of the accommodating space 12 of the main portion 11 are recessed oppositely to form the two second locating slots 114. Two tops of two middle portions of the two opposite inner side surfaces of the rear end of the main portion 11 are recessed oppositely to form two third locating slots 115. Two bottoms of the two middle portions of the two opposite inner side surfaces of the rear end of the main portion 11 are recessed oppositely to form two fourth locating slots 116. Two tops of two middle portions of the two rears of the two inner side walls of the accommodating space 12 of the main portion 11 are recessed oppositely to form the two third locating slots 115, and two bottoms of the two middle portions of the two rears of the two inner side walls of the accommodating space 12 of the main portion 11 are recessed oppositely to form the two fourth locating slots 116. The two third locating slots 115 are above the two fourth locating slots 116. Corresponding areas of the first terminal assembly 3, the second terminal assembly 4, the third terminal assembly 5 and the fourth terminal assembly 6 of the terminal module 2 are buckled to the two first locating slots 113, the two second locating slots 114, the two third locating slots 115 and the two fourth locating slots 116 of the insulating housing 1, so that the terminal module 2 is located to the insulating housing 1, and the terminal module 2 is fastened to the insulating housing 1.

Two corresponding side areas of the first terminal assembly 3 are buckled with the two first locating slots 113 and the two second locating slots 114 of the insulating housing 1, so that the first terminal assembly 3 is located to the insulating housing 1, and the first terminal assembly 3 is fastened to the insulating housing 1. Two corresponding side areas of the second terminal assembly 4 and the two second locating slots 114 of the insulating housing 1 are mutually buckled to each other, so that the second terminal assembly 4 is located to the insulating housing 1, and the second terminal assembly 4 is fastened to the insulating housing 1. Two corresponding side areas of the third terminal assembly 5 are buckled with the two second locating slots 114 and the two third locating slots 115 of the insulating housing 1, so the third terminal assembly 5 is located to the insulating housing 1, and the third terminal assembly 5 is fastened to the insulating housing 1. Two corresponding side areas of the fourth terminal assembly 6 are buckled with the two second locating slots 114 and the two fourth locating slots 116 of the insulating housing 1, so that the fourth terminal assembly 6 is located to the insulating housing 1, and the fourth terminal assembly 6 is fastened to the insulating housing 1.

The two first locating slots 113, the two third locating slots 115, the two fourth locating slots 116 and the two second locating slots 114 are sequentially disposed along the up-down direction. The two lower portions of the two opposite inner side surfaces of the rear end of the main portion 11 extend towards each other to from two protruding ribs 117. The two protruding ribs 117 are defined as two lower walls of the two second locating slots 114. Two outer surfaces of two rears of the two corresponding side areas of the first terminal assembly 3 are recessed inward to form two first clamping slots 351. Two outer surfaces of two rears of the two corresponding side areas of the third terminal assembly 5 are recessed inward to form two second clamping slots 551. Two rear ends of the two protruding ribs 117 are clamped in the two first clamping slots 351 and the two second clamping slots 551, so that the first terminal assembly 3 and the third terminal assembly 5 are located to the insulating housing 1, and the first terminal assembly 3 and the third terminal assembly 5 are fastened to the insulating housing 1.

Two sides of an inner surface of the top of the main portion 11 of insulating housing 1 extend downward to form two convex surfaces 118. A quantity of the convex surfaces 118 of the insulating housing 1 is the same as a quantity of corresponding portions of two sides of a top of the first terminal assembly 3. The inner surface of the top of the main portion 11 of the insulating housing 1 has a concave surface 119. The two convex surfaces 118 are corresponding to two side positions of the top of the first terminal assembly 3. The concave surface 119 is formed between the two convex surfaces 118. The concave surface 119 is corresponding to a middle position of the top of the first terminal assembly 3.

At least one portion of a middle of the inner surface of the top of the main portion 11 of the insulating housing 1 is recessed inward to form at least one sliding groove 16. The at least one first aperture 111 is disposed in front of the at least one sliding groove 16. The at least one sliding groove 16 extends longitudinally. The at least one first aperture 111 is longitudinally aligned with the at least one sliding groove 16. The concave surface 119 is disposed among the at least one sliding groove 16 and the two convex surfaces 118. In the first preferred embodiment, two portions of the middle of the inner surface of the top of the main portion 11 of the insulating housing 1 are recessed inward to form two abreast sliding grooves 16. At least one corresponding section of a top of the terminal module 2 passes through the at least one sliding groove 16, and then the at least one corresponding section of the top of the terminal module 2 is fastened in the at least one first aperture 111 of the insulating housing 1, so that the terminal module 2 is located to the insulating housing 1, and the terminal module 2 is fastened to the insulating housing 1. Specifically, two corresponding sections of the top of the terminal module 2 pass through the two sliding grooves 16, and the two corresponding sections of the top of the terminal module 2 are fastened in the two first apertures 111 of the insulating housing 1, so that the terminal module 2 is located to the insulating housing 1, and the terminal module 2 is fastened to the insulating housing 1.

Each first aperture 111 is disposed in front of one sliding groove 16. Each sliding groove 16 extends longitudinally. Each first aperture 111 is longitudinally aligned with the one sliding groove 16. A rear end of each sliding groove 16 is connected with the assembling groove 15. The rear end of each sliding groove 16 is communicated with the assembling groove 15. A front end of each sliding groove 16 is connected with one first aperture 111. The front end of each sliding groove 16 is communicated with the one first aperture 111. A top surface of a top wall of each sliding groove 16 has an inclining zone 161, a buffering zone 162 and a stopping zone 163 sequentially arranged along a rear-to-front direction. A rear end of the top surface of the top wall of each sliding groove 16 slantwise extends frontward and downward to form the inclining zone 161. A front end of the inclining zone 161 horizontally extends frontward to form the buffering zone 162. A front end of the buffering zone 162 protrudes downward, and then horizontally extends frontward and towards the one first aperture 111 to form the stopping zone 163. A top surface of the inclining zone 161 is an inclined plane. A top surface of the buffering zone 162 is a flat plane. A top surface of the stopping zone 163 is another flat plane. The top surface of the stopping zone 163 and the top surface of the buffering zone 162 form a segment difference, so that a horizontal height of the top surface of the stopping zone 163 is lower than a horizontal height of the top surface of the buffering zone 162. The concave surface 119 is disposed among the two sliding grooves 16 and the two convex surfaces 118.

When the terminal module 2 is inserted into the accommodating space 12 from the assembling groove 15, each corresponding section of the top of the terminal module 2 enters the buffering zone 162 along the inclining zone 161 of the one sliding groove 16, each corresponding section of the top of the terminal module 2 slides along the buffering zone 162 of the one sliding groove 16, and then each corresponding section of the top of the terminal module 2 passes through the stopping zone 163 of the one sliding groove 16. Finally, each corresponding section of the top of the terminal module 2 is buckled to the one first aperture 111. The two inclining zones 161 of the two sliding grooves 16 guide the two corresponding sections of the top of the terminal module 2 to enter the two sliding grooves 16. The two inclining zones 161 of the two sliding grooves 16 prevent the two corresponding sections of the top of the terminal module 2 from being bruised. The two stopping zones 163 of the two sliding grooves 16 abut against the two corresponding sections of the top of the terminal module 2 to prevent the terminal module 2 from being slid out of the accommodating space 12.

A middle of the top of the main portion 11 forms a plurality of first penetrating grooves 17 arranged transversely. Each first penetrating groove 17 penetrates through the top of the main portion 11 and extends longitudinally. The plurality of the first penetrating grooves 17 are used for regulating an electrical characteristic of the first terminal assembly 3 of the high-speed connector 100, so that the high-speed connector 100 has a high-frequency signal stability. Positions of the plurality of the first penetrating grooves 17 are corresponding to upper positions of terminals 102 of the first terminal assembly 3 of the terminal module 2. A front end of the bottom of the main portion 11 form a plurality of second penetrating grooves 18 arranged transversely. Each second penetrating groove 18 penetrates through the bottom of the main portion 11 and extends longitudinally. The plurality of the second penetrating grooves 18 are used for regulating an electrical characteristic of the second terminal assembly 4 of the high-speed connector 100, so that the high-speed connector 100 has the high-frequency signal stability. Positions of the plurality of the second penetrating grooves 18 are corresponding to lower positions of the terminals 102 of the second terminal assembly 4 of the terminal module 2.

Referring to FIG. 8 to FIG. 11, the first terminal assembly 3 includes a first base body 32, a plurality of first terminals 31, a first metal plate 33, a first dielectric structure 34 and a first holding element 35. The plurality of the first terminals 31 are fastened to the first base body 32. The plurality of the first terminals 31 are partially surrounded by the first base body 32. Middles of the plurality of the first terminals 31 are surrounded by the first base body 32. The first metal plate 33 is disposed in the first base body 32, and the first metal plate 33 is disposed under the plurality of the first terminals 31. The first dielectric structure 34 is disposed to rear ends of the plurality of the first terminals 31. The rear ends of the plurality of the first terminals 31 are surrounded by the first dielectric structure 34. The first dielectric structure 34 is used for adjusting a dielectric coefficient of a peripheral structure of each first terminal 31 to improve a crosstalk interference of the high-speed connector 100. Lower portions of the plurality of the first terminals 31 are surrounded by the first holding element 35.

Each first terminal 31 has a first fastening portion 311, a first stepping portion 312, a first contacting portion 313, a first extending portion 314, a first bending portion 315, and a first soldering portion 316. The plurality of the first terminals 31 include a plurality of first grounding terminals 317 and a plurality of first differential signal terminals 318. Each first differential signal terminal 318 is used for transmitting a signal. In the first preferred embodiment, the plurality of the first terminals 31 includes seven first grounding terminals 317 and twelve first differential signal terminals 318. Each two adjacent first differential signal terminals 318 are located between two first grounding terminals 317. The first fastening portion 311 of one first grounding terminal 317 and the first fastening portions 311 of four first differential signal terminals 318 are surrounded by a middle of the first base body 32.

The first fastening portions 311 of the plurality of the first terminals 31 which are located at two sides of the first base body 32 of the first terminal assembly 3 are corresponding to the positions of the plurality of the first penetrating grooves 17 of the main portion 11 of the insulating housing 1. The front end of the first fastening portion 311 slantwise extends frontward and downward to form the first stepping portion 312. A front end of the first stepping portion 312 extends frontward and then is arched downward to form the first contacting portion 313. The first stepping portions 312 and rear ends of the first contacting portions 313 of the first terminals 31 of two sides of the first terminal assembly 3 are exposed to two sides of a front end of the first base body 32. A front end of the first contacting portion 313 of each first terminal 31 projects beyond a front surface of the first base body 32. The first contacting portions 313 of the plurality of the first terminals 31 are disposed in the upper row of the first terminal slots 13. Bottom surfaces of the first contacting portions 313 of the plurality of the first terminals 31 are exposed out of the upper row of the first terminal slots 13, and the bottom surfaces of the first contacting portions 313 of the plurality of the first terminals 31 project into the insertion groove 14.

A rear end of the first fastening portion 311 slantwise extends rearward and downward to form the first extending portion 314. A rear end of the first extending portion 314 is bent downward to form the first bending portion 315. A bottom end of the first bending portion 315 is bent rearward to form the first soldering portion 316. The rear end of the first fastening portion 311, the first extending portion 314, the first bending portion 315 and the first soldering portion 316 of each first terminal 31 project beyond a rear surface of the first base body 32. The first dielectric structure 34 is fastened to the first extending portions 314 of the plurality of the first terminals 31. Tail ends of the first bending portions 315 of the plurality of the first terminals 31 are surrounded by the first holding element 35. Two opposite sides of the front end of each first fastening portion 311, two opposite sides of the rear end of each first fastening portion 311 and two opposite sides of the rear end of each first contacting portion 313 are recessed inward to form a plurality of first lacking grooves 319. Corresponding formations of the first base body 32 are engaged with the first lacking grooves 319 of the plurality of the first terminals 31 by a plastic injection molding technology.

The first fastening portions 311, the first stepping portions 312 and the rear ends of the first contacting portions 313 of the first terminals 31 of a middle of the first terminal assembly 3 are surrounded by the middle of the first base body 32. The first base body 32 has a first surrounding portion 320, at least one first protruding block 321, a plurality of first protruding portions 322, a first fastening groove 323, a plurality of first openings 324, a plurality of first contact surfaces 325, a first location hole 326, a plurality of first restricting holes 327 and a plurality of first connecting portions 328.

In the first preferred embodiment, the first base body 32 has two first protruding blocks 321, two first protruding portions 322, the first fastening groove 323, four first openings 324, the plurality of the first contact surfaces 325, the first location hole 326, the plurality of the first restricting holes 327 and the plurality of the first connecting portions 328. The first surrounding portion 320 is disposed to the middle of the first base body 32, and the first surrounding portion 320 is connected between the front end of the first base body 32 and a rear end of the first base body 32. The first fastening portion 311 of the one first grounding terminal 317 and the first fastening portions 311 of the four first differential signal terminals 318 are surrounded by the first surrounding portion 320. The first surrounding portion 320 of the first base body 32 of the first terminal assembly 3 is corresponding to the concave surface 119 of the insulating housing 1.

At least one portion of a rear end of a top surface of the first surrounding portion 320 of the first base body 32 protrudes upward to form the at least one first protruding block 321. In the first preferred embodiment, two sides of the rear end of the top surface of the first surrounding portion 320 of the first base body 32 protrude upward to form the two first protruding blocks 321. A quantity of the at least one first protruding block 321 of the first base body 32 is the same as a quantity of the at least one first aperture 111 of the insulating housing 1. After each first protruding block 321 passes through the one sliding groove 16, each first protruding block 321 is fastened in the one first aperture 111 of the insulating housing 1, so that the first terminal assembly 3 is located to the insulating housing 1, and the first terminal assembly 3 is fastened to the insulating housing 1.

When the terminal module 2 is inserted into the accommodating space 12 from the assembling groove 15, each first protruding block 321 of the first base body 32 of the terminal module 2 enters the buffering zone 162 along the inclining zone 161 of the one sliding groove 16, each first protruding block 321 of the first base body 32 of the terminal module 2 slides along the buffering zone 162 of the one sliding groove 16, and then each first protruding block 321 of the first base body 32 of the terminal module 2 passes through the stopping zone 163 of the one sliding groove 16. Finally, each first protruding block 321 of the first base body 32 of the terminal module 2 is buckled to the one first aperture 111. The two inclining zones 161 of the two sliding grooves 16 guide the two first protruding blocks 321 of the first terminal assembly 3 of the terminal module 2 to enter the two sliding grooves 16. The two inclining zones 161 of the two sliding grooves 16 prevent the two first protruding blocks 321 of the first terminal assembly 3 of the terminal module 2 from being bruised. The two stopping zones 163 of the two sliding grooves 16 abut against the two first protruding blocks 321 of the first terminal assembly 3 of the terminal module 2 to prevent the first terminal assembly 3 of the terminal module 2 from being slid out of the accommodating space 12.

In the first preferred embodiment, two opposite sides of the first base body 32 extend outward to form the two first protruding portions 322. A middle of a bottom surface of the rear end of the first base body 32 is recessed inward to form the first fastening groove 323. The front end of the first base body 32 has two first openings 324, and the rear end of the first base body 32 has the other two first openings 324. The two first openings 324 of the front end of the first base body 32 penetrate through two sides of a top surface and two sides of a bottom surface of the front end of the first base body 32. Two tops of two sides of the first fastening groove 323 extend upward to form the other two first openings 324 penetrating through two sides of a top surface of the rear end of the first base body 32. A front end of the first surrounding portion 320 is located between the two first openings 324 of the front end of the first base body 32. A rear end of the first surrounding portion 320 is located between the other two first openings 324 of the rear end of the first base body 32. The two first protruding portions 322 of the first base body 32 are buckled in two front ends of the two first locating slots 113 of the insulating housing 1, so that the first terminal assembly 3 is located to the insulating housing 1, and the first terminal assembly 3 is fastened to the insulating housing 1. The first fastening portions 311 of the plurality of the first grounding terminals 317 and the first differential signal terminals 318 of the two sides of the first terminal assembly 3 are exposed to the two first openings 324 of the rear end of the first base body 32. The rear ends of the first contacting portions 313 and the first stepping portions 312 of the plurality of the first grounding terminals 317 and the first differential signal terminals 318 of the two sides of the first terminal assembly 3 are exposed to the two first openings 324 of the front end of the first base body 32. The first metal plate 33 is disposed in the first fastening groove 323 of the first base body 32. The first fastening portions 311 of the plurality of the first grounding terminals 317 and the first differential signal terminals 318 of the two sides of the first terminal assembly 3 are exposed to the first fastening groove 323 from the two first openings 324 of the rear end of the first base body 32.

In the first preferred embodiment, the first openings 324 of the first base body 32 are formed to two sides of the first surrounding portion 320. A quantity of the first openings 324 of the rear end of the first base body 32 of the first terminal assembly 3 is the same as a quantity of the convex surfaces 118 of insulating housing 1. The two first openings 324 of the rear end of the first base body 32 of the first terminal assembly 3 are corresponding to the two convex surfaces 118 of the insulating housing 1.

A middle of a bottom surface of the first surrounding portion 320 of first base body 32 extends downward to form a supporting block 301. Several portions of a rear surface and a front surface of the supporting block 301 are arched oppositely to form the plurality of the first contact surfaces 325. The plurality of the first contact surfaces 325 are used for fastening the first metal plate 33. A middle of a bottom surface of the supporting block 301 of the first surrounding portion 320 of first base body 32 is recessed inward to from the first location hole 326. A corresponding mechanism of the third terminal assembly 5 is fastened in the first location hole 326, so that the third terminal assembly 5 is located to the first terminal assembly 3, and the third terminal assembly 5 is fastened to the first terminal assembly 3. The plurality of the first restricting holes 327 penetrate through the top surface and the bottom surface of the two opposite sides of the first base body 32. Corresponding mechanisms of the first metal plate 33 are disposed in the plurality of the first restricting holes 327, so that the first metal plate 33 is located to the first base body 32, and the first metal plate 33 is fastened to the first base body 32.

An upper surface of the first base body 32 has the plurality of the first connecting portions 328. The plurality of the first connecting portions 328 are longitudinally arranged in three rows. Each first connecting portion 328 is disposed between two adjacent first terminals 31. The plurality of the first connecting portions 328 are used to simplify a mold manufacturing process. The plurality of the first connecting portions 328 are embedded into the plurality of the first lacking grooves 319 of the plurality of the first fastening portions 311 and the plurality of the first contacting portions 313. A lower surface of the first base body 32 has a transverse row of second terminal slots 329. Corresponding parts of the third terminal assembly 5 are disposed to the transverse row of the second terminal slots 329. During an assembling process of the high-speed connector 100, the transverse row of the second terminal slots 329 are used for preventing the corresponding parts of the third terminal assembly 5 from tilting.

The first metal plate 33 is fastened in the first fastening groove 323 of the first base body 32. The first metal plate 33 is located under the plurality of the first terminals 31. The first metal plate 33 has a first main sheet 331, a limiting hole 332, a plurality of first inclining sheets 333, a plurality of first contact sheets 334, a plurality of first covering sheets 336 and a plurality of first restricting portions 337.

A position of the first main sheet 331 is corresponding to a position of the first surrounding portion 320 of the first base body 32. The limiting hole 332 is formed at a middle of the first main sheet 331. The first main sheet 331 is a rectangular frame shape. The plurality of the first contact surfaces 325 abut against a front inner wall and a rear inner wall of the limiting hole 332 of the first main sheet 331. In the concrete implementation, the first main sheet 331 is fastened to the bottom surface of the first surrounding portion 320 of the first base body 32. Two opposite sides of the first main sheet 331 meander oppositely to form two first flank sheets 335. Each first flank sheet 335 is shown as a wave shape. Each first flank sheet 335 includes the plurality of the first inclining sheets 333, the plurality of the first contact sheets 334 and the plurality of the first covering sheets 336.

The two opposite sides of the first main sheet 331 slantwise extend outward and upward to form two of the plurality of the first inclining sheets 333. The two of the plurality of the first inclining sheets 333 are corresponding to two outer surfaces of the first surrounding portion 320 of the first base body 32. The two of the plurality of the first inclining sheets 333 are covered to the two outer surfaces of the first surrounding portion 320. Two sides of the limiting hole 332 extend to middles of the two of the plurality of the first inclining sheets 333. Two outer edges of the two of the plurality of the first inclining sheets 333 horizontally extend to form two first contact sheets 334. Each first contact sheet 334 and the first main sheet 331 are horizontally disposed. Each first contact sheet 334 is parallel to the first main sheet 331. Two outer edges of the two first contact sheets 334 slantwise extend outward and downward to form another two of the plurality of the first inclining sheets 333. The another two of the plurality of the first inclining sheets 333 of two opposite sides of the two first contact sheets 334 are opposite to each other. Two outer edges of the another two of the plurality of the first inclining sheets 333 horizontally extend outward to form two first covering sheets 336. Each first covering sheet 336 and the first main sheet 331 are horizontally disposed. Each first covering sheet 336 and the first main sheet 331 are disposed at the same level. Two outer edges of the two first covering sheets 336 slantwise extend upward and outward to form two extra first inclining sheets 333. Two outer edges of the two extra first inclining sheets 333 horizontally extend oppositely to form another two first contact sheets 334. Two outer edges of the another two first contact sheets 334 slantwise extend outward and downward to form two additional first inclining sheets 333. Two outer edges of the two additional first inclining sheets 333 horizontally extend outward to form another two first covering sheets 336. Two outer edges of the another two first covering sheets 336 slantwise extend outward and upward to form two other first inclining sheets 333. Two outer edges of the two other first inclining sheets 333 horizontally extend outward to form two outermost first contact sheets 334.

The two opposite sides of the first main sheet 331 meander outward to form the first inclining sheets 333, the first contact sheets 334 and the first covering sheets 336 of the two first flank sheets 335 according to a quantity of the plurality of the first terminals 31. In the first preferred embodiment, each first flank sheet 335 has five first inclining sheets 333, three first contact sheets 334 and two first covering sheets 336, so the first metal plate 33 has the first main sheet 331, one limiting hole 332, ten first inclining sheets 333, six first contact sheets 334 and four first covering sheets 336. Two opposite side edges of each first covering sheet 336 slantwise extend upward and sideward to form the two first inclining sheets 333. The two first inclining sheets 333 of each first covering sheet 336 are connected with two of the plurality of the first contact sheets 334. The two first inclining sheets 333 of each first covering sheet 336 are opposite to each other. Each two first inclining sheets 333 of the first metal plate 33 are opposite to each other.

From an inner side of each first flank sheet 335 to an outer side of each first flank sheet 335, each first flank sheet 335 sequentially has the first inclining sheet 333 connected with one side of the first main sheet 331, the first contact sheet 334 connected with the outer edge of the first inclining sheet 333 which is connected with the one side of the first main sheet 331, the first inclining sheet 333 connected with the outer edge of the first contact sheet 334, the first covering sheet 336 connected with the outer edge of the first inclining sheet 333 which is connected with the outer edge of the first contact sheet 334, the first inclining sheet 333 connected with an outer edge of the first covering sheet 336, the first contact sheet 334 connected with the outer edge of the first inclining sheet 333 which is connected with the outer edge of the first covering sheet 336, the first inclining sheet 333 connected with the outer edge of the first contact sheet 334, the first covering sheet 336 connected with the outer edge of the first inclining sheet 333 which is connected with the outer edge of the first contact sheet 334, the first inclining sheet 333 connected with the outer edge of the first covering sheet 336, and the first contact sheet 334 connected with the outer edge of the first inclining sheet 333.

Referring to FIG. 7 to FIG. 10, the first contact sheets 334 of the first metal plate 33 contact with the first fastening portions 311 of the plurality of the first grounding terminals 317 of the two sides of the first terminal assembly 3 to form a grounding structure 90. In this way, a signal noise is able to be effectively absorbed and the signal noise is able to be effectively restrained for improving transmission quality of the high-frequency signal. The first covering sheets 336 of the first metal plate 33 keep distances from the first fastening portions 311 of the first differential signal terminals 318 of the first terminal assembly 3.

Several portions of two opposite outer sides of the two outermost first contact sheets 334 of the first metal plate 33 slantwise extend downward and outward, and then are bent outward to form the plurality of the first restricting portions 337. A quantity of the plurality of the first restricting portions 337 is the same as a quantity of the plurality of the first restricting holes 327 of the first base body 32. The plurality of the first restricting portions 337 are restricted in the plurality of the first restricting holes 327, so the first metal plate 33 is fastened in the first base body 32.

Figure 12:
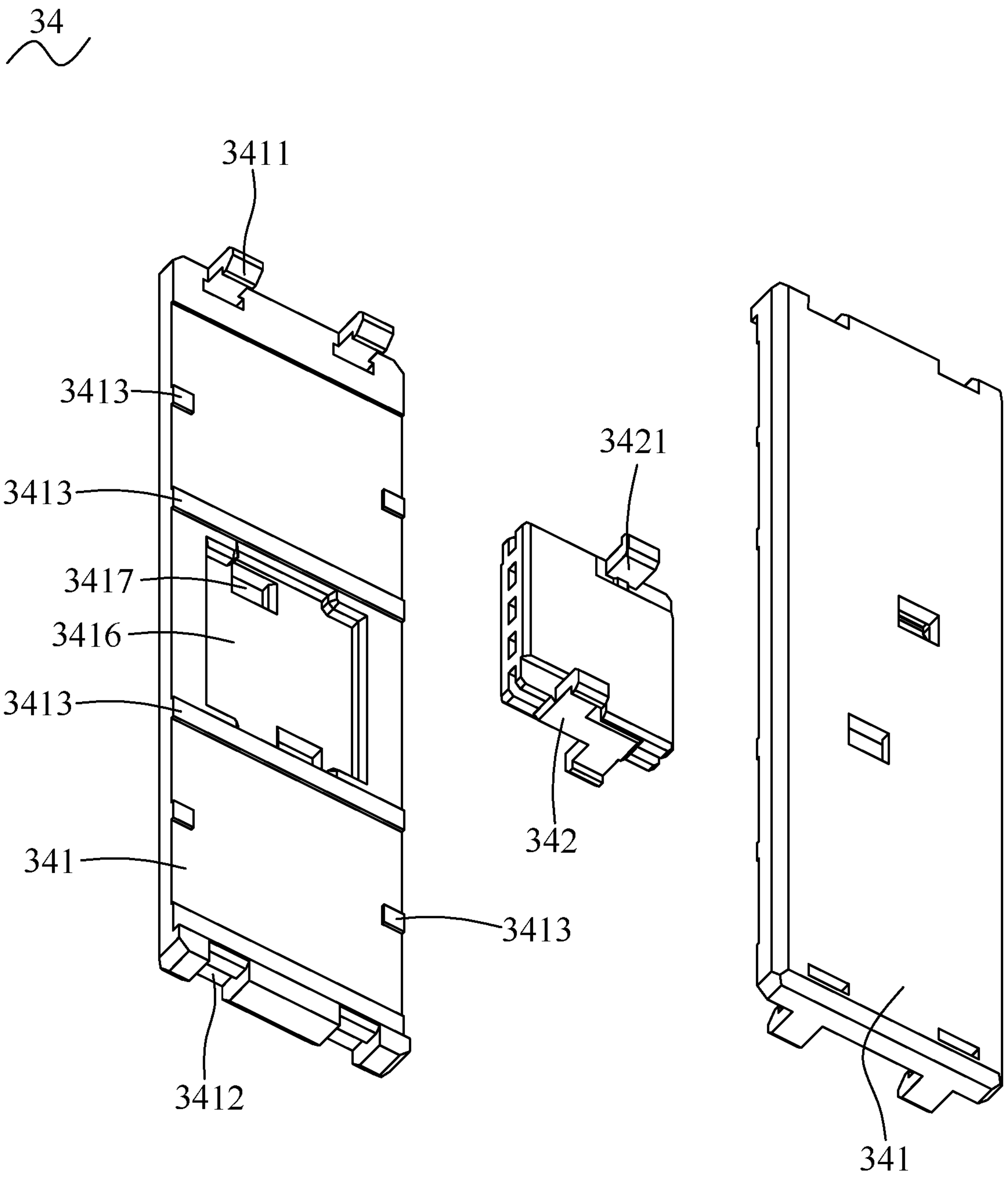
FIG. 12 is an exploded view of a first dielectric structure of the first terminal assembly of the terminal module of the high-speed connector of FIG. 9.
Figure 13:
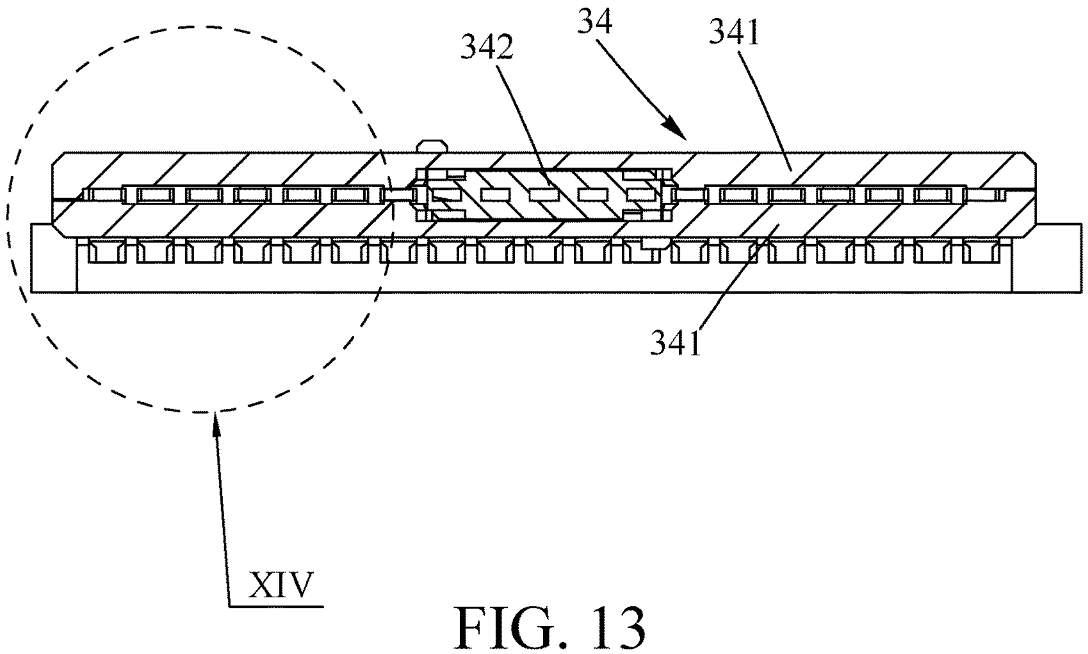
FIG. 13 is a sectional view of the high-speed connector along a line A-A of FIG. 9.
Figure 14:
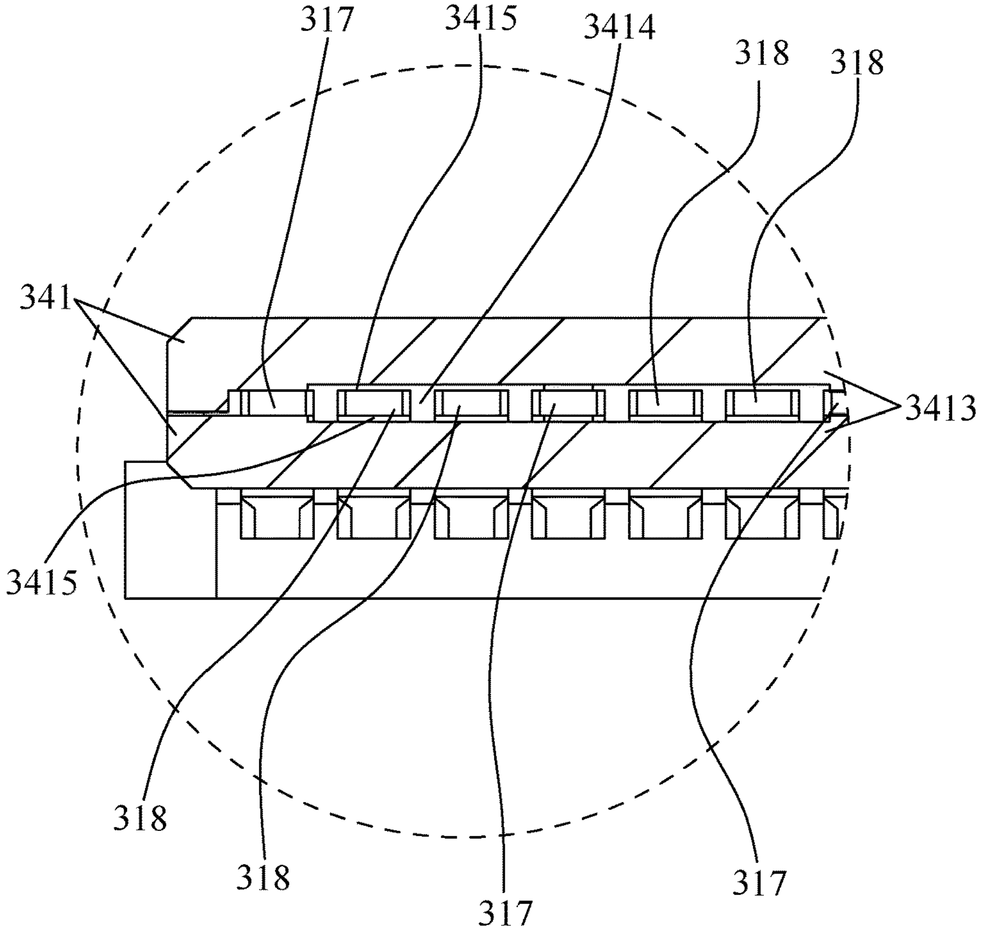
FIG. 14 is an enlarged view of an encircled portion XIV of the high-speed connector of FIG. 13.
Figure 15:
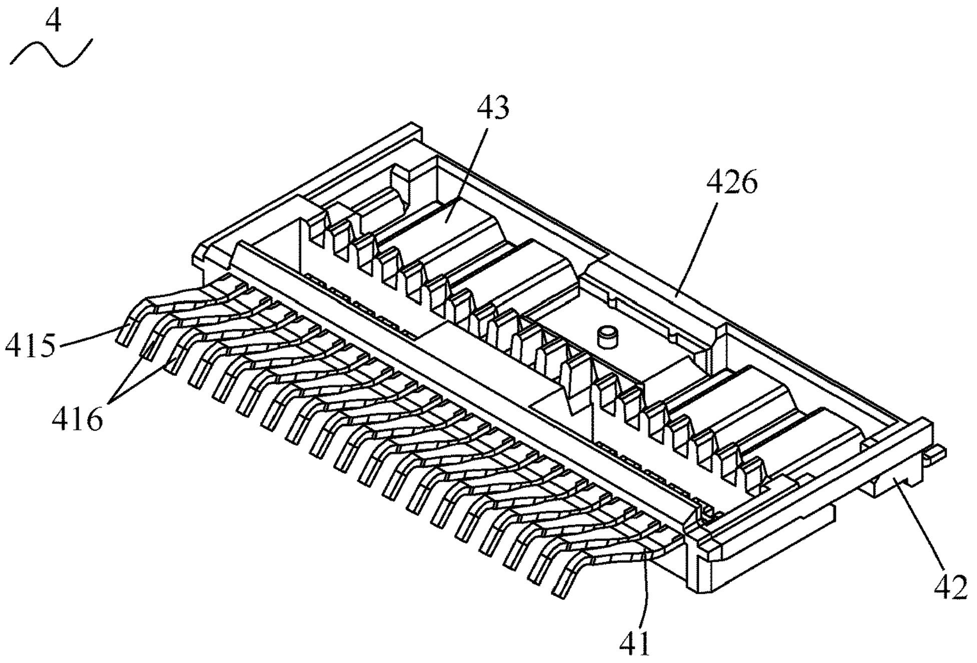
FIG. 15 is a perspective view of a second terminal assembly of the terminal module of the high-speed connector of FIG. 3.
Figure 16:
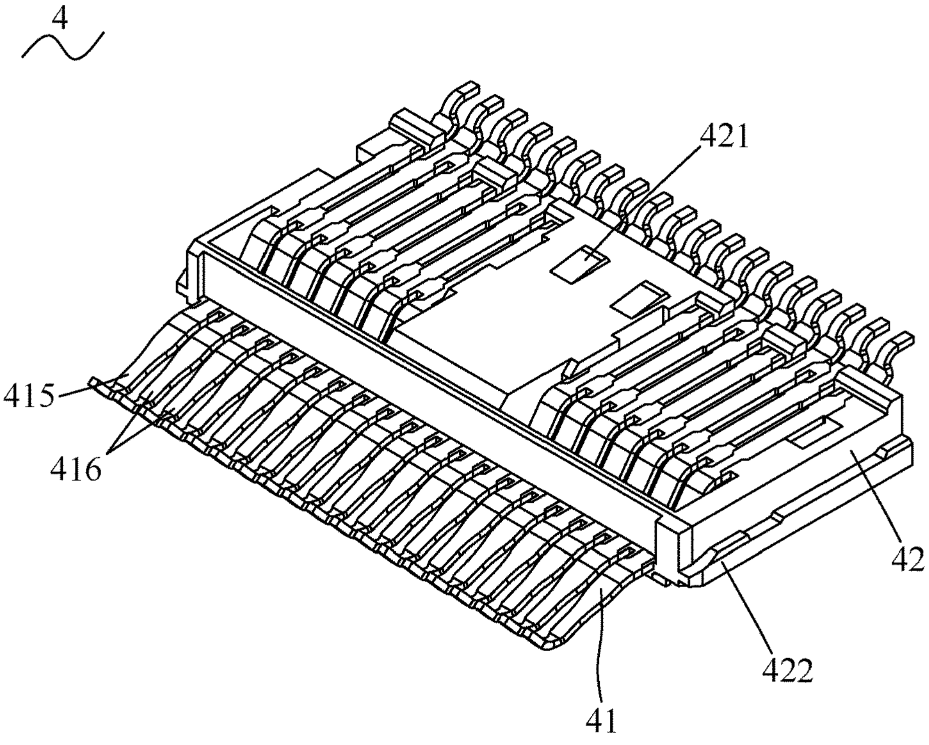
FIG. 16 is another perspective view of the second terminal assembly of the terminal module of the high-speed connector of FIG. 3.

Referring to FIG. 12 to FIG. 14, the first dielectric structure 34 has two first covers 341 and a first fastening structure 342. The first fastening structure 342 is disposed between the two first covers 341. In one condition, structures of the two first covers 341 are the same. In another condition, the two first covers 341 are symmetrical. The two first covers 341 are disposed opposite to each other. The two first covers 341 and the first fastening structure 342 are buckled in a whole. The two first covers 341 are buckled by the first fastening structure 342 to form an entirety.

Each first cover 341 has a first extending foot 3411, a first notch 3412, a plurality of first attaching surfaces 3413 and a first internal space 3414. One side of each first cover 341 protrudes inward and perpendicular to each first cover 341 to form the first extending foot 3411. The other side of each first cover 341 has the first notch 3412 penetrating through an outer surface, an inner surface and the other side surface of each first cover 341. In the first preferred embodiment, each first cover 341 has two first extending feet 3411, two first notches 3412, the plurality of the first attaching surfaces 3413 and the first internal space 3414. Two portions of the one side of each first cover 341 protrude inward and perpendicular to each first cover 341 to form the two first extending feet 3411. The other side of each first cover 341 has the two first notches 3412 penetrating through the outer surface, the inner surface and the other side surface of each first cover 341. The two first extending feet 3411 of one first cover 341 are disposed corresponding to the two first notches 3412 of the other first cover 341. The first extending feet 3411 of the two first covers 341 are buckled with the first notches 3412 of the two first covers 341.

Two sides of the inner surface of each first cover 341 has the plurality of the first attaching surfaces 3413 protruded beyond the inner surface of each first cover 341. The first attaching surfaces 3413 of the two first covers 341 are corresponding to the first extending portions 314 of the first grounding terminals 317 of the two sides of the first terminal assembly 3. The first attaching surfaces 3413 of the two first covers 341 clamp the first extending portions 314 of the first grounding terminals 317 of the two sides of the first terminal assembly 3. The first attaching surfaces 3413 of the one first cover 341 are corresponding to upper surfaces of the first extending portions 314 of the first grounding terminals 317 of the two sides of the first terminal assembly 3, and the first attaching surfaces 3413 of the other first cover 341 are corresponding to lower surfaces of the first extending portions 314 of the first grounding terminals 317 of the two sides of the first terminal assembly 3. The first attaching surfaces 3413 of the one first cover 341 contact with the upper surfaces of the first extending portions 314 of the first grounding terminals 317 of the two sides of the first terminal assembly 3, and the first attaching surfaces 3413 of the other first cover 341 contact with the lower surfaces of the first extending portions 314 of the first grounding terminals 317 of the two sides of the first terminal assembly 3.

The first attaching surfaces 3413 of the one first cover 341 face the first attaching surfaces 3413 of the other first cover 341. The first attaching surfaces 3413 of the two first covers 341 are spaced to form the first internal space 3414. The first extending portions 314 of the first differential signal terminals 318 of the two sides of the first terminal assembly 3 pass through the first internal space 3414. The upper surfaces and the lower surfaces of the first extending portions 314 of the first differential signal terminals 318 of the two sides of the first terminal assembly 3 are spaced from the two inner surfaces of the two first covers 341 to form two first gaps 3415. A plurality of the first gaps 3415 are formed among the first terminal assembly 3 and the two inner surfaces of the two first covers 341. The first internal space 3414 and the plurality of the first gaps 3415 of the first dielectric structure 34 are used for adjusting the dielectric coefficient of the peripheral structure of each first terminal 31 to improve an electromagnetic characteristic and the crosstalk interference of the high-speed connector 100.

A middle of the inner surface of each first cover 341 is recessed inward to from a first sunken portion 3416. The first sunken portion 3416 is used for receiving the first fastening structure 342. The first sunken portion 3416 of each first cover 341 has at least one first perforation 3417 penetrating through the inner surface and an outer surface of each first cover 341. In the first preferred embodiment, the first sunken portion 3416 of each first cover 341 has two first perforations 3417. The two first perforations 3417 penetrate through the two inner surfaces and the two outer surfaces of the two first covers 341. Corresponding hooks of the first fastening structure 342 are disposed to the first perforations 3417 of the two first covers 341, and the corresponding hooks of the first fastening structure 342 are buckled to the two outer surfaces of the two first covers 341, so that the first fastening structure 342 is located between the two first covers 341, and the first fastening structure 342 is fastened between the two first covers 341.

Each side of the first fastening structure 342 has at least one first buckling hook 3421. In the first preferred embodiment, the first fastening structure 342 has four first buckling hooks 3421. Each side of the first fastening structure 342 has two first buckling hooks 3421. The two first buckling hooks 3421 of each side of the first fastening structure 342 oppositely extend towards the two first covers 341, and then protrude outward to form the two first buckling hooks 3421. A quantity of the first buckling hooks 3421 of the first fastening structure 342 is the same as a quantity of the first perforations 3417 of the two first covers 341. The first buckling hooks 3421 of the first fastening structure 342 are buckled in the first perforations 3417 of the two first covers 341, and the first buckling hooks 3421 of the first fastening structure 342 hook the two outer surfaces of the two first covers 341, so that the first fastening structure 342 is located between the two first covers 341, and the first fastening structure 342 is fastened between the two first covers 341. The first extending portions 314 of the first terminals 31 of the middle of the first terminal assembly 3 longitudinally pass through a middle of the first fastening structure 342.

Bottom ends of the plurality of the first terminals 31 are surrounded by the first holding element 35. Two opposite sides of the first holding element 35 are recessed inward to form the two first clamping slots 351. The two rear ends of the two protruding ribs 117 of the insulating housing 1 are clamped in the two first clamping slots 351 of the first terminal assembly 3, so that the first terminal assembly 3 is located to the insulating housing 1, and the first terminal assembly 3 is fastened to the insulating housing 1. Each first clamping slot 351 is shown as a horn shape, and a front of each first clamping slot 351 is wider than a rear of each first clamping slot 351, so that the two protruding ribs 117 of the insulating housing 1 are buckled in the two first clamping slots 351 conveniently.

Referring to FIG. 3 to FIG. 18, the second terminal assembly 4 is corresponding to the first terminal assembly 3 along the up-down direction. The second terminal assembly 4 includes a plurality of second terminals 41, a second base body 42 and a second metal plate 43. The plurality of the second terminals 41 are fastened to the second base body 42. The plurality of the second terminals 41 are partially surrounded by the second base body 42. The second metal plate 43 is disposed to the second base body 42.

Each second terminal 41 has a second fastening portion 411, a second stepping portion 412, a second contacting portion 413 and a second soldering portion 414. The plurality of the second terminals 41 include a plurality of second grounding terminals 415 and a plurality of second differential signal terminals 416. In the first preferred embodiment, the plurality of the second terminals 41 includes seven second grounding terminals 415 and twelve second differential signal terminals 416. Each two adjacent second differential signal terminals 416 are located between two second grounding terminals 415. Each second differential signal terminal 416 is used for transmitting the signal. The second fastening portion 411 of one second grounding terminal 415 and the second fastening portions 411 of four second differential signal terminals 416 are surrounded by a middle of the second base body 42.

A front end of the second fastening portion 411 slantwise extends upward and frontward to form the second stepping portion 412. A front end of the second stepping portion 412 extends frontward and then is arched upward to form the second contacting portion 413. A rear end of the second fastening portion 411 is bent downward and then extends rearward to form the second soldering portion 414. Two sides of the front end of the second fastening portion 411, two sides of the rear end of the second fastening portion 411 and two sides of a rear end of the second contacting portion 413 are recessed inward to form a plurality of second lacking grooves 417.

The second stepping portions 412 and the rear ends of the second contacting portions 413 of the second terminals 41 of two sides of the second terminal assembly 4 are exposed to two sides of a front end of the second base body 42. The second contacting portions 413 of the plurality of the second terminals 41 project beyond a front surface of the second base body 42. The second contacting portions 413 of the plurality of the second terminals 41 are disposed in the lower row of the first terminal slots 13. Top surfaces of the second contacting portions 413 of the plurality of the second terminals 41 are exposed out of the lower row of the first terminal slots 13. The top surfaces of the second contacting portions 413 of the plurality of the second terminals 41 project into the insertion groove 14. The second contacting portions 413 of the plurality of the second terminals 41 of the two sides of the second terminal assembly 4 are corresponding to the plurality of the second penetrating grooves 18 of the insulating housing 1. Corresponding formations of the second base body 42 are engaged with the plurality of the second lacking grooves 417 of the second fastening portions 411 and the second contacting portions 413 of the plurality of the second terminals 41 by the plastic injection molding technology.

The second fastening portions 411, the second stepping portions 412 and the rear ends of the second contacting portions 413 of the second terminals 41 of a middle of the second terminal assembly 4 are surrounded by the middle of the second base body 42. The second base body 42 has a second surrounding portion 420, at least one second protruding block 421, two second protruding portions 422, a second fastening groove 423, a plurality of second openings 424, a plurality of second contact surfaces 425, a supporting portion 426, two second restricting holes 427, a plurality of second connecting portions 428 and a plurality of third terminal slots 429. In the first preferred embodiment, the second base body 42 includes two second protruding blocks 421.

The second surrounding portion 420 is disposed to the middle of the second base body 42. The second surrounding portion 420 is connected between the front end of the second base body 42 and a rear end of the second base body 42. The second fastening portion 411 of one second grounding terminal 415 and the second fastening portions 411 of four second differential signal terminals 416 are surrounded by the second surrounding portion 420. A rear end of a bottom surface of the second surrounding portion 420 of the second base body 42 extends downward to form the at least one second protruding block 421. In the first preferred embodiment, two sides of the rear end of the bottom surface of the second surrounding portion 420 of the second base body 42 extend downward to form the two second protruding blocks 421. A quantity of the at least one second protruding block 421 of the second base body 42 is the same as a quantity of the at least one second aperture 112 of the insulating housing 1. The two second protruding blocks 421 are fastened in the two second apertures 112 of the insulating housing 1, so that the second terminal assembly 4 is located to the insulating housing 1, and the second terminal assembly 4 is fastened to the insulating housing 1.

In the first preferred embodiment, two opposite sides of the second base body 42 extend outward to form the two second protruding portions 422. The two second protruding portions 422 are buckled in the two second locating slots 114 of the insulating housing 1, so that the second terminal assembly 4 is located to the insulating housing 1, and the second terminal assembly 4 is fastened to the insulating housing 1. A middle of a top surface of the rear end of the second base body 42 is recessed downward to form the second fastening groove 423. The second metal plate 43 is disposed in the second fastening groove 423 of the second base body 42. The second base body 42 has four second openings 424 formed to two sides of the second surrounding portion 420. The front end of the second base body 42 has two second openings 424 arranged transversely, and the rear end of the second base body 42 has the other two second openings 424 arranged transversely. The two second openings 424 of the front end of the second base body 42 penetrate through two sides of a top surface and two sides of a bottom surface of the front end of the second base body 42. Two bottoms of two sides of the second fastening groove 423 extend downward to form the other two second openings 424 penetrating through two sides of a bottom surface of the rear end of the second base body 42. A front end of the second surrounding portion 420 is located between the two second openings 424 of the front end of the second base body 42. A rear end of the second surrounding portion 420 is located between the other two second openings 424 of the rear end of the second base body 42. The second fastening portions 411 of the plurality of the second grounding terminals 415 and the second differential signal terminals 416 of the two sides of the second terminal assembly 4 are exposed to the other two second openings 424 of the rear end of the second base body 42. The second fastening portions 411 of the plurality of the second grounding terminals 415 and the second differential signal terminals 416 of the two sides of the second terminal assembly 4 are exposed to the second fastening groove 423 from the other two second openings 424 of the rear end of the second base body 42.

Several portions of an upper surface of the second surrounding portion 420 of the second base body 42 extend upward to form the plurality of the second contact surfaces 425. The plurality of the second contact surfaces 425 are connected with the front end of the second base body 42 and the rear end of the second base body 42. The second contact surfaces 425 of the front end of the second base body 42 and the second contact surfaces 425 of the rear end of the second base body 42 are arched face to face. The plurality of the second contact surfaces 425 are used for fastening the second metal plate 43. A rear end of the second base body 42 is formed as the supporting portion 426. In the first preferred embodiment, a front end of a corresponding location of the fourth terminal assembly 6 abuts against the supporting portion 426. The two second restricting holes 427 penetrate through two sides of the top surface and two sides of the bottom surface of the second base body 42. Two second restricting portions 436 of the second metal plate 43 are restricted in the two second restricting holes 427, so that the second metal plate 43 is located to the second base body 42, and the second metal plate 43 is fastened to the second base body 42.

A lower surface of the second base body 42 has the plurality of the second connecting portions 428. Each second connecting portion 428 is disposed between two adjacent second terminals 41. Each second connecting portion 428 is used to simplify the mold manufacturing process. The plurality of the second connecting portions 428 are longitudinally arranged in three rows. In the first preferred embodiment, the plurality of the second connecting portions 428 are embedded in the plurality of the second lacking grooves 417 of the second fastening portions 411 and the second contacting portions 413 of the plurality of the second terminals 41. An upper surface of the second base body 42 has a row of third terminal slots 429. Front ends of a plurality of fourth terminals 61 of the fourth terminal assembly 6 are disposed to the row of the third terminal slots 429. During the assembling process of the high-speed connector 100, the row of the third terminal slots 429 are used for preventing the plurality of the fourth terminals 61 of fourth terminal assembly 6 from tilting. The upper surface of the second surrounding portion 420 of the second base body 42 extends upward to from a first fastening pillar 4201. The first fastening pillar 4201 is used for fastening the second metal plate 43. The first fastening pillar 4201 is corresponding to a corresponding second perforation 437 of the second metal plate 43.

The second metal plate 43 is disposed in the second fastening groove 423 of the second base body 42. The second metal plate 43 is disposed to top surfaces of the plurality of the second terminals 41. The second metal plate 43 has a rectangular second main sheet 431, a plurality of second inclining sheets 432, a plurality of second contact sheets 433, a plurality of second covering sheets 435 and the two second restricting portions 436.

A position of the second main sheet 431 is corresponding to a position of the second surrounding portion 420 of the second base body 42. The second main sheet 431 is covered to the upper surface of the second surrounding portion 420. The plurality of the second contact surfaces 425 abut against a front edge and a rear edge of the second main sheet 431. In the concrete implementation, the second main sheet 431 is directly fastened to the second surrounding portion 420 of the second base body 42. Two opposite sides of the second main sheet 431 form two second flank sheets 434. Each second flank sheet 434 is wavy. Each second flank sheet 434 has the plurality of the second inclining sheets 432, the plurality of the second contact sheets 433 and the plurality of the second covering sheets 435.

The two opposite sides of the second main sheet 431 slantwise extend outward and upward to form two of the plurality of the second inclining sheets 432. The two of the plurality of the second inclining sheets 432 are corresponding to two outer surfaces of the second surrounding portion 420 of the second base body 42. The two of the plurality of the second inclining sheets 432 are covered to the two outer surfaces of the second surrounding portion 420. Two outer edges of the two of the plurality of the second inclining sheets 432 horizontally extend to form two second contact sheets 433. Each second contact sheet 433 and the second main sheet 431 are horizontally disposed. Each second contact sheet 433 is parallel to the second main sheet 431. Two outer edges of the two second contact sheets 433 slantwise extend outward and downward to form another two of the plurality of the second inclining sheets 432. The another two of the plurality of the second inclining sheets 432 of the two outer edges of the two second contact sheets 433 are opposite to each other. Two outer edges of the another two of the plurality of the second inclining sheets 432 horizontally extend outward to form two second covering sheets 435. Each second covering sheet 435 and the second main sheet 431 are horizontally disposed. Each second covering sheet 435 and the second main sheet 431 are disposed at the same level. Two outer edges of the two second covering sheets 435 extend outward and downward to form two extra second inclining sheets 432. Two outer edges of the two extra second inclining sheets 432 horizontally extend oppositely to form another two second contact sheets 433. Two outer edges of the another two second contact sheets 433 slantwise extend outward and upward to form two additional second inclining sheets 432. Two outer edges of the two additional second inclining sheets 432 horizontally extend outward to form another two second covering sheets 435. Two outer edges of the another two second covering sheets 435 slantwise extend outward and downward to form two other second inclining sheets 432. Two outer edges of the two other second inclining sheets 432 horizontally extend outward to form two outermost second contact sheets 433.

The two opposite sides of the second main sheet 431 meander outward to form the second inclining sheets 432, the second contact sheets 433 and the second covering sheets 435 of the two second flank sheets 434 according to a quantity of the plurality of the second terminals 41. In the first preferred embodiment, each second flank sheet 434 of the second metal plate 43 has five second inclining sheets 432, three second contact sheets 433 and two second covering sheets 435, so the second metal plate 43 has one second main sheet 431, ten second inclining sheets 432, six second contact sheets 433 and four second covering sheets 435. Two opposite side edges of each second covering sheet 435 slantwise extend downward and sideward to form the two second inclining sheets 432. The two second inclining sheets 432 of each second covering sheet 435 are connected with two of the plurality of the second contact sheets 433. The two second inclining sheets 432 of each second covering sheet 435 are opposite to each other. Each two second inclining sheets 432 of the second metal plate 43 are opposite to each other.

From an inner side of each second flank sheet 434 to an outer side of each second flank sheet 434, each second flank sheet 434 sequentially has the second inclining sheet 432 connected with one side of the second main sheet 431, the second contact sheet 433 connected with the outer edge of the second inclining sheet 432 which is connected with the one side of the second main sheet 431, the second inclining sheet 432 connected with the outer edge of the second contact sheet 433, the second covering sheet 435 connected with the outer edge of the second inclining sheet 432 which is connected with the outer edge of the second contact sheet 433, the second inclining sheet 432 connected with the outer edge of the second covering sheet 435, the second contact sheet 433 connected with the outer edge of the second inclining sheet 432 which is connected with the outer edge of the second covering sheet 435, the second inclining sheet 432 connected with the outer edge of the second contact sheet 433, the second covering sheet 435 connected with the outer edge of the second inclining sheet 432 which is connected with the outer edge of the second contact sheet 433, the second inclining sheet 432 connected with the outer edge of the second covering sheet 435, and the second contact sheet 433 connected with the outer edge of the second inclining sheet 432.

Figure 7:
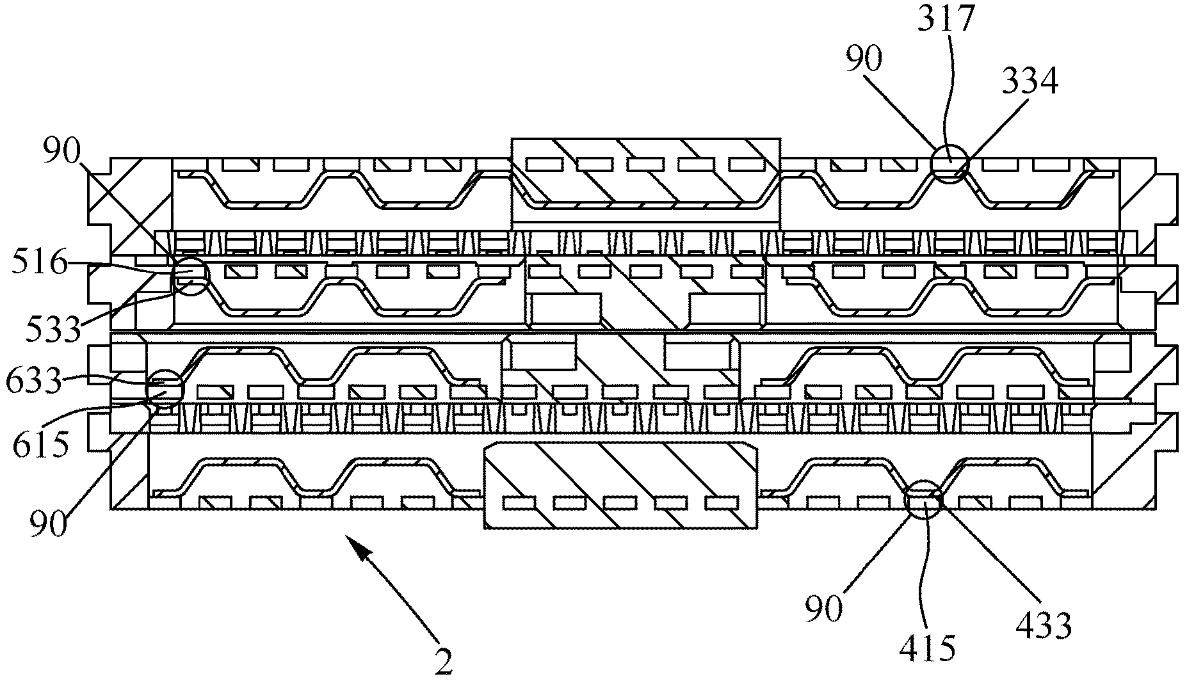
FIG. 7 is a sectional view of the high-speed connector along a line VII-VII of FIG. 6.
Figure 8:
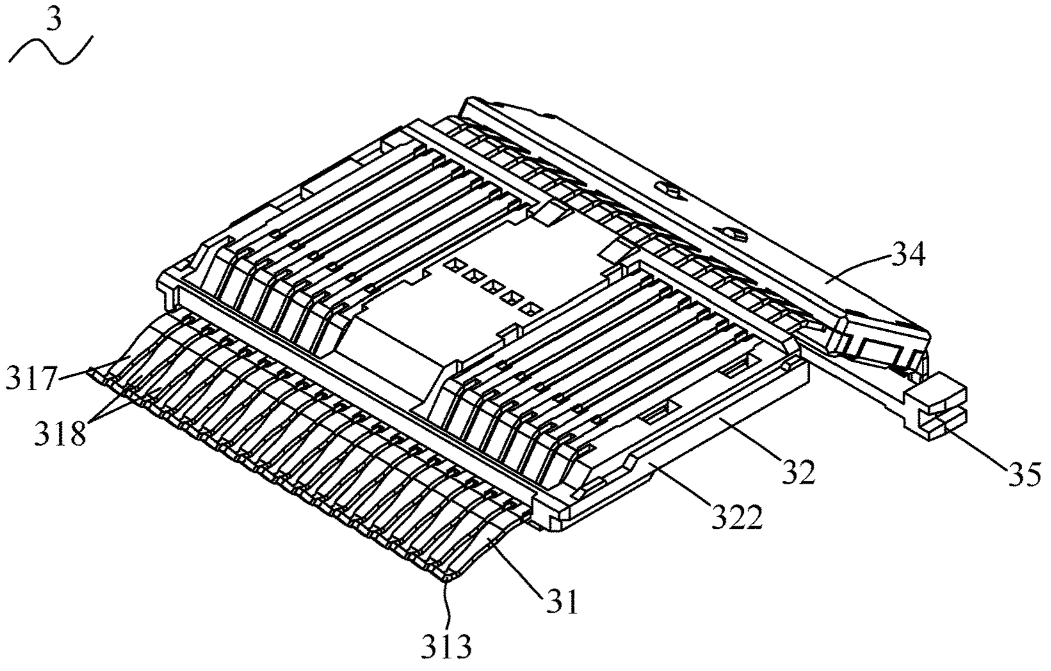
FIG. 8 is a perspective view of a first terminal assembly of a terminal module of the high-speed connector of FIG. 3.
Figure 9:
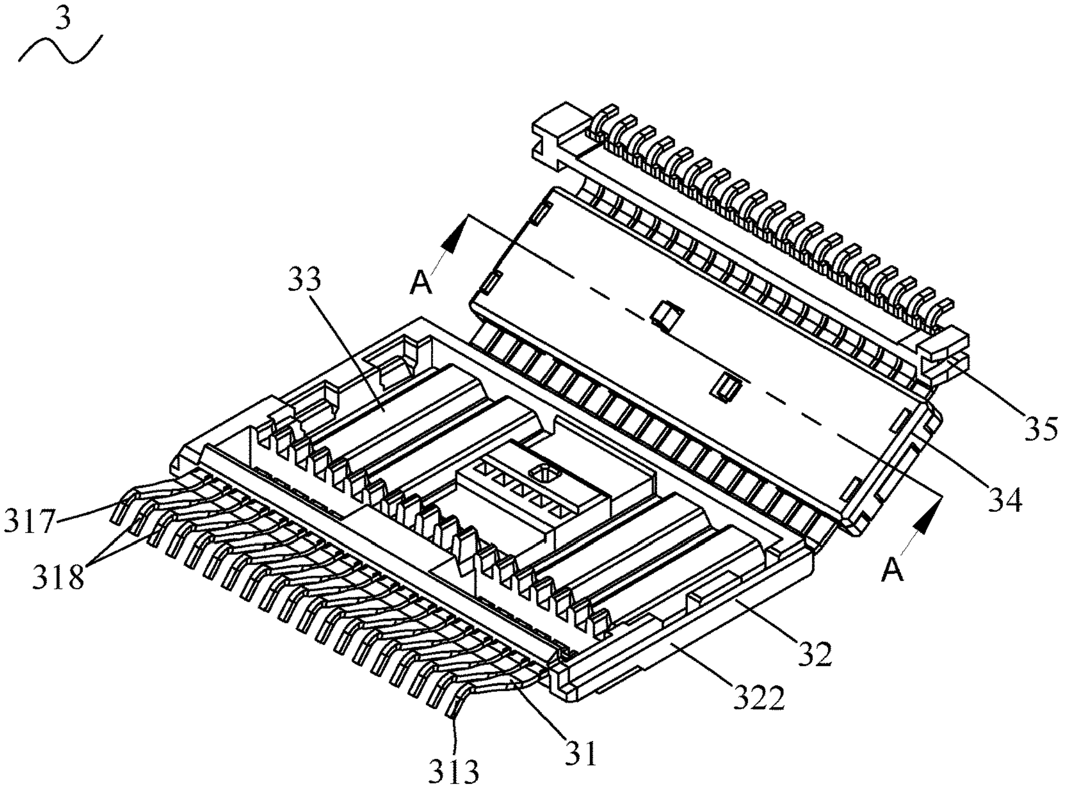
FIG. 9 is another perspective view of the first terminal assembly of the terminal module of the high-speed connector of FIG. 3.
Figure 10:
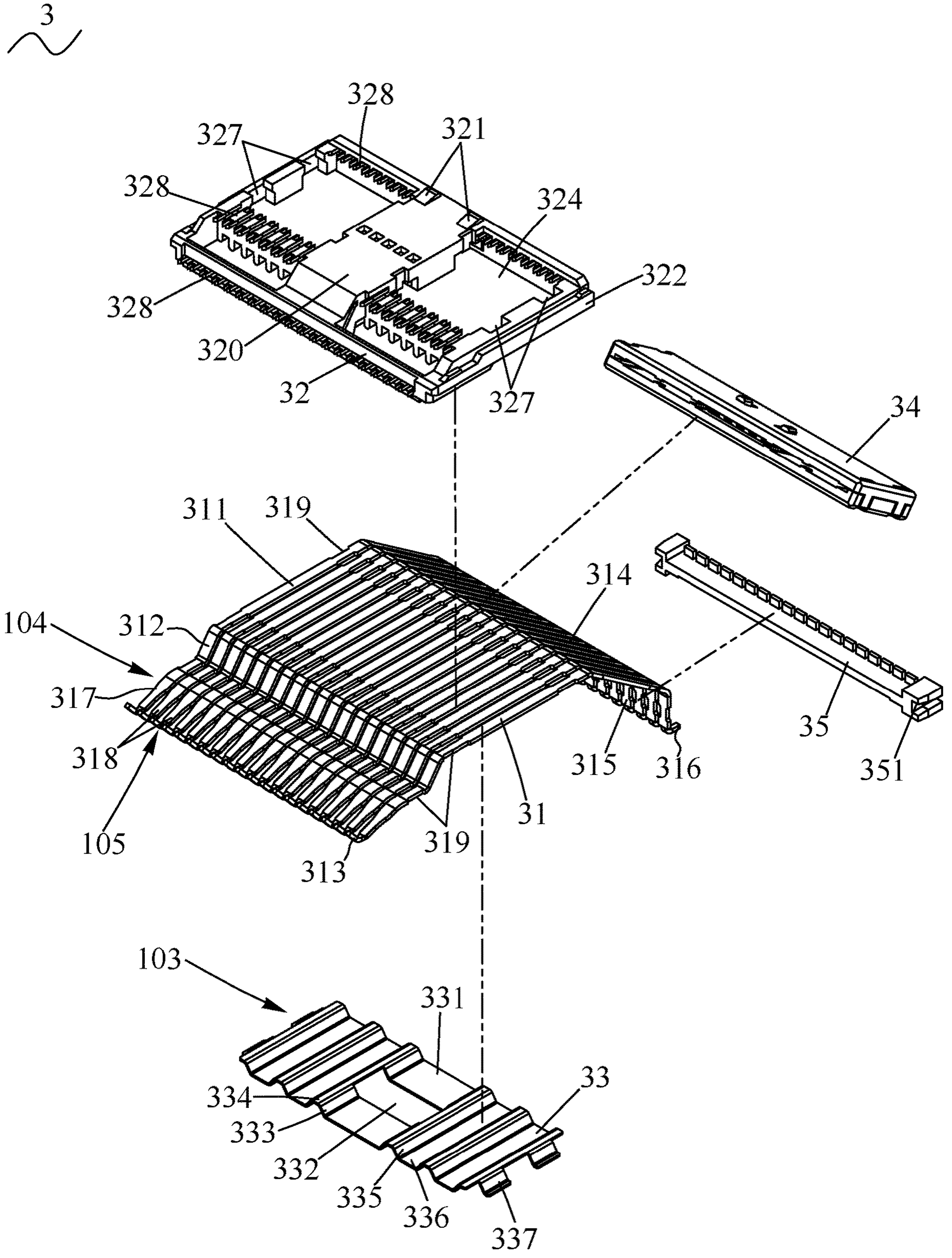
FIG. 10 is an exploded view of the first terminal assembly of the terminal module of the high-speed connector of FIG. 9.
Figure 11:
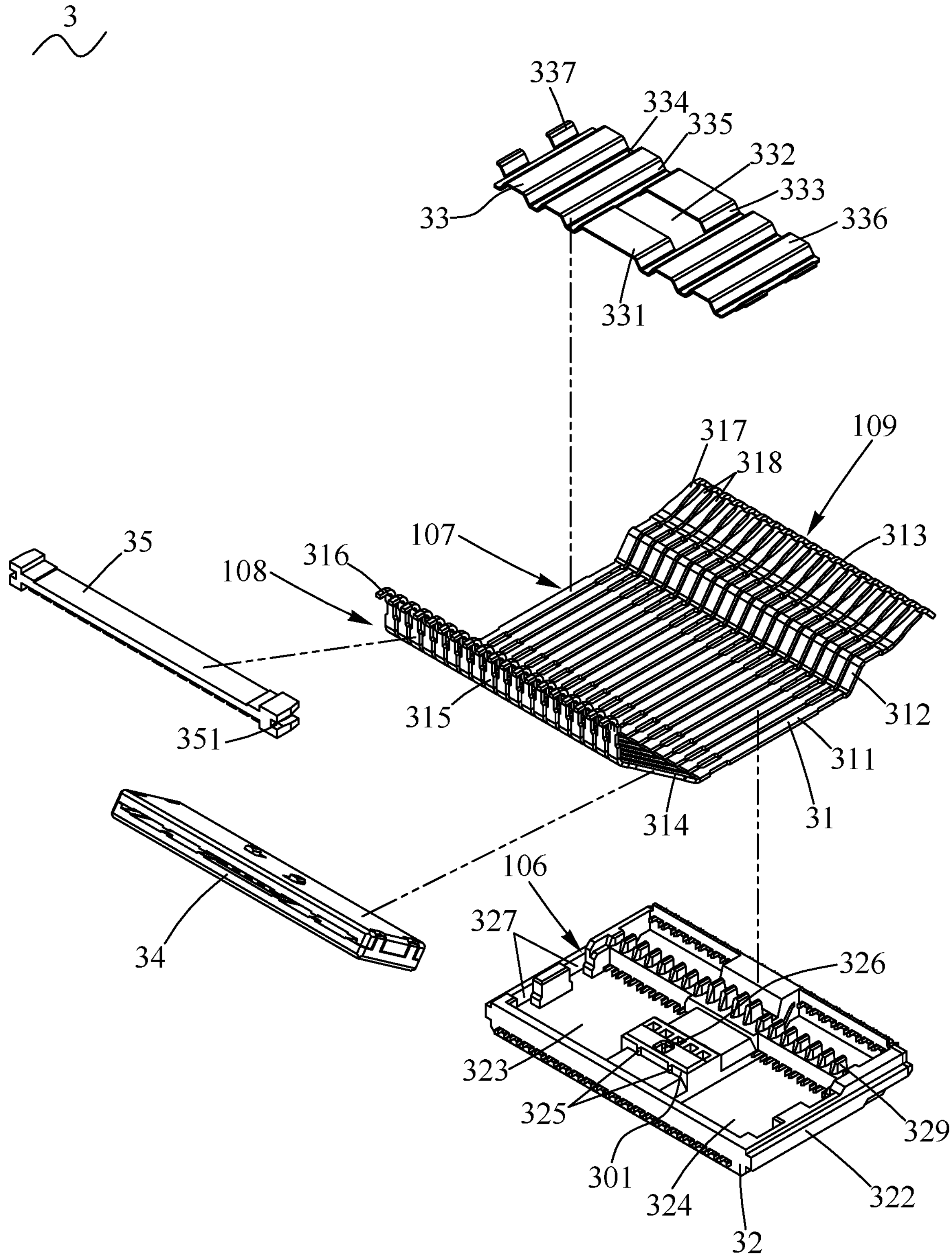
FIG. 11 is another exploded view of the first terminal assembly of the terminal module of the high-speed connector of FIG. 9.
Figure 17:
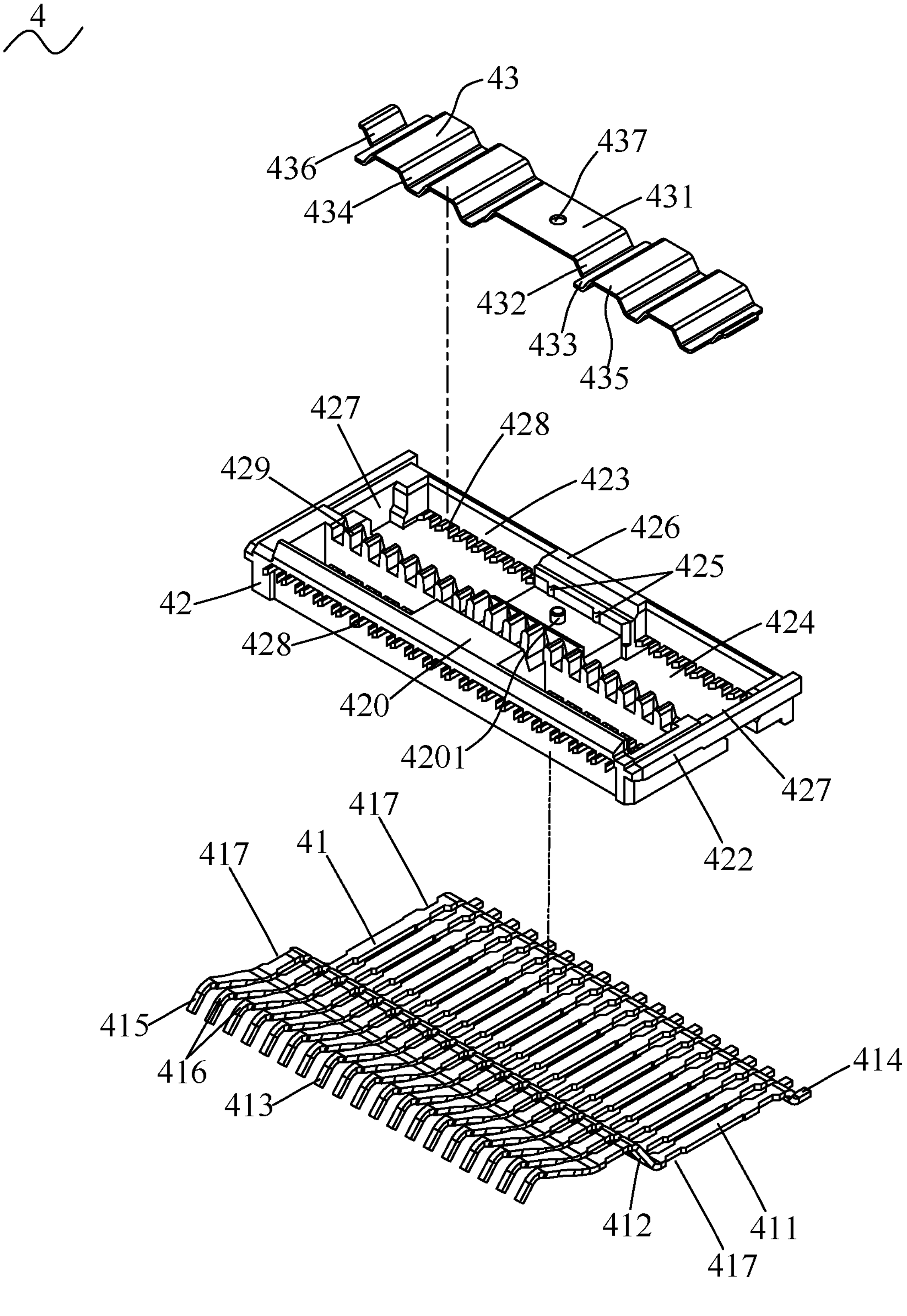
FIG. 17 is an exploded view of the second terminal assembly of the terminal module of the high-speed connector of FIG. 3.
Figure 18:
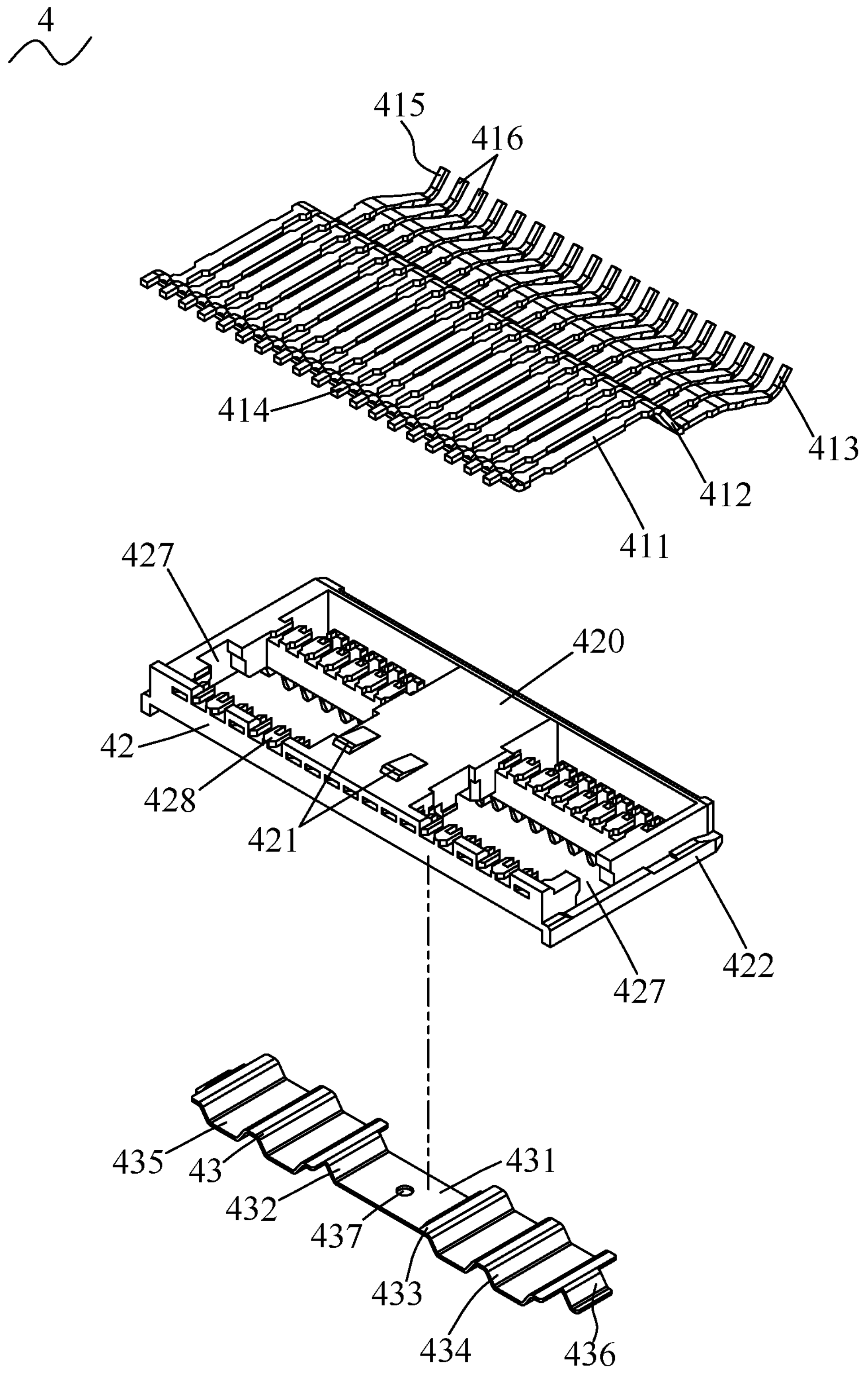
FIG. 18 is another exploded view of the second terminal assembly of the terminal module of the high-speed connector of FIG. 3.
Figure 19:
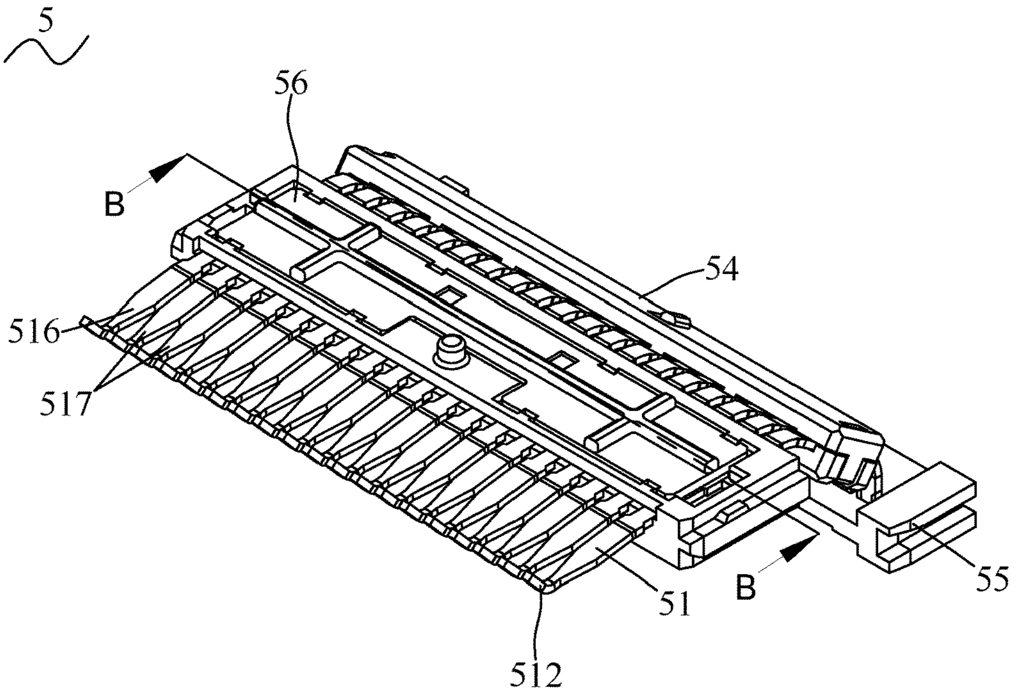
FIG. 19 is a perspective view of a third terminal assembly of the terminal module of the high-speed connector of FIG. 3.
Figure 20:
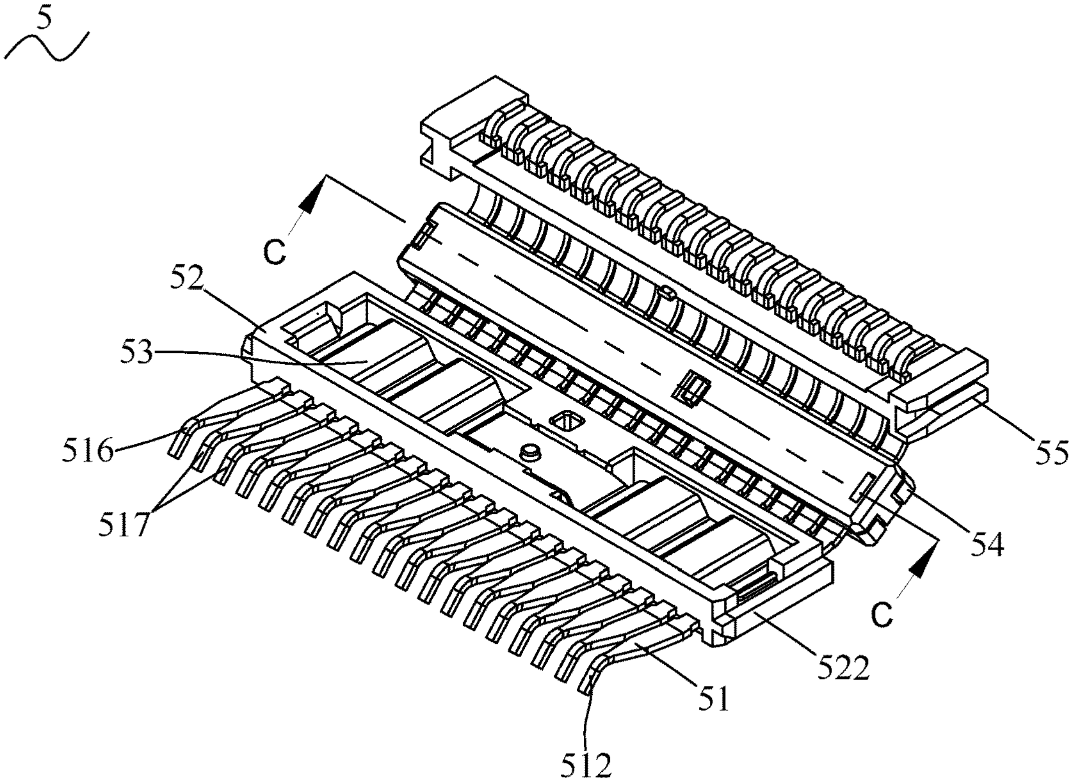
FIG. 20 is another perspective view of the third terminal assembly of the terminal module of the high-speed connector of FIG. 19.

Referring to FIG. 7 and FIG. 17, the second contact sheets 433 of the second metal plate 43 contact with the second fastening portions 411 of the second grounding terminals 415 of the two sides of the second terminal assembly 4 to form the grounding structure 90. In this way, the signal noise is able to be effectively absorbed and the signal noise is able to be effectively restrained for improving the transmission quality of the high-frequency signal. The second covering sheets 435 of the second metal plate 43 keep distances from the second fastening portions 411 of the second differential signal terminals 416 of the second terminal assembly 4.

Two middles of two opposite outer sides of the two outermost second contact sheets 433 of the second metal plate 43 slantwise extend upward and outward, and then are bent outward to form the two second restricting portions 436. A quantity of the second restricting portions 436 of the second metal plate 43 is the same as a quantity of the second restricting holes 427 of the second base body 42. The two second restricting portions 436 are buckled in the two second restricting holes 427, so the second metal plate 43 is fastened in the second base body 42. The second main sheet 431 of the second metal plate 43 has the second perforation 437 vertically penetrating through a top surface and a bottom surface of the second main sheet 431. The first fastening pillar 4201 of the second surrounding portion 420 of the second base body 42 is fastened in the second perforation 437, so that the second metal plate 43 is located to the second base body 42, and the second metal plate 43 is fastened to the second base body 42.

Referring to FIG. 10 to FIG. 26, the third terminal assembly 5 includes a plurality of third terminals 51, a third base body 52, a third metal plate 53, a second dielectric structure 54, a second holding element 55 and a first sheet structure 56. The plurality of the third terminals 51 are disposed between the third metal plate 53 and the first sheet structure 56. The third metal plate 53 is disposed in the third base body 52, and the third metal plate 53 is disposed under the plurality of the third terminals 51. The plurality of the third terminals 51 are fastened to the third base body 52. The plurality of the third terminals 51 are partially surrounded by the third base body 52.

Rear ends of the plurality of the third terminals 51 are surrounded by the second dielectric structure 54. The second dielectric structure 54 is used for adjusting a dielectric coefficient of a peripheral structure of each third terminal 51 to improve the crosstalk interference of the high-speed connector 100. Lower portions of the plurality of the third terminals 51 are surrounded by the second holding element 55. The first sheet structure 56 is disposed in the third base body 52, and the first sheet structure 56 is disposed on the plurality of the third terminals 51. The first sheet structure 56 is opposite to the third metal plate 53. The first sheet structure 56 is used for adjusting the dielectric coefficient of the peripheral structure of each third terminal 51 to improve the crosstalk interference of the high-speed connector 100. A position of the first sheet structure 56 is corresponding to a position of the rear end of the first base body 32. The first sheet structure 56 is mounted under the rear end of the first base body 32.

Each third terminal 51 has a third fastening portion 511, a third contacting portion 512, a second extending portion 513, a second bending portion 514 and a third soldering portion 515. The plurality of the third terminals 51 include a plurality of third grounding terminals 516 and a plurality of third differential signal terminals 517. Each two adjacent third differential signal terminals 517 are disposed between two third grounding terminals 516. In the first preferred embodiment, the plurality of the third terminals 51 include seven third grounding terminals 516 and twelve third differential signal terminals 517. Each third differential signal terminal 517 is used for transmitting the signal. The third fastening portion 511 of one third grounding terminal 516 and the third fastening portions 511 of four third differential signal terminals 517 are surrounded by a middle of the third base body 52.

A front end of the third fastening portion 511 extends frontward, and then is arched downward to form the third contacting portion 512. A rear end of the third fastening portion 511 slantwise extends rearward and downward to form the second extending portion 513. A rear end of the second extending portion 513 is bent downward to form the second bending portion 514. A tail end of the second bending portion 514 is bent rearward to form the third soldering portion 515. The third fastening portions 511 of the plurality of the third terminals 51 are fastened to the third base body 52. The third contacting portions 512 of the plurality of the third terminals 51 project beyond a front surface of the third base body 52. The third contacting portions 512 of the plurality of the third terminals 51 are disposed in the plurality of the second terminal slots 329 of the first terminal assembly 3. During the assembling process of the high-speed connector 100, the plurality of the second terminal slots 329 are used for preventing the third contacting portions 512 of third terminal assembly 5 from tilting. The second extending portions 513 of the plurality of the third terminals 51 project beyond a rear surface of the third base body 52. The second dielectric structure 54 is fastened to the second extending portions 513 of the plurality of the third terminals 51. Tail ends of the plurality of the second bending portions 514 of the plurality of the third terminals 51 are surrounded by the second holding element 55. Two opposite sides of the front end of each third fastening portion 511, two opposite sides of the rear end of each third fastening portion 511 and two opposite sides of each second bending portion 514 are recessed inward to form a plurality of third lacking grooves 518. Corresponding formations of the third base body 52 are embedded into the plurality of the third lacking grooves 518 of the third fastening portions 511 and the second bending portions 514 of the plurality of the third terminals 51.

The third base body 52 has a third surrounding portion 520, a first locating pillar 521, two third protruding portions 522, a third fastening groove 523, two third openings 524, a plurality of third contact surfaces 525, a second location hole 526, two third restricting holes 527 and a plurality of third connecting portions 528. The third surrounding portion 520 is disposed at the middle of the third base body 52, and the third surrounding portion 520 is connected between a front end of the third base body 52 and a rear end of the third base body 52. The third fastening portion 511 of the one third grounding terminal 516 and the third fastening portions 511 of the four third differential signal terminals 517 are surrounded by the third surrounding portion 520. A front end of a top surface of the third surrounding portion 520 of the third base body 52 extends upward to form the first locating pillar 521. The first locating pillar 521 is fastened in the first location hole 326 of the first base body 32 of the first terminal assembly 3, so that the third terminal assembly 5 is located to the first terminal assembly 3, and the third terminal assembly 5 is fastened to the first terminal assembly 3.

In the first preferred embodiment, two opposite sides of the third base body 52 extend outward to form the two third protruding portions 522. The two third protruding portions 522 are buckled in the two third locating slots 115 of the insulating housing 1, so that the third terminal assembly 5 is located to the insulating housing 1, and the third terminal assembly 5 is fastened to the insulating housing 1. A middle of a bottom surface of the third base body 52 is recessed inward to form the third fastening groove 523. A middle of a top surface of the third base body 52 is recessed inward to form a first locating groove 204. The third metal plate 53 is disposed in the third fastening groove 523 of the third base body 52. Two tops of two sides of the third fastening groove 523 extend upward to form the two third openings 524 penetrating through two sides of the top surface of the third base body 52. The two third openings 524 are formed to two sides of the third surrounding portion 520. The plurality of the third fastening portions 511 of the plurality of the third grounding terminals 516 and the plurality of the third fastening portions 511 of the plurality of the third differential signal terminals 517 of two sides of the third terminal assembly 5 are exposed to the two third openings 524 of the third base body 52. The plurality of the third fastening portions 511 of the plurality of the third grounding terminals 516 and the plurality of the third fastening portions 511 of the plurality of the third differential signal terminals 517 of the two sides of the third terminal assembly 5 are exposed to the third fastening groove 523 from the two third openings 524 of the third base body 52.

Several portions of a lower surface of the third surrounding portion 520 of third base body 52 extend downward to form the plurality of the third contact surfaces 525. The plurality of the third contact surfaces 525 are connected with the front end of the third base body 52 and the rear end of the third base body 52. The third contact surfaces 525 of the front end of the third base body 52 and the third contact surfaces 525 of the rear end of the third base body 52 are arched face to face. The plurality of the third contact surfaces 525 are used for fastening the third metal plate 53. A rear end of a bottom surface of the third surrounding portion 520 of third base body 52 is recessed inward to form the second location hole 526. A corresponding mechanism of the fourth terminal assembly 6 is fastened in the second location hole 526 of the third base body 52, so that the fourth terminal assembly 6 is located to the third terminal assembly 5, and the fourth terminal assembly 6 is fastened to the third terminal assembly 5. The two third restricting holes 527 penetrate through the top surface and the bottom surface of the two opposite sides of the third base body 52. Two third restricting portions 536 of the third metal plate 53 are disposed in the two third restricting holes 527, so that the third metal plate 53 is located to the third base body 52, and the third metal plate 53 is fastened to the third base body 52.

An upper surface of the third base body 52 and an upper surface of the second holding element 55 have the plurality of the third connecting portions 528. The plurality of the third connecting portions 528 are longitudinally arranged in three rows. Each third connecting portion 528 is disposed between two third terminals 51. Each third connecting portion 528 is used to simplify the mold manufacturing process. In the first preferred embodiment, the plurality of the third connecting portions 528 are embedded into the third lacking grooves 518 of the third fastening portions 511 and the second bending portions 514 of the plurality of the third terminals 51. A middle of the lower surface of the third surrounding portion 520 of the third base body 52 extends downward to from a second fastening pillar 5201. The second fastening pillar 5201 is used for fastening the third metal plate 53. The second fastening pillar 5201 is corresponding to a corresponding third perforation 537 of the third metal plate 53.

The third metal plate 53 is disposed in the third fastening groove 523 of the third base body 52, and the third metal plate 53 is disposed under the plurality of the third terminals 51. The third metal plate 53 has a rectangular third main sheet 531, a plurality of third inclining sheets 532, a plurality of third contact sheets 533, a plurality of third covering sheets 535 and two third restricting portions 536.

A position of the third main sheet 531 is corresponding to a position of the third surrounding portion 520 of the third base body 52. The third main sheet 531 is covered to the lower surface of the third surrounding portion 520. The plurality of the third contact surfaces 525 abut against a front edge and a rear edge of the third main sheet 531. In the concrete implementation, the third main sheet 531 is directly fastened to the third surrounding portion 520 of the third base body 52. Two opposite sides of the third main sheet 531 form two third flank sheets 534. Each third flank sheet 534 is wavy. Each third flank sheet 534 has the plurality of the third inclining sheets 532, the plurality of the third contact sheets 533 and the plurality of the third covering sheets 535.

The two opposite sides of the third main sheet 531 slantwise extend outward and upward to form two of the plurality of the third inclining sheets 532. The two of the plurality of the third inclining sheets 532 are corresponding to two outer surfaces of the third surrounding portion 520 of the third base body 52. The two of the plurality of the third inclining sheets 532 are covered to the two outer surfaces of the third surrounding portion 520 of the third base body 52. Two outer edges of the two of the plurality of the third inclining sheets 532 horizontally extend outward to form two third contact sheets 533. Each third contact sheet 533 and the third main sheet 531 are horizontally disposed. Each third contact sheet 533 is parallel to the third main sheet 531. Two outer edges of the two third contact sheets 533 slantwise extend outward and downward to form another two of the plurality of the third inclining sheets 532. The another two of the plurality of third inclining sheets 532 of the two outer edges of the two third contact sheets 533 are opposite to each other. Two outer edges of the another two of the plurality of the third inclining sheets 532 horizontally extend outward to form two third covering sheets 535. Each third covering sheet 535 and the third main sheet 531 are horizontally disposed. Each third covering sheet 535 and the third main sheet 531 are disposed at the same level. Two outer edges of the two third covering sheets 535 slantwise extend outward and upward to form two extra third inclining sheets 532. Two outer edges of the two extra third inclining sheets 532 horizontally extend oppositely to form another two third contact sheets 533. Two outer edges of the another two third contact sheets 533 slantwise extend outward and downward to form two additional third inclining sheets 532. Two outer edges of the two additional third inclining sheets 532 horizontally extend outward to form another two third covering sheets 535. Two outer edges of the another two third covering sheets 535 slantwise extend outward and upward to form two other third inclining sheets 532. Two outer edges of the two other third inclining sheets 532 horizontally extend outward to form two outermost third contact sheets 533.

The two opposite sides of the third main sheet 531 meander outward to form the third inclining sheets 532, the third contact sheets 533 and the third covering sheets 535 of the two third flank sheets 534 according to a quantity of the plurality of the third terminals 51. In the first preferred embodiment, each third flank sheet 534 of the third metal plate 53 has five third inclining sheets 532, three third contact sheets 533 and two third covering sheets 535, so the third metal plate 53 has one third main sheet 531, ten third inclining sheets 532, six third contact sheets 533 and four third covering sheets 535. Two opposite side edges of each third covering sheet 535 slantwise extend upward and sideward to form the two third inclining sheets 532. The two third inclining sheets 532 of each third covering sheet 535 are connected with two of the plurality of the third contact sheets 533. The two third inclining sheets 532 of each third covering sheet 535 are opposite to each other. Each two third inclining sheets 532 of the third metal plate 53 are opposite to each other.

From an inner side of each third flank sheet 534 to an outer side of each third flank sheet 534, each third flank sheet 534 sequentially has the third inclining sheet 532 connected with one side of the third main sheet 531, the third contact sheet 533 connected with the outer edge of the third inclining sheet 532 which is connected with the one side of the third main sheet 531, the third inclining sheet 532 connected with the outer edge of the third contact sheet 533, the third covering sheet 535 connected with the outer edge of the third inclining sheet 532 which is connected with the outer edge of the third contact sheet 533, the third inclining sheet 532 connected with the outer edge of the third covering sheet 535, the third contact sheet 533 connected with the outer edge of the third inclining sheet 532 which is connected with the outer edge of the third covering sheet 535, the third inclining sheet 532 connected with the outer edge of the third contact sheet 533, the third covering sheet 535 connected with the outer edge of the third inclining sheet 532 which is connected with the outer edge of the third contact sheet 533, the third inclining sheet 532 connected with the outer edge of the third covering sheet 535, and the third contact sheet 533 connected with the outer edge of the third inclining sheet 532.

Figure 21:
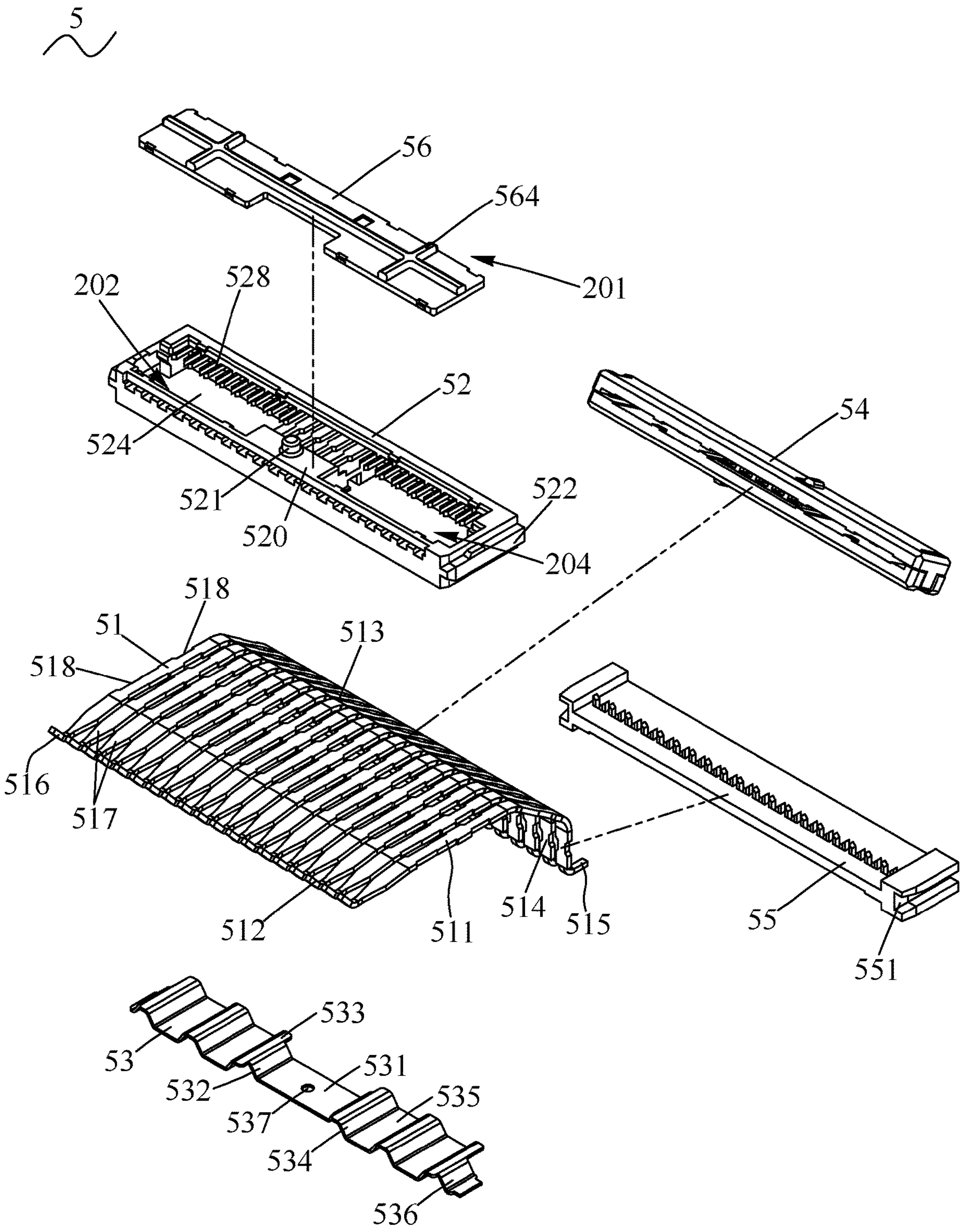
FIG. 21 is an exploded view of the third terminal assembly of the terminal module of the high-speed connector of FIG. 20.
Figure 22:
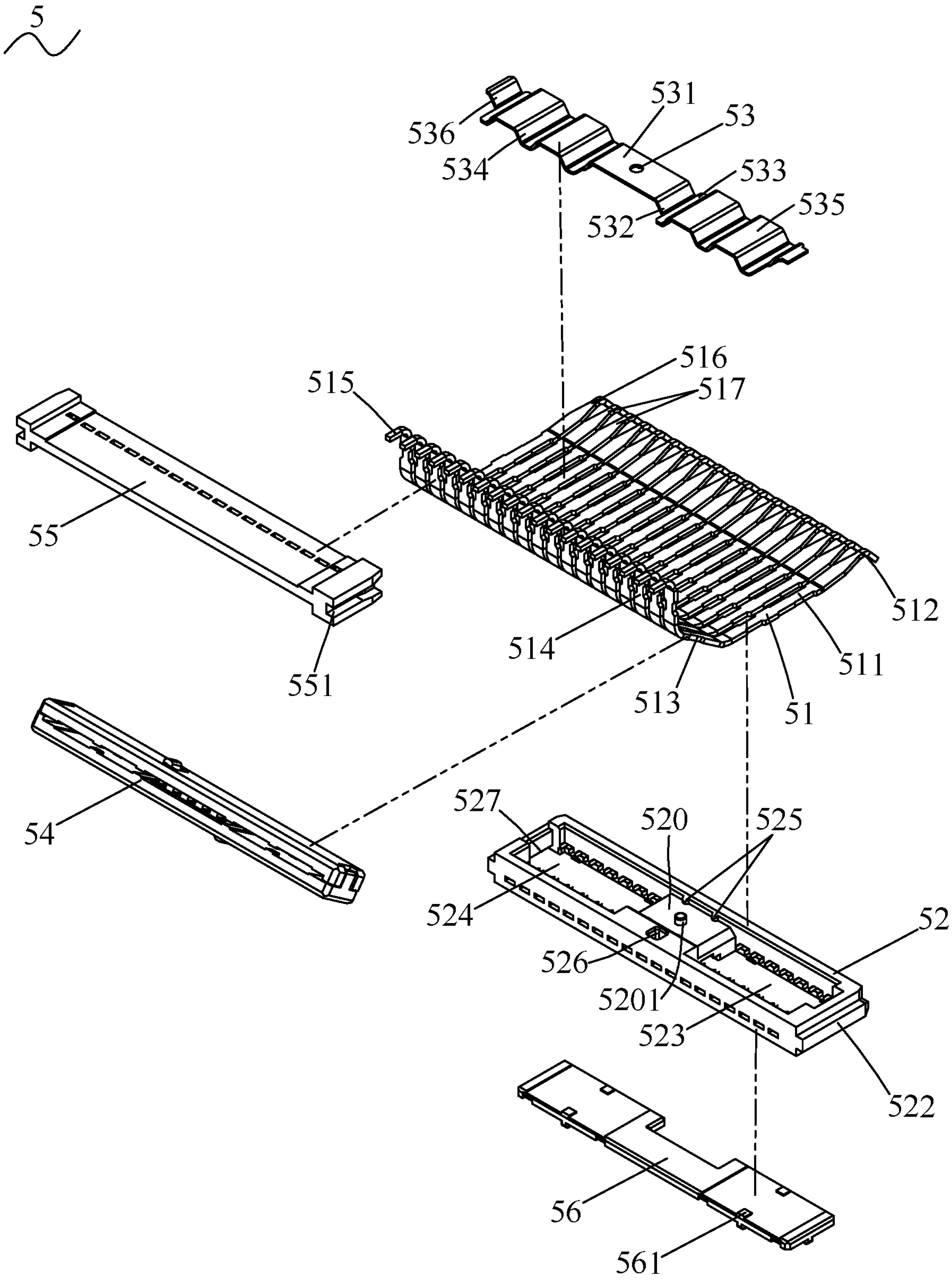
FIG. 22 is another exploded view of the third terminal assembly of the terminal module of the high-speed connector of FIG. 20.

Referring to FIG. 7 and FIG. 21, the third contact sheets 533 of the third metal plate 53 contact with the third fastening portions 511 of the third grounding terminals 516 the two sides of the third terminal assembly 5 to form the grounding structure 90. In this way, the signal noise is able to be effectively absorbed and the signal noise is able to be effectively restrained for improving the transmission quality of the high-frequency signal. The third covering sheets 535 of the third metal plate 53 keep distances from the third fastening portions 511 of the third differential signal terminals 517 of the third terminal assembly 5.

Two middles of two opposite outer sides of the two outermost third contact sheets 533 of the third metal plate 53 slantwise extend outward and downward, and then are bent outward to form the two third restricting portions 536. A quantity of the third restricting portions 536 of the third metal plate 53 is the same as a quantity of the third restricting holes 527 of the third base body 52. The two third restricting portions 536 are buckled in the two third restricting holes 527, so the third metal plate 53 is fastened in the third base body 52. A middle of the third main sheet 531 of the third metal plate 53 has the third perforation 537 vertically penetrating through a top surface and a bottom surface of the third main sheet 531. The second fastening pillar 5201 of the third surrounding portion 520 of the third base body 52 is fastened in the third perforation 537, so that the third metal plate 53 is located to the third base body 52, and the third metal plate 53 is fastened to the third base body 52.

Figure 23:
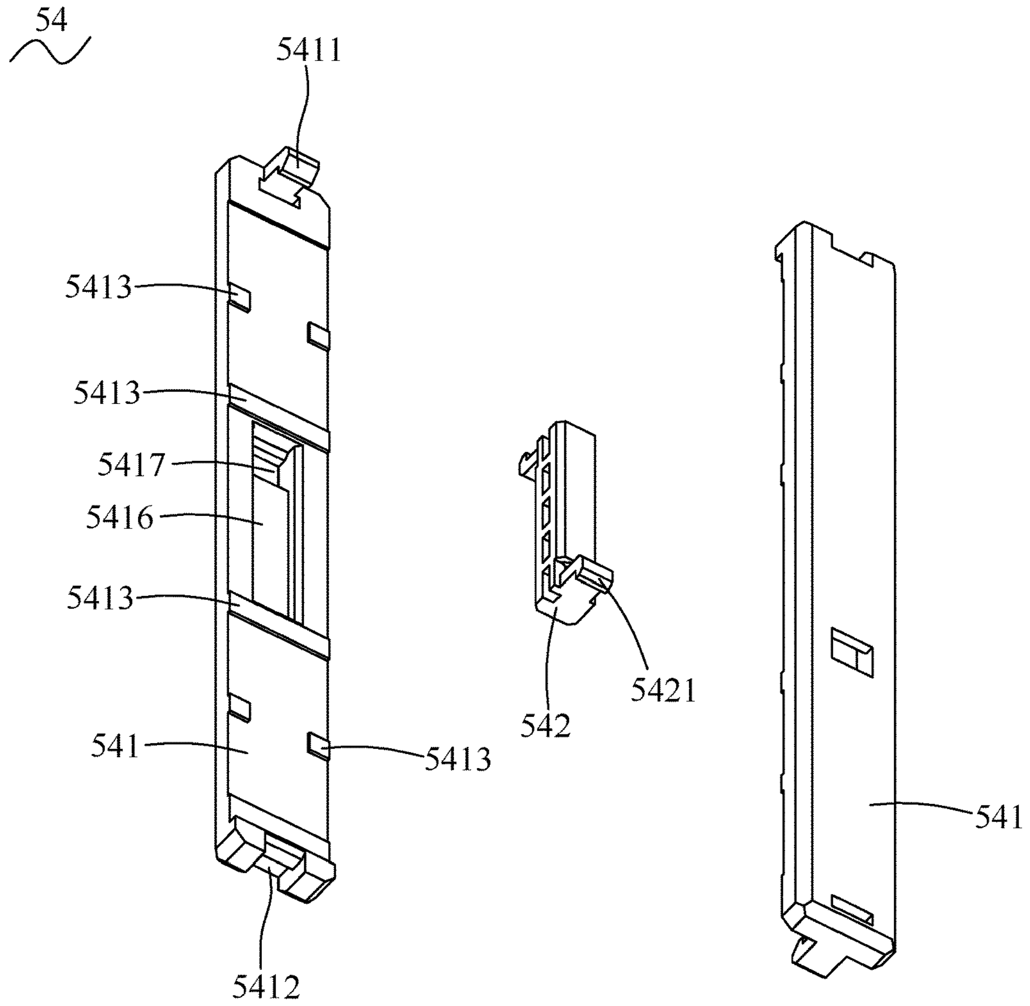
FIG. 23 is an exploded view of a second dielectric structure of the third terminal assembly of the terminal module of the high-speed connector of FIG. 20.
Figure 24:
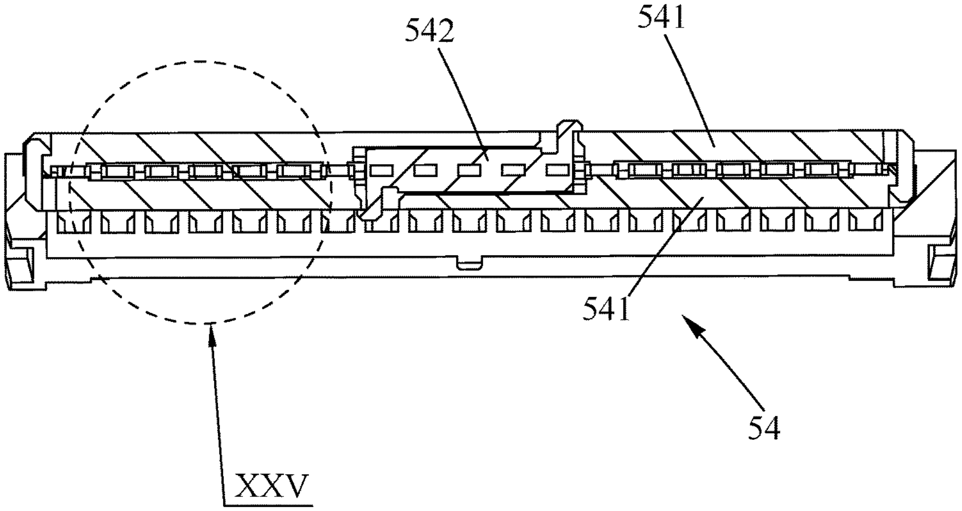
FIG. 24 is a sectional view of the high-speed connector along a line C-C of FIG. 20.
Figure 25:
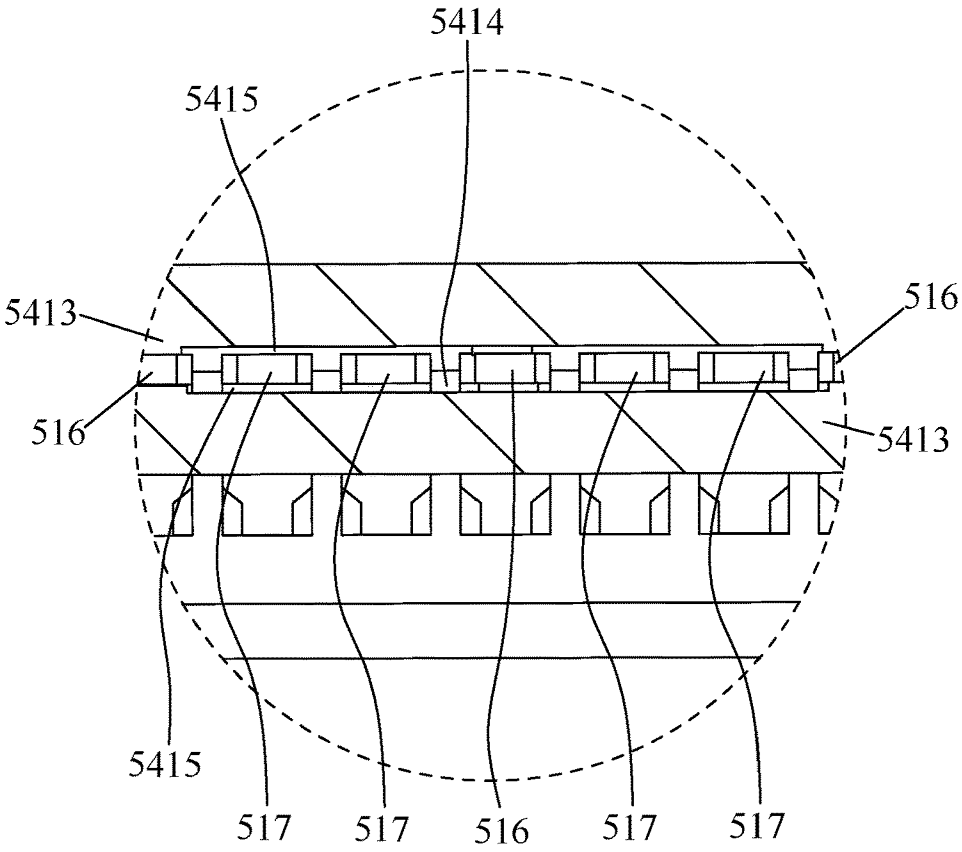
FIG. 25 is an enlarged view of an encircled portion XXV of the high-speed connector of FIG. 24.

Referring to FIG. 23 to FIG. 25, the second dielectric structure 54 includes two second covers 541 and a second fastening structure 542. In one condition, structures of the two second covers 541 are the same. In another condition, the two second covers 541 are symmetrical. The two second covers 541 are disposed opposite to each other. The second fastening structure 542 is disposed between the two second covers 541. Two sides of the second fastening structure 542 penetrate through the two second covers 541. The two second covers 541 and the second fastening structure 542 are buckled in a whole. The two second covers 541 are buckled by the second fastening structure 542 to form another entirety.

Each second cover 541 has a second extending foot 5411, a second notch 5412, a plurality of second attaching surfaces 5413 and a second internal space 5414. One side of each second cover 541 protrudes inward and perpendicular to each second cover 541 to form the second extending foot 5411. The other side of each second cover 541 has the second notch 5412 penetrating through an outer surface, an inner surface and the other side surface of each second cover 541. Each second extending foot 5411 is disposed corresponding to one second notch 5412. The two second extending feet 5411 of the two second covers 541 are buckled with the two second notches 5412 of the two second covers 541.

Two sides of the inner surface of each second cover 541 has the plurality of the second attaching surfaces 5413 protruded beyond the inner surface of each second cover 541. The second attaching surfaces 5413 of one second cover 541 face the second attaching surfaces 5413 of the other second cover 541. The second attaching surfaces 5413 of the two second covers 541 are spaced to form the second internal space 5414. The second extending portions 513 of the plurality of the third differential signal terminals 517 pass through the second internal space 5414. The second attaching surfaces 5413 of the two second covers 541 are corresponding to the second extending portions 513 of the third grounding terminals 516 of the two sides of the third terminal assembly 5. The second attaching surfaces 5413 of the two second covers 541 clamp the second extending portions 513 of the third grounding terminals 516 of the two sides of the third terminal assembly 5. The second attaching surfaces 5413 of the one second cover 541 are corresponding to upper surfaces of the second extending portions 513 of the third grounding terminals 516 of the two sides of the third terminal assembly 5, and the second attaching surfaces 5413 of the other second cover 541 are corresponding to lower surfaces of the second extending portions 513 of the third grounding terminals 516 of the two sides of the third terminal assembly 5. The second attaching surfaces 5413 of the one second cover 541 contact with the upper surfaces of the second extending portions 513 of the third grounding terminals 516 of the two sides of the third terminal assembly 5, and the second attaching surfaces 5413 of the other second cover 541 contact with the lower surfaces of the second extending portions 513 of the third grounding terminals 516 of the two sides of the third terminal assembly 5.

The upper surfaces and the lower surfaces of the second extending portions 513 of the third differential signal terminals 517 of the two sides of the third terminal assembly 5 are spaced from the two inner surfaces of the two second covers 541 to form two second gaps 5415. A plurality of the second gaps 5415 are formed among the third terminal assembly 5 and the two inner surfaces of the two second covers 541. The second internal space 5414 and the plurality of the second gaps 5415 of the second dielectric structure 54 are used for adjusting the dielectric coefficient of the peripheral structure of each third terminal 51 to improve an electromagnetic characteristic and the crosstalk interference of the high-speed connector 100.

A middle of the inner surface of each second cover 541 is recessed inward to from a second sunken portion 5416. The second sunken portion 5416 is used for receiving the second fastening structure 542. The second sunken portion 5416 of each second cover 541 has a second perforation 5417 penetrating through the inner surface and the outer surface of each second cover 541. Corresponding hooks of the second fastening structure 542 are disposed to the second perforations 5417 of the two second covers 541, and the corresponding hooks of the second fastening structure 542 are buckled to the two outer surfaces of the two second covers 541, so that the second fastening structure 542 is located between the two second covers 541, and the second fastening structure 542 is fastened between the two second covers 541.

One side of the second fastening structure 542 has a second buckling hook 5421. In the first preferred embodiment, two opposite sides of the second fastening structure 542 extend oppositely and then protrude oppositely to form two second buckling hooks 5421. A quantity of the second buckling hooks 5421 of the second fastening structure 542 is the same as a quantity of the second perforations 5417 of the two second covers 541. The second buckling hooks 5421 of the second fastening structure 542 are buckled in the second perforations 5417 of the two second covers 541, and the second buckling hooks 5421 of the second fastening structure 542 hook the two outer surfaces of the two second covers 541, so that the second fastening structure 542 is located between the two second covers 541, and the second fastening structure 542 is fastened between the two second covers 541. The second extending portions 513 of the third terminals 51 of a middle of the third terminal assembly 5 longitudinally pass through a middle of the second fastening structure 542.

Bottom ends of the plurality of the third terminals 51 are surrounded by the second holding element 55. The tail ends of the plurality of the second bending portions 514 of the plurality of the third terminals 51 are surrounded by the second holding element 55. Two opposite sides of the second holding element 55 are recessed inward to form the two second clamping slots 551. The two rear ends of the two protruding ribs 117 of the insulating housing 1 are clamped in the two second clamping slots 551 of the third terminal assembly 5, so that the third terminal assembly 5 is located to the insulating housing 1, and the third terminal assembly 5 is fastened to the insulating housing 1. Each second clamping slot 551 is shown as the horn shape, so that the two protruding ribs 117 of the insulating housing 1 are buckled in the two second clamping slots 551 conveniently.

When the terminal module 2 is assembled, the second holding element 55 is disposed in front of the first holding element 35, and the two second clamping slots 551 of the second holding element 55 are disposed in front of the two first clamping slots 351 of the first holding element 35. The two second clamping slots 551 of the second holding element 55 and the two first clamping slots 351 of the first holding element 35 are longitudinally aligned. Two rear ends of the two second clamping slots 551 of the second holding element 55 are connected with two front ends of the two first clamping slots 351 of the first holding element 35.

Figure 26:
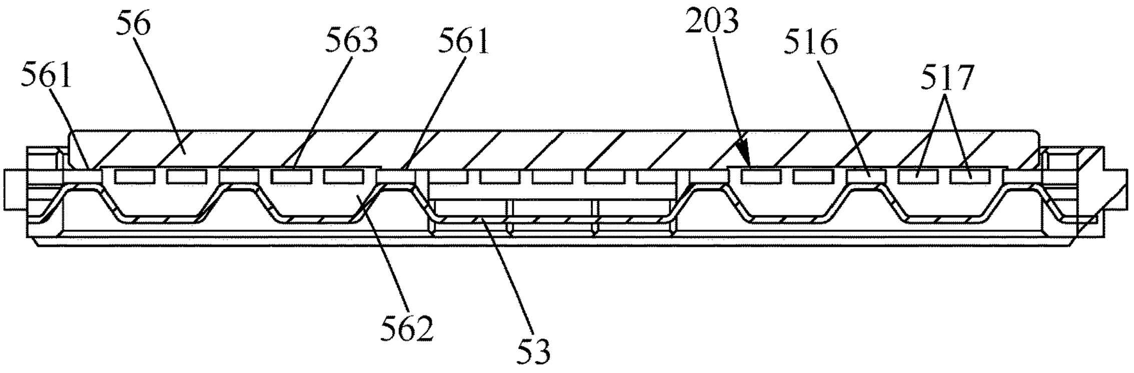
FIG. 26 is a sectional view of the high-speed connector along a line B-B of FIG. 19.
Figure 27:
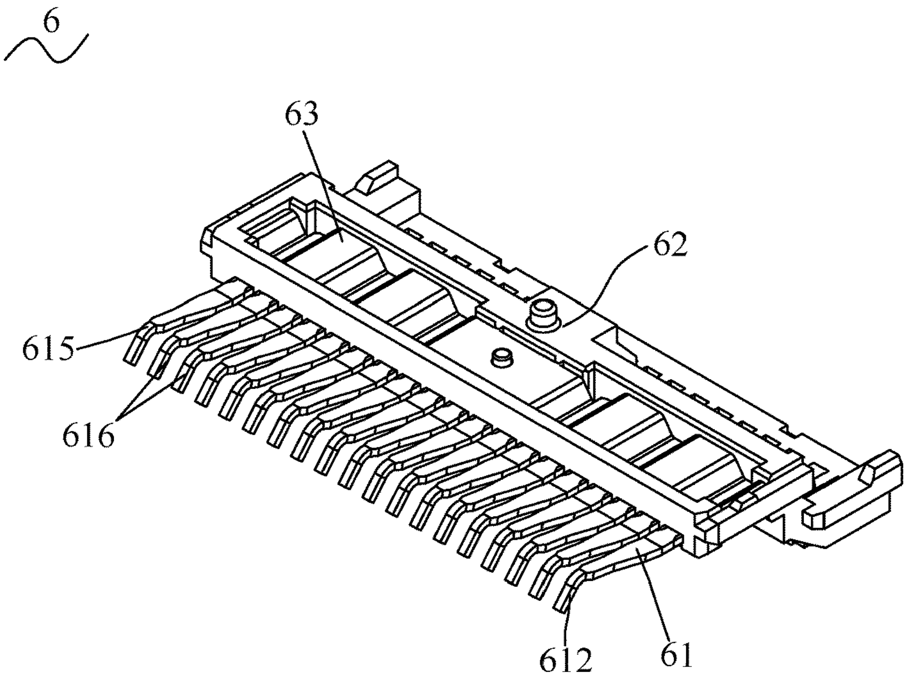
FIG. 27 is a perspective view of a fourth terminal assembly of the terminal module of the high-speed connector of FIG. 3.
Figure 28:
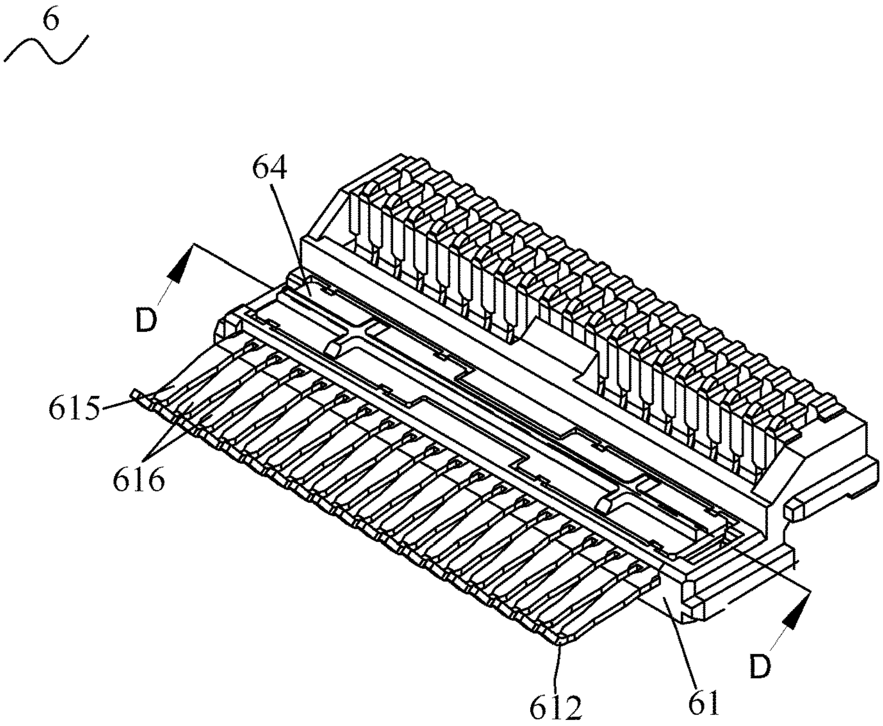
FIG. 28 is another perspective view of the fourth terminal assembly of the terminal module of the high-speed connector of FIG. 3.

Referring to FIG. 26, the first sheet structure 56 is formed by the plastic injection molding technology. The first sheet structure 56 is located in the first locating groove 204. An inner surface of the first sheet structure 56 has a plurality of third attaching surfaces 561. Several portions of two sides of a bottom surface of the first sheet structure 56 protrude downward to form the plurality of the third attaching surfaces 561. In the first preferred embodiment, the plurality of the third attaching surfaces 561 are corresponding to top surfaces of the third fastening portions 511 of the third grounding terminals 516 of the two sides of the third terminal assembly 5. The plurality of the third attaching surfaces 561 contact with the top surfaces of the third fastening portions 511 of the third grounding terminals 516 of the two sides of the third terminal assembly 5.

The first sheet structure 56 is spaced from the third metal plate 53. The third covering sheets 535 of the third metal plate 53 are spaced from the inner surface of the first sheet structure 56 to form a plurality of third internal spaces 562.

Each third internal space 562 is formed between the first sheet structure 56 and one third covering sheet 535 of the third metal plate 53. The third contact sheets 533 of the third metal plate 53 are corresponding to the plurality of the third attaching surfaces 561 of the first sheet structure 56. The third fastening portions 511 of each two third differential signal terminals 517 of the two sides of the third terminal assembly 5 pass through one third internal space 562. Top surfaces of the third fastening portions 511 of each two third differential signal terminals 517 of the two sides of the third terminal assembly 5 are spaced from the inner surface of the first sheet structure 56 to form a first clearance 563. A plurality of the first clearances 563 are formed between the third terminal assembly 5 and the inner surface of the first sheet structure 56. The third internal space 562 and the plurality of the first clearances 563 of the first sheet structure 56 are used for adjusting the dielectric coefficient of the peripheral structure of each third terminal 51 of the high-speed connector 100 to improve the electromagnetic characteristic and the crosstalk interference of the high-speed connector 100.

In the concrete implementation, according to a whole structure adjustment of the third terminal assembly 5, a size of the first clearance 563 is changed, and the first clearance 563 is even canceled. An outer surface of the first sheet structure 56 extends outward to form a first strengthening structure 564. The first strengthening structure 564 is used for reinforcing a structural strength of the first sheet structure 56. In the first preferred embodiment, two sides of the first strengthening structure 564 are shown as two cross structures from a vertical view to reinforce the structural strength of the first sheet structure 56.

Referring to FIG. 3 to FIG. 30, the fourth terminal assembly 6 is corresponding to the third terminal assembly 5 along the up-down direction. The fourth terminal assembly 6 is mounted under the third terminal assembly 5. The fourth terminal assembly 6 includes the plurality of the fourth terminals 61, a fourth base body 62, a fourth metal plate 63 and a second sheet structure 64. The plurality of the fourth terminals 61 are disposed between the fourth metal plate 63 and the second sheet structure 64. The plurality of the fourth terminals 61 are fastened to the fourth base body 62, and the plurality of the fourth terminals 61 are partially surrounded by the fourth base body 62. The fourth metal plate 63 is disposed in the fourth base body 62, and the fourth metal plate 63 is disposed under the plurality of the fourth terminals 61. The second sheet structure 64 is disposed in the fourth base body 62, and the plurality of the fourth terminals 61 are mounted under the second sheet structure 64. The second sheet structure 64 is used for adjusting the dielectric coefficient of a peripheral structure of each fourth terminal 61 to improve the crosstalk interference of the high-speed connector 100. A position of the second sheet structure 64 is corresponding to positions of the second soldering portions 414 of the plurality of the second terminals 41 of the second terminal assembly 4. A distance between a front of the second sheet structure 64 and the first terminal slots 13 of the insulating housing 1 is smaller than a distance between a front of the first sheet structure 56 and the first terminal slots 13 of the insulating housing 1 along a front-to-rear direction.

Each fourth terminal 61 has a fourth fastening portion 611, a fourth contacting portion 612, a third bending portion 613 and a fourth soldering portion 614. The plurality of the fourth terminals 61 include a plurality of fourth grounding terminals 615 and a plurality of fourth differential signal terminals 616. In the first preferred embodiment, the plurality of the fourth terminals 61 includes seven fourth grounding terminals 615 and twelve fourth differential signal terminals 616. Each two adjacent fourth differential signal terminals 616 are located between two fourth grounding terminals 615. Each fourth differential signal terminal 616 is used for transmitting the signal. The fourth fastening portion 611 of one fourth grounding terminal 615 and the fourth fastening portions 611 of four fourth differential signal terminals 616 are surrounded by a middle of the fourth base body 62.

A front end of the fourth fastening portion 611 extends frontward and then is arched upward to form the fourth contacting portion 612. A rear end of the fourth fastening portion 611 is bent downward to form the third bending portion 613. A tail end of the third bending portion 613 is bent rearward to form the fourth soldering portion 614. The fourth fastening portions 611 of the plurality of the fourth terminals 61 are fastened to the fourth base body 62. The fourth contacting portions 612 of the plurality of the fourth terminals 61 project beyond a front surface of the fourth base body 62. The fourth contacting portions 612 of the plurality of the fourth terminals 61 of the fourth terminal assembly 6 are disposed in the row of the third terminal slots 429 of the second terminal assembly 4. During the assembling process of the high-speed connector 100, the row of the third terminal slots 429 are used for preventing the fourth contacting portions 612 of the fourth terminal assembly 6 from tilting. The third bending portions 613 of the plurality of the fourth terminals 61 project beyond a rear surface of the fourth base body 62. Two opposite sides of the front end of each fourth fastening portion 611, two opposite sides of the rear end of each fourth fastening portion 611 and two opposite sides of each third bending portion 613 are recessed inward to from a plurality of fourth lacking grooves 617. Corresponding portions of the fourth base body 62 are fastened in the plurality of the fourth lacking grooves 617 of the fourth fastening portions 611 and the third bending portions 613 of the plurality of the fourth terminals 61.

The fourth base body 62 has a fourth surrounding portion 620, a second locating pillar 621, a plurality of fourth protruding portions 622, a fourth fastening groove 623, a plurality of fourth openings 624, a plurality of fourth contact surfaces 625, two fourth restricting holes 626 and a plurality of fourth connecting portions 627. The fourth surrounding portion 620 is disposed to the middle of the fourth base body 62, and the fourth surrounding portion 620 is connected between a front end and a rear end of the fourth base body 62. The fourth fastening portion 611 of the one fourth grounding terminal 615 and the fourth fastening portions 611 of the four fourth differential signal terminals 616 are surrounded by the fourth surrounding portion 620. A top surface of the fourth surrounding portion 620 of the fourth base body 62 extends upward to form the second locating pillar 621. The second locating pillar 621 of the fourth surrounding portion 620 of the fourth base body 62 is fastened in the second location hole 526 of the third base body 52 of the third terminal assembly 5, so that the fourth terminal assembly 6 is located to third terminal assembly 5, and the fourth terminal assembly 6 is fastened to third terminal assembly 5.

In the first preferred embodiment, several portions of two opposite sides of the fourth base body 62 extend outward to form the plurality of the fourth protruding portions 622. The plurality of the fourth protruding portions 622 are arranged in two rows along the front-to-rear direction. A front row of the fourth protruding portions 622 are located above a rear row of the fourth protruding portions 622. The fourth protruding portions 622 of the fourth base body 62 are buckled in the two second locating slots 114 and the two fourth locating slots 116 of the insulating housing 1, so that the fourth terminal assembly 6 is located to the insulating housing 1, and the fourth terminal assembly 6 is fastened to the insulating housing 1. A middle of a top surface of the front end of the fourth base body 62 is recessed downward to form the fourth fastening groove 623. A middle of a bottom surface of the front end of the fourth base body 62 is recessed inward to form a second locating groove 205. The fourth metal plate 63 is disposed in the fourth fastening groove 623 of the fourth base body 62. The fourth base body 62 has four fourth openings 624. The front end of the fourth base body 62 has two fourth openings 624, and the rear end of the fourth base body 62 has the other two fourth openings 624. Two bottoms of two sides of the fourth fastening groove 623 extend downward to form the two fourth openings 624 penetrating through two sides of the bottom surface of the front end of the fourth base body 62. The other two fourth openings 624 of the rear end of the fourth base body 62 penetrate through two sides of a top surface and two sides of a bottom surface of the rear end of the fourth base body 62. The fourth fastening portions 611 of the plurality of the fourth grounding terminals 615 and the fourth differential signal terminals 616 of two sides of the fourth terminal assembly 6 are exposed to the two fourth openings 624 of the front end of the fourth base body 62. The fourth fastening portions 611 of the plurality of the fourth grounding terminals 615 and the fourth differential signal terminals 616 of the two sides of the fourth terminal assembly 6 are exposed to the fourth fastening groove 623 from the two fourth openings 624 of the front end of the fourth base body 62. The third bending portions 613 of the plurality of the fourth grounding terminals 615 and the fourth differential signal terminals 616 are exposed to the two fourth openings 624 of the rear end of the fourth base body 62.

A front end of the fourth surrounding portion 620 is located between the two fourth openings 624 of the front end of the fourth base body 62. A rear end of the fourth surrounding portion 620 is located between the other two fourth openings 624 of the rear end of the fourth base body 62. In the first preferred embodiment, the four fourth openings 624 of the fourth base body 62 are formed to two sides of the fourth surrounding portion 620. A front of the bottom surface of the front end of the fourth base body 62 of the fourth terminal assembly 6 abuts against the supporting portion 426 of the second base body 42.

Several portions of a front end and a rear end of an upper surface of the fourth surrounding portion 620 of the fourth base body 62 extend upward to form the plurality of the fourth contact surfaces 625. The plurality of the fourth contact surfaces 625 are connected with the front end and the rear end of the fourth base body 62. The fourth contact surfaces 625 of the front end of the fourth base body 62 and the fourth contact surfaces 625 of the rear end of the fourth base body 62 are arched face to face. The plurality of the fourth contact surfaces 625 are used for fastening the fourth metal plate 63. The two fourth restricting holes 626 vertically penetrate through two sides of the top surface and the two sides of the bottom surface of the front end of the fourth base body 62. Two fourth restricting portions 636 of the fourth metal plate 63 are disposed in the two fourth restricting holes 626, so that the fourth metal plate 63 is located to the fourth base body 62, and the fourth metal plate 63 is fastened to the fourth base body 62.

A lower portion of the fourth base body 62 has the plurality of the fourth connecting portions 627. The plurality of the fourth connecting portions 627 are longitudinally arranged in three rows. Each row of the fourth connecting portions 627 are arranged transversely. Each fourth connecting portion 627 is disposed between two fourth terminals 61. The plurality of the fourth connecting portions 627 are used to simplify the mold manufacturing process. In the first preferred embodiment, the plurality of the fourth connecting portions 627 are embedded in the fourth lacking grooves 617 of the fourth fastening portions 611 and the third bending portions 613 of the plurality of the fourth terminals 61. A middle of the top surface of the fourth surrounding portion 620 of the fourth base body 62 extends upward to from a third fastening pillar 6201. The third fastening pillar 6201 is used for fastening the fourth metal plate 63. The third fastening pillar 6201 is corresponding to a corresponding fifth perforation 637 of the fourth metal plate 63.

The fourth metal plate 63 is disposed in the fourth fastening groove 623 of the fourth base body 62. The plurality of the fourth terminals 61 are mounted under the fourth metal plate 63. The fourth metal plate 63 has a rectangular fourth main sheet 631, a plurality of fourth inclining sheets 632, a plurality of fourth contact sheets 633, a plurality of fourth covering sheets 635 and two fourth restricting portions 636.

A position of the fourth main sheet 631 is corresponding to a position of the fourth surrounding portion 620 of the fourth base body 62. The plurality of the fourth contact surfaces 625 abut against a front edge and a rear edge of the fourth main sheet 631. In the concrete implementation, the fourth main sheet 631 is directly fastened to the fourth surrounding portion 620 of the fourth base body 62. Two opposite sides of the fourth main sheet 631 form two fourth flank sheets 634. Each fourth flank sheet 634 is wavy. Each fourth flank sheet 634 has the plurality of the fourth inclining sheets 632, the plurality of the fourth contact sheets 633 and the plurality of the fourth covering sheets 635.

The two opposite sides of the fourth main sheet 631 slantwise extend outward and downward to form two of the plurality of the fourth inclining sheets 632. The two of the plurality of the fourth inclining sheets 632 are corresponding to two outer surfaces of the fourth surrounding portion 620 of the fourth base body 62. The two of the plurality of the fourth inclining sheets 632 are covered to the two outer surfaces of the fourth surrounding portion 620 of the fourth base body 62. Two outer edges of the two of the plurality of the fourth inclining sheets 632 horizontally extend outward to form two fourth contact sheets 633. Each fourth contact sheet 633 and the fourth main sheet 631 are horizontally disposed. Each fourth contact sheet 633 is parallel to the fourth main sheet 631. Two outer edges of the two fourth contact sheets 633 slantwise extend outward and upward to form another two of the plurality of the fourth inclining sheets 632. The another two of the plurality of the fourth inclining sheets 632 of the two outer edges of the two fourth contact sheets 633 are opposite to each other. Two outer edges of the another two of the plurality of the fourth inclining sheets 632 horizontally extend outward to form two fourth covering sheets 635. Each fourth covering sheet 635 and the fourth main sheet 631 are horizontally disposed. Each fourth covering sheet 635 and the fourth main sheet 631 are disposed at the same level. Two outer edges of the two fourth covering sheets 635 slantwise extend outward and downward to form two extra fourth inclining sheets 632. Two outer edges of the two extra fourth inclining sheets 632 horizontally extend oppositely to form another two fourth contact sheets 633. Two outer edges of the another two fourth contact sheets 633 slantwise extend outward and upward to form two additional fourth inclining sheets 632.

Two outer edges of the two additional fourth inclining sheets 632 horizontally extend outward to form another two fourth covering sheets 635. Two outer edges of the another two fourth covering sheets 635 slantwise extend outward and downward to form two other fourth inclining sheets 632. Two outer edges of the two other fourth inclining sheets 632 horizontally extend outward to form two outermost fourth contact sheets 633.

The two opposite sides of the fourth main sheet 631 meander outward to form the fourth inclining sheets 632, the fourth contact sheets 633 and the fourth covering sheets 635 of the two fourth flank sheets 634 according to a quantity of the plurality of the fourth terminals 61. In the first preferred embodiment, each fourth flank sheet 634 of the fourth metal plate 63 has five fourth inclining sheets 632, three fourth contact sheets 633 and two fourth covering sheets 635, so the fourth metal plate 63 has one fourth main sheet 631, ten fourth inclining sheets 632, six fourth contact sheets 633 and four fourth covering sheets 635. Two opposite side edges of each fourth covering sheet 635 slantwise extend downward and sideward to form the two fourth inclining sheets 632. The two fourth inclining sheets 632 of each fourth covering sheet 635 are connected with two of the plurality of the fourth contact sheets 633. The two fourth inclining sheets 632 of each fourth covering sheet 635 are opposite to each other. Each two fourth inclining sheets 632 of the fourth metal plate 63 are opposite to each other.

From an inner side of each fourth flank sheet 634 to an outer side of each fourth flank sheet 634, each fourth flank sheet 634 sequentially has the fourth inclining sheet 632 connected with one side of the fourth main sheet 631, the fourth contact sheet 633 connected with the outer edge of the fourth inclining sheet 632 which is connected with the one side of the fourth main sheet 631, the fourth inclining sheet 632 connected with the outer edge of the fourth contact sheet 633, the fourth covering sheet 635 connected with the outer edge of the fourth inclining sheet 632 which is connected with the outer edge of the fourth contact sheet 633, the fourth inclining sheet 632 connected with the outer edge of the fourth covering sheet 635, the fourth contact sheet 633 connected with the outer edge of the fourth inclining sheet 632 which is connected with the outer edge of the fourth covering sheet 635, the fourth inclining sheet 632 connected with the outer edge of the fourth contact sheet 633, the fourth covering sheet 635 connected with the outer edge of the fourth inclining sheet 632 which is connected with the outer edge of the fourth contact sheet 633, the fourth inclining sheet 632 connected with the outer edge of the fourth covering sheet 635, and the fourth contact sheet 633 connected with the outer edge of the fourth inclining sheet 632.

Figure 29:
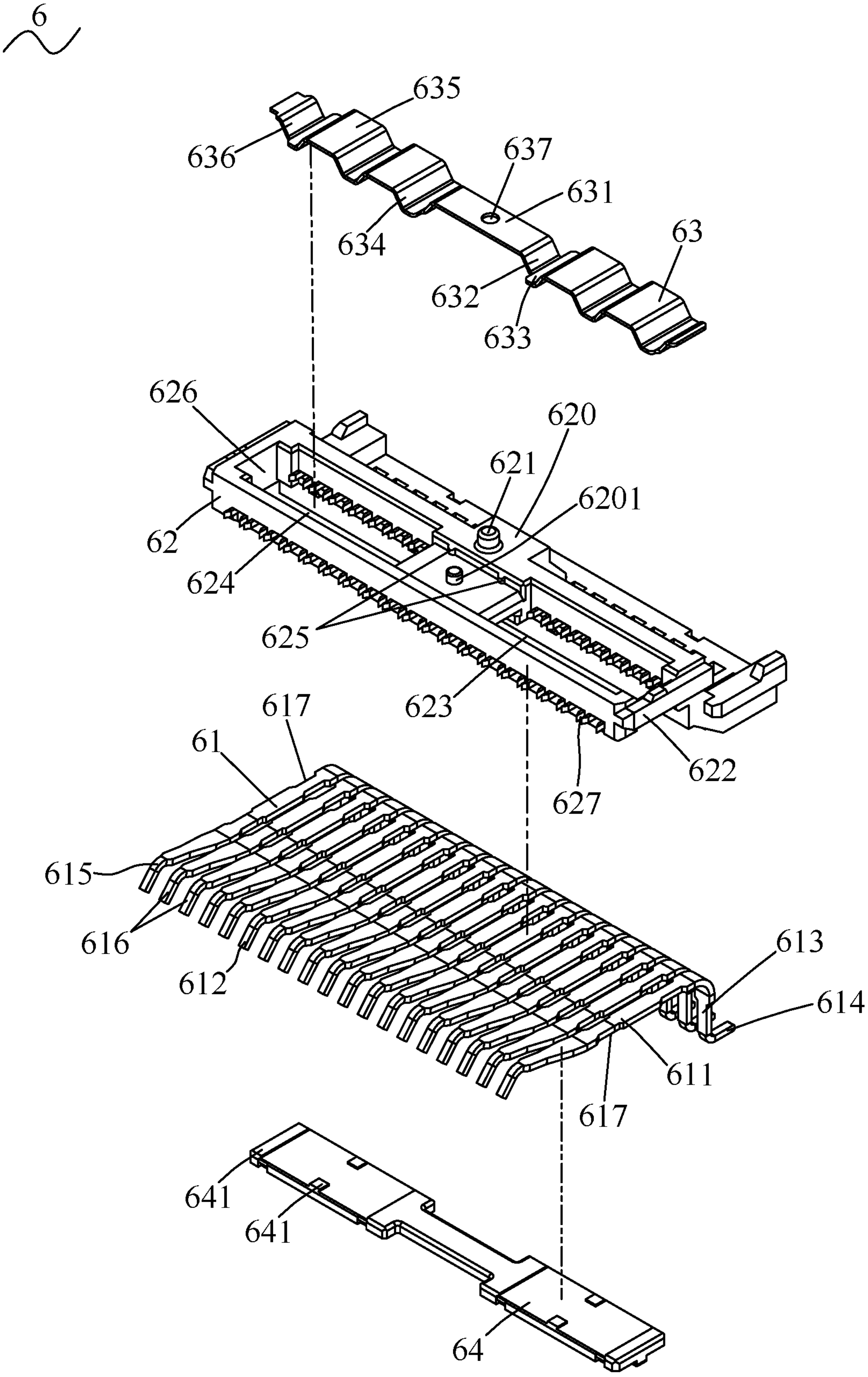
FIG. 29 is an exploded view of the fourth terminal assembly of the terminal module of the high-speed connector of FIG. 28.
Figure 30:
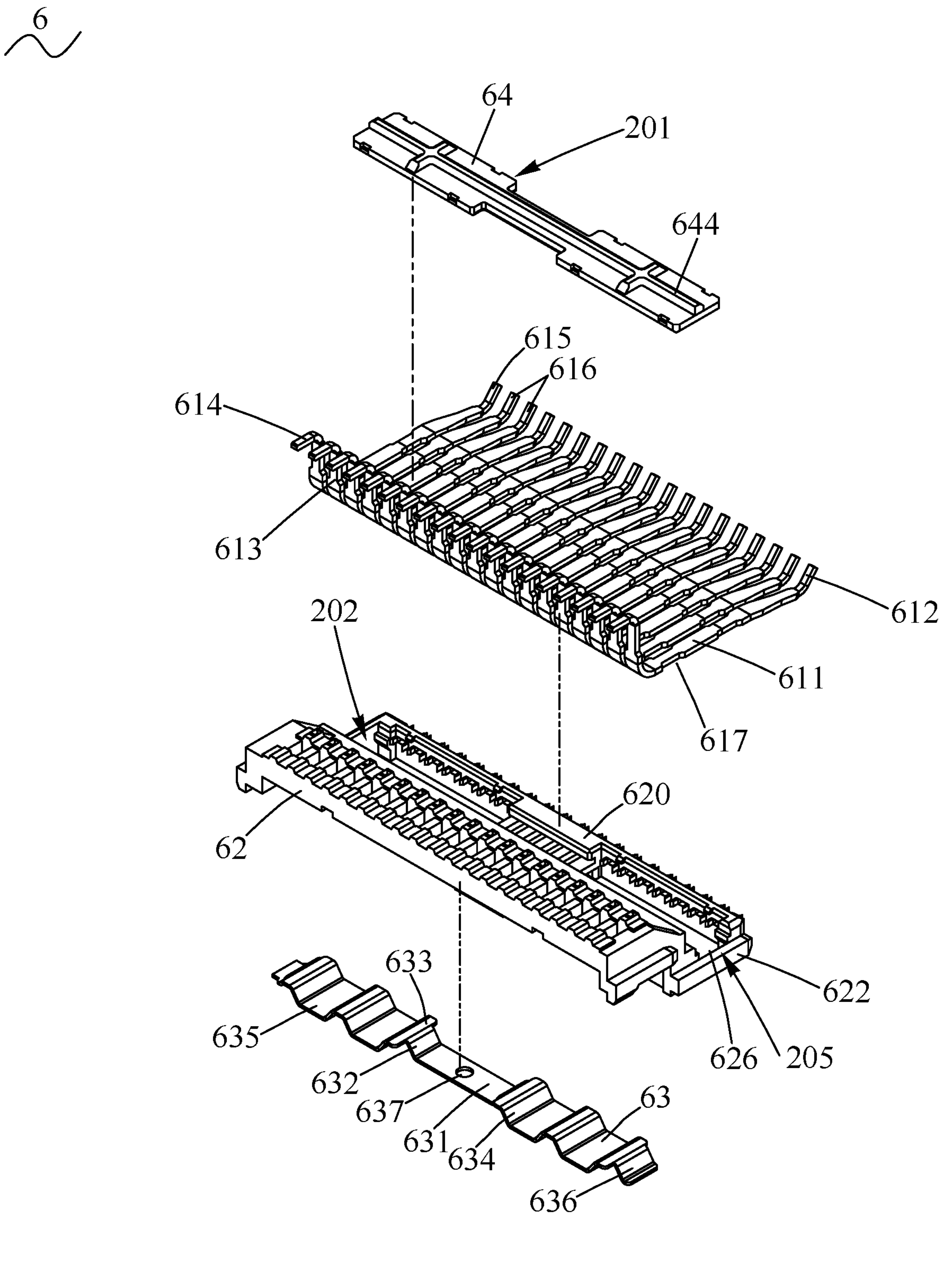
FIG. 30 is another exploded view of the fourth terminal assembly of the terminal module of the high-speed connector of FIG. 28.
Figure 31:
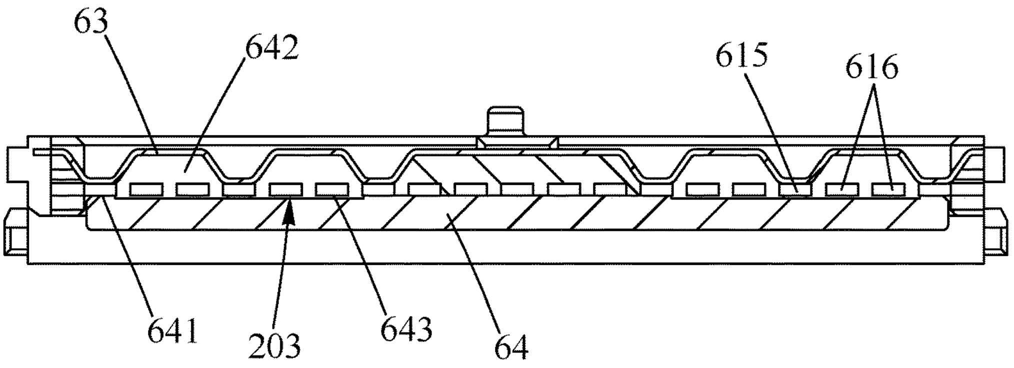
FIG. 31 is a sectional view of the high-speed connector along a line D-D of FIG. 28.

Referring to FIG. 7 and FIG. 29, the fourth contact sheets 633 of the fourth metal plate 63 contact with the fourth fastening portions 611 of the plurality of the fourth grounding terminals 615 of the plurality of the fourth terminals 61 of the two sides of the fourth terminal assembly 6 to form the grounding structure 90. In this way, the signal noise is able to be effectively absorbed and the signal noise is able to be effectively restrained for improving the transmission quality of the high-frequency signal. The fourth covering sheets 635 of the fourth metal plate 63 keep distances from the fourth fastening portions 611 of the fourth differential signal terminals 616 of the fourth terminal assembly 6.

Two middles of two opposite outer sides of the two outermost fourth contact sheets 633 of the fourth metal plate 63 slantwise extend outward and upward, and then are bent outward to form the two fourth restricting portions 636. A quantity of the fourth restricting portions 636 of the fourth metal plate 63 are the same as a quantity of the fourth restricting holes 626 of the fourth base body 62. The two fourth restricting portions 636 are buckled in the two fourth restricting holes 626, so the fourth metal plate 63 is fastened in the fourth base body 62. A middle of the fourth main sheet 631 of the fourth metal plate 63 has the fifth perforation 637 vertically penetrating through a top surface and a bottom surface of the fourth main sheet 631. The third fastening pillar 6201 of the fourth surrounding portion 620 of the fourth base body 62 is fastened in the fifth perforation 637, so that the fourth metal plate 63 is located to the fourth base body 62, and the fourth metal plate 63 is fastened to the fourth base body 62.

Referring to FIG. 27 to FIG. 31, the second sheet structure 64 is formed by the plastic injection molding technology. The second sheet structure 64 is located in the second locating groove 205. An inner surface of the second sheet structure 64 has a plurality of fourth attaching surfaces 641. Several portions of two sides of a top surface of the second sheet structure 64 protrude upward to form the plurality of the fourth attaching surfaces 641. In the first preferred embodiment, the plurality of the fourth attaching surfaces 641 are corresponding to bottom surfaces of the fourth fastening portions 611 of the fourth grounding terminals 615 of the two sides of the fourth terminal assembly 6. The plurality of the fourth attaching surfaces 641 contact with the bottom surfaces of the fourth fastening portions 611 of the fourth grounding terminals 615 of the two sides of the fourth terminal assembly 6.

The second sheet structure 64 is spaced from the fourth metal plate 63. The fourth covering sheets 635 of the fourth metal plate 63 are spaced from the inner surface of the second sheet structure 64 to form a plurality of fourth internal spaces 642. Each fourth internal space 642 is formed between the second sheet structure 64 and one fourth covering sheet 635 of the fourth metal plate 63. The fourth contact sheets 633 of the fourth metal plate 63 are corresponding to the plurality of the fourth attaching surfaces 641 of the second sheet structure 64. The fourth fastening portions 611 of each two fourth differential signal terminals 616 of the two sides of the fourth terminal assembly 6 pass through one fourth internal space 642. Bottom surfaces of the fourth fastening portions 611 of each two fourth differential signal terminals 616 of the two sides of the fourth terminal assembly 6 are spaced from the inner surface of the second sheet structure 64 to form a second clearance 643. A plurality of the second clearances 643 are formed between the fourth terminal assembly 6 and the inner surface of the second sheet structure 64. The fourth internal space 642 and the plurality of the second clearances 643 of the second sheet structure 64 are used for adjusting the dielectric coefficient of a peripheral structure of each fourth terminal 61 of the high-speed connector 100 to improve the electromagnetic characteristic and the crosstalk interference of the high-speed connector 100.

In the concrete implementation, according to a whole structure adjustment of the fourth terminal assembly 6, a size of the second clearance 643 is changed, and the second clearance 643 is even canceled. An outer surface of the second sheet structure 64 extends outward to form a second strengthening structure 644. The second strengthening structure 644 is used for reinforcing a structural strength of the second sheet structure 64. In the first preferred embodiment, two sides of the second strengthening structure 644 are shown as the two cross structures from an upward view to reinforce the structural strength of the second sheet structure 64.

Referring to FIG. 3 to FIG. 31, in the first preferred embodiment, the first holding element 35 of the first terminal assembly 3 abuts against a rear end of the second holding element 55 of the third terminal assembly 5. The rear end of the fourth base body 62 abuts against a front end of the second holding element 55 of the third terminal assembly 5. The bottom surface of the third base body 52 of the third terminal assembly 5 abuts against the top surface of the front end of the fourth base body 62 of the fourth terminal assembly 6. The bottom surface of the front end of the fourth base body 62 of the fourth terminal assembly 6 abuts against a top surface of the rear end of the second base body 42 of the second terminal assembly 4.

Figure 32:
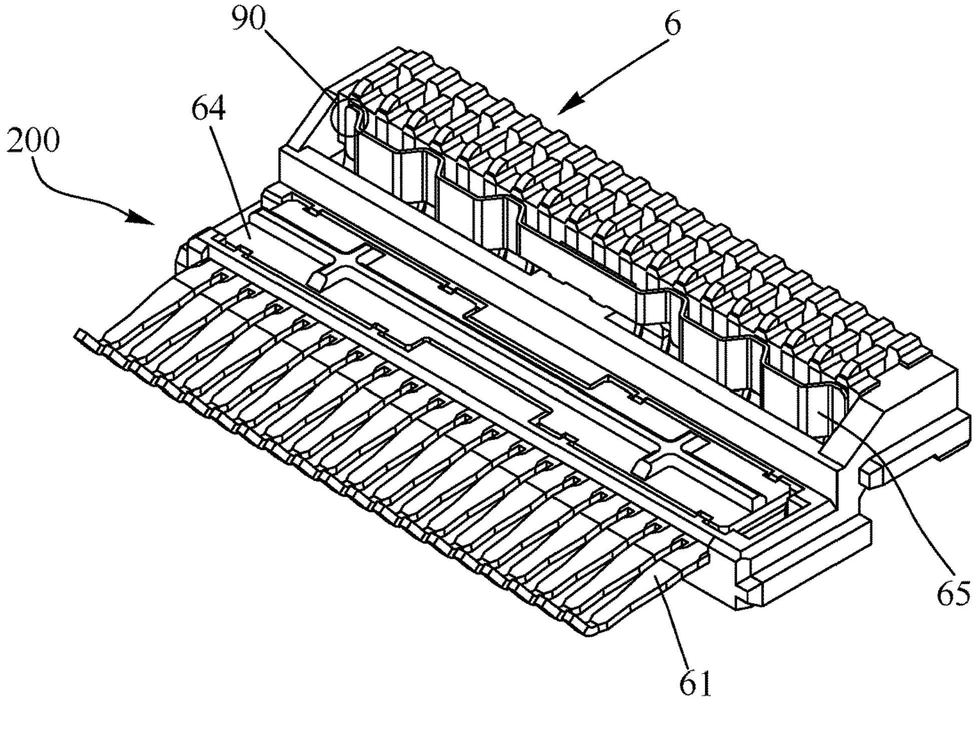
FIG. 32 is a perspective view of the fourth terminal assembly of the terminal module of the high-speed connector in accordance with a second preferred embodiment of the present invention.
Figure 33:
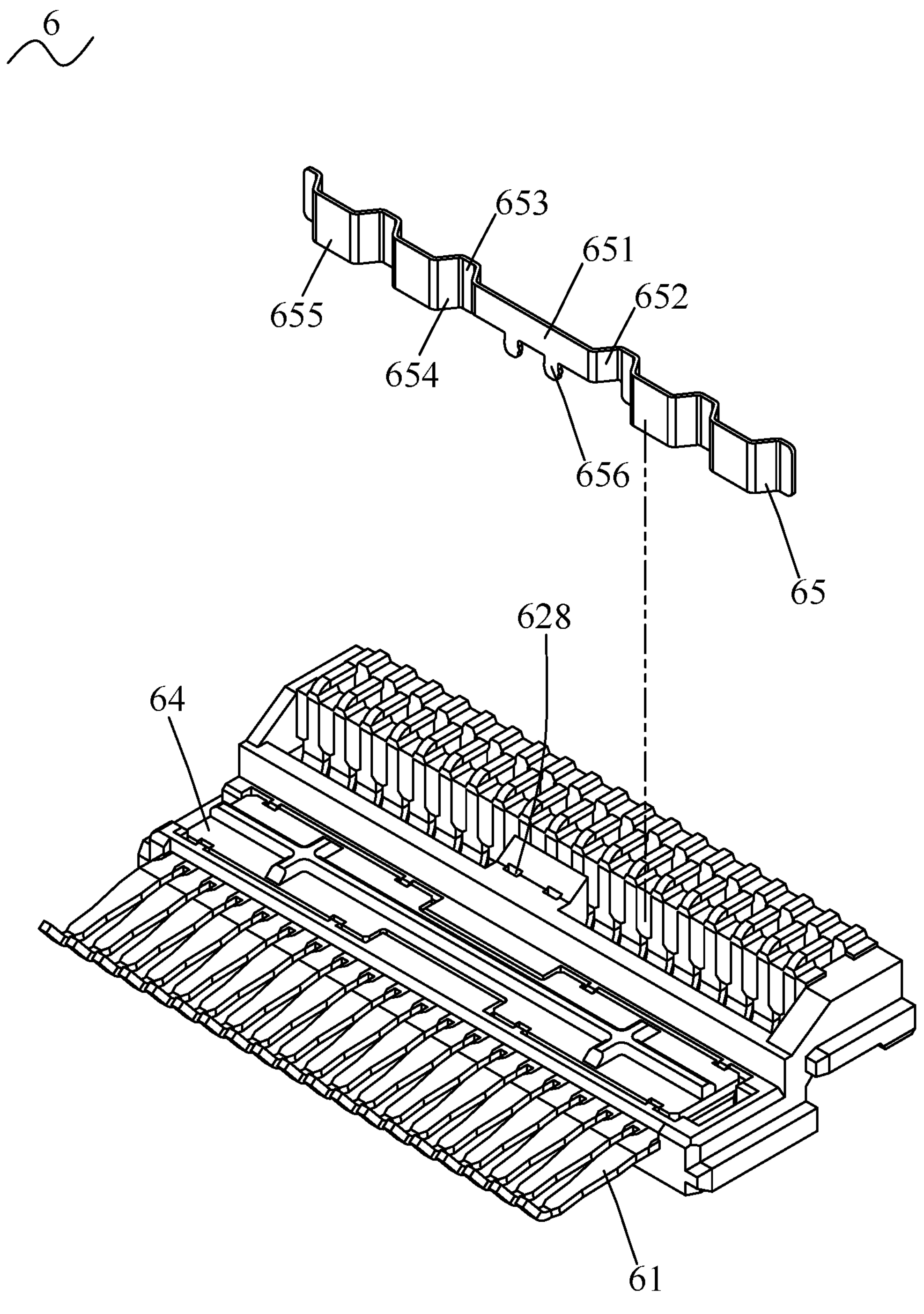
FIG. 33 is a partially exploded view of the fourth terminal assembly of the terminal module of the high-speed connector in accordance with the second preferred embodiment of the present invention.
Figure 34:
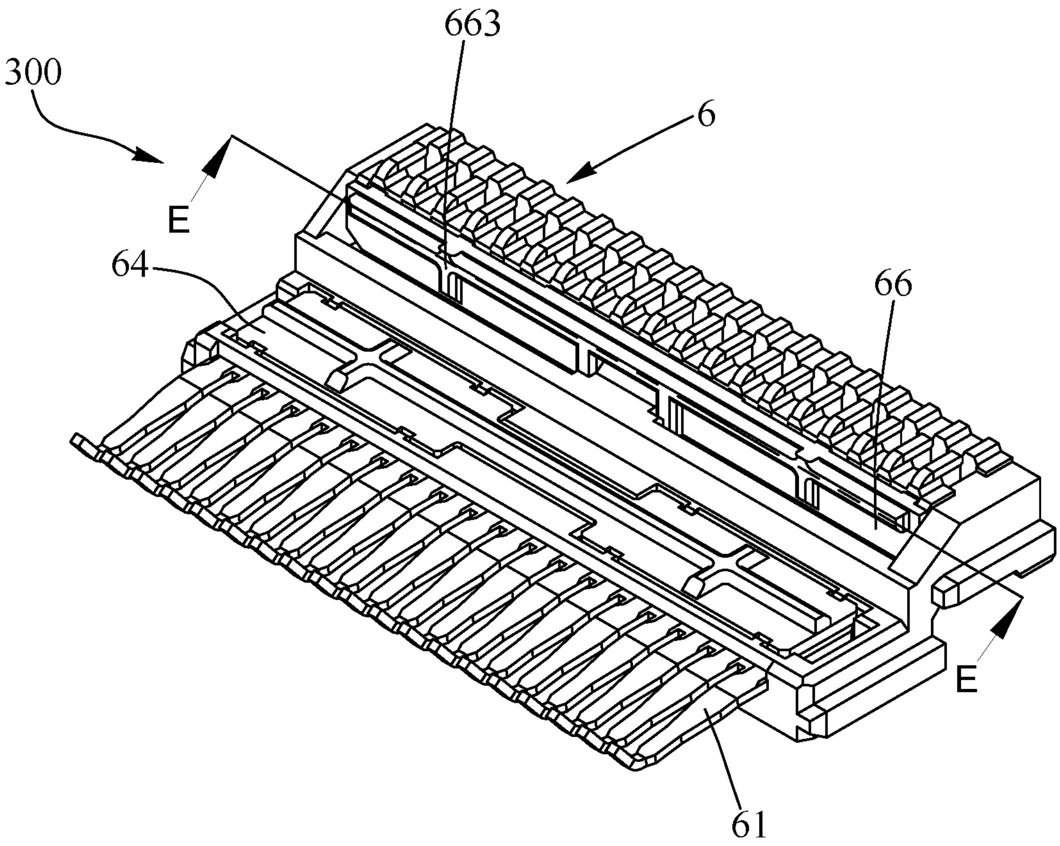
FIG. 34 is a perspective view of the fourth terminal assembly of the terminal module of the high-speed connector in accordance with a third preferred embodiment of the present invention.
Figure 35:
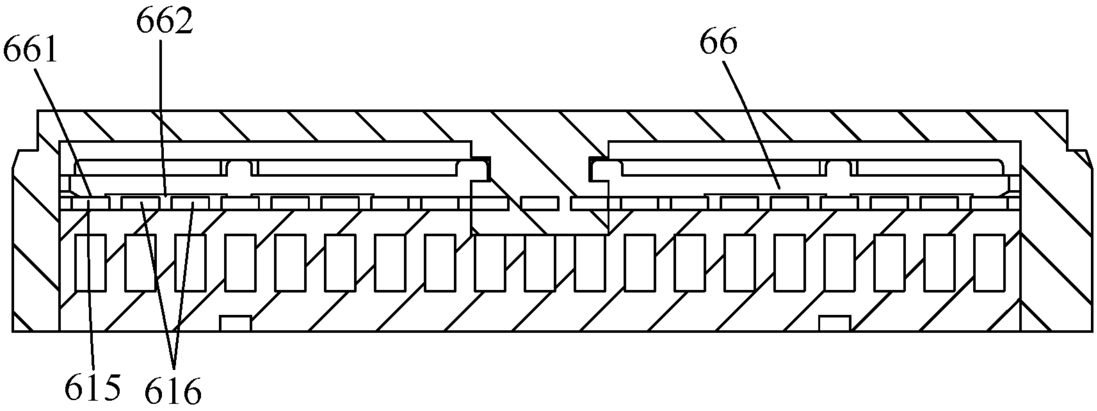
FIG. 35 is a sectional view of the high-speed connector along a line E-E of FIG. 34.

Referring to FIG. 1, FIG. 32 and FIG. 33, a high-speed connector 200 in accordance with a second preferred embodiment of the present invention is shown. Differences between the high-speed connector 100 in accordance with the first preferred embodiment and the high-speed connector 200 in accordance with the second preferred embodiment are described as follows.

In the second preferred embodiment, the fourth terminal assembly 6 further includes a metal structure 65. The metal structure 65 is disposed in a front of the rear end of the fourth base body 62. The metal structure 65 is disposed in front of the third bending portions 613 of the plurality of the fourth terminals 61. The metal structure 65 has a main plate 651, a plurality of inclining plates 652, a plurality of contacting plates 653, a plurality of covering plates 655 and a locating plate 656. Specifically, the metal structure 65 has two locating plates 656.

The main plate 651 is disposed corresponding to the third bending portions 613 of the fourth terminals 61 of a middle of the fourth terminal assembly 6. The main plate 651 is located in front of the third bending portions 613 of the fourth terminals 61 of the middle of the fourth terminal assembly 6. Two opposite sides of the main plate 651 form two lateral plates 654. Each lateral plate 654 is wavy. Each lateral plate 654 has the plurality of the inclining plates 652, the plurality of the contacting plates 653 and the plurality of the covering plates 655.

The two opposite sides of the main plate 651 slantwise extend outward and rearward to form two of the plurality of the inclining plates 652. Two outer edges of the two of the plurality of the inclining plates 652 horizontally extend outward to form two contacting plates 653. Each contacting plate 653 and the main plate 651 are horizontally disposed. Each contacting plate 653 is parallel to the main plate 651. Two outer edges of the two contacting plates 653 slantwise extend outward and frontward to form another two of the plurality of the inclining plates 652. The another two of the plurality of the inclining plates 652 of the two outer edges of the two contacting plates 653 are opposite to each other. Two outer edges of the another two of the plurality of the inclining plates 652 horizontally extend outward to form two covering plates 655. Each covering plate 655 and the main plate 651 are horizontally disposed. Each covering plate 655 and the main plate 651 are disposed at the same level. Two outer edges of the two covering plates 655 slantwise extend outward and rearward to form two extra inclining plates 652. Two outer edges of the two extra inclining plates 652 horizontally extend oppositely to form another two contacting plates 653. Two outer edges of the another two contacting plates 653 slantwise extend outward and frontward to form two additional inclining plates 652. Two outer edges of the two additional inclining plates 652 horizontally extend outward to form another two covering plates 655. Two outer edges of the another two covering plates 655 slantwise extend outward and rearward to form two other inclining plates 652. Two outer edges of the two other inclining plates 652 horizontally extend outward to form two outermost contacting plates 653.

The two opposite sides of the main plate 651 meander outward to form the inclining plates 652, the contacting plates 653 and the covering plates 655 of the two lateral plates 654 according to a quantity of the plurality of the fourth terminals 61. In the second preferred embodiment, each lateral plate 654 of the fifth metal plate 65 has five inclining plates 652, three contacting plates 653 and two covering plates 655, so the metal structure 65 has one main plate 651, ten inclining plates 652, six contacting plates 653 and four covering plates 655. Two opposite side edges of each covering plate 655 slantwise extend sideward and rearward to form the two inclining plates 652. The two inclining plates 652 of each covering plate 655 are connected with two of the plurality of the contacting plates 653. The two inclining plates 652 of each covering plate 655 are opposite to each other. Each two inclining plates 652 of the metal structure 65 are opposite to each other.

From an inner side of each lateral plate 654 to an outer side of each lateral plate 654, each lateral plate 654 sequentially has the inclining plate 652 connected with one side of the main plate 651, the contacting plate 653 connected with the outer edge of the inclining plate 652 which is connected with the one side of the main plate 651, the inclining plate 652 connected with the outer edge of the contacting plate 653, the covering plate 655 connected with the outer edge of the inclining plate 652 which is connected with the outer edge of the contacting plate 653, the inclining plate 652 connected with the outer edge of the covering plate 655, the contacting plate 653 connected with the outer edge of the inclining plate 652 which is connected with the outer edge of the covering plate 655, the inclining plate 652 connected with the outer edge of the contacting plate 653, the covering plate 655 connected with the outer edge of the inclining plate 652 which is connected with the outer edge of the contacting plate 653, the inclining plate 652 connected with the outer edge of the covering plate 655, and the contacting plate 653 connected with the outer edge of the inclining plate 652.

The contacting plates 653 of the metal structure 65 are connected with front surfaces of the third bending portions 613 of the fourth grounding terminals 615 of the plurality of the fourth terminals 61 of the two sides of the fourth terminal assembly 6 to form the grounding structure 90. In this way, the signal noise is able to be effectively absorbed and the signal noise is able to be effectively restrained for improving the transmission quality of the high-frequency signal. The covering plates 655 of the metal structure 65 keep distances from the third bending portions 613 of the fourth differential signal terminals 616 of the fourth terminal assembly 6. A top end of the main plate 651 has the locating plate 656. The front of the rear end of the fourth base body 62 has a third location hole 628 penetrating through a bottom surface of the front of the rear end of the fourth base body 62. The locating plate 656 is fastened in the third location hole 628.

Specifically, the metal structure 65 has two locating plates 656, and the fourth base body 62 has two third location holes 628. The two locating plates 656 are fastened in the two third location holes 628.

Referring to FIG. 3 to FIG. 35, a high-speed connector 300 in accordance with a third preferred embodiment of the present invention is shown. Differences between the high-speed connector 100 in accordance with the first preferred embodiment and the high-speed connector 300 in accordance with the third preferred embodiment are described as follows.

In the third preferred embodiment, the fourth terminal assembly 6 further includes a blocking element 66. The blocking element 66 is disposed in the front of the rear end of the fourth base body 62. The blocking element 66 is disposed in front of the third bending portions 613 of the plurality of the fourth terminals 61. An inner surface of the blocking element 66 has a plurality of abutting surfaces 661. Several portions of two sides of the inner surface of the blocking element 66 protrude rearward to form the plurality of the abutting surfaces 661. The plurality of the abutting surfaces 661 are corresponding to the front surfaces of the third bending portions 613 of the fourth grounding terminals 615 of the two sides of the fourth terminal assembly 6. The plurality of the abutting surfaces 661 contact with the front surfaces of the third bending portions 613 of the fourth grounding terminals 615 of the two sides of the fourth terminal assembly 6.

The front surfaces of the third bending portions 613 of each two fourth differential signal terminals 616 of the two sides of the fourth terminal assembly 6 are spaced from the inner surface of the blocking element 66 to form an interstice 662. A plurality of the interstices 662 are formed between the fourth terminal assembly 6 and the inner surface of the blocking element 66. The plurality of the interstices 662 are used for adjusting the dielectric coefficient of the peripheral structure of each fourth terminal 61 of the high-speed connector 300 to improve the electromagnetic characteristic and the crosstalk interference of the high-speed connector 300. An outer surface of the blocking element 66 extends outward to form a third strengthening structure 663. The third strengthening structure 663 is used for reinforcing a structural strength of the blocking element 66. In the third preferred embodiment, two sides of the third strengthening structure 663 are shown as two cross structures from a front view to reinforce the structural strength of the blocking element 66. A distance between the front of the second sheet structure 64 and a front end of the insulating housing 1 is smaller than a distance between the front of the first sheet structure 56 and the front end of the insulating housing 1 along the front-to-rear direction.

Referring to FIG. 1 to FIG. 35, in summary, each of the first terminal assembly 3, the second terminal assembly 4, the third terminal assembly 5 and the fourth terminal assembly 6 includes a base body 101, the plurality of the terminals 102 and a metal plate 103, the plurality of the terminals 102 include a plurality of grounding terminals 104 and a plurality of differential signal terminals 105. A surface of the base body 101 is recessed inward to form a fastening groove 106, the plurality of the terminals 102 are fastened to the base body 101, the metal plate 103 is fastened in the fastening groove 106, each terminal 102 has a fastening portion 107, a contacting portion 108 connected to a front end of the fastening portion 107, and a soldering portion 109 connected to a rear end of the fastening portion 107, the base body 101 surrounds the fastening portion 107 of each terminal 102, the contacting portion 108 of each terminal 102 projects beyond a front surface of the base body 101, the soldering portion 109 of each terminal 102 is exposed to a rear of the base body 101, the fastening portions 107 of the plurality of the grounding terminals 104 and the differential signal terminals 105 of two sides of each of the first terminal assembly 3, the second terminal assembly 4, the third terminal assembly 5 and the fourth terminal assembly 6 are exposed outside to the fastening groove 106, the metal plate 103 electrically contacts with the fastening portions 107 of the plurality of the grounding terminals 104 of the two sides of each of the first terminal assembly 3, the second terminal assembly 4, the third terminal assembly 5 and the fourth terminal assembly 6 to form the grounding structure 90.

Each of the third terminal assembly 5 and the fourth terminal assembly 6 includes a sheet structure 201, the sheet structure 201 is made of a plastic material, the base body 101 of each of the third terminal assembly 5 and the fourth terminal assembly 6 has a locating groove 202 opposite to the fastening groove 106 of each of the third terminal assembly 5 and the fourth terminal assembly 6, the fastening portions 107 of the plurality of the grounding terminals 104 and the differential signal terminals 105 of each of the third terminal assembly 5 and the fourth terminal assembly 6 are exposed to the locating groove 202 of each of the third terminal assembly 5 and the fourth terminal assembly 6, the sheet structure 201 is located in the locating groove 202, the fastening portions 107 of the plurality of the grounding terminals 104 and the differential signal terminals 105 of each of the third terminal assembly 5 and the fourth terminal assembly 6 are clamped between the metal plate 103 and the sheet structure 201 of each of the third terminal assembly 5 and the fourth terminal assembly 6 along the up-down direction, the fastening portions 107 of the differential signal terminals 105 of each of the third terminal assembly 5 and the fourth terminal assembly 6 are spaced from an inner surface of the sheet structure 201 of each of the third terminal assembly 5 and the fourth terminal assembly 6 to form a clearance 203 between the fastening portions 107 of the differential signal terminals 105 and the inner surface of the sheet structure 201 of each of the third terminal assembly 5 and the fourth terminal assembly 6, the fastening portions 107 of the grounding terminals 104 of each of the third terminal assembly 5 and the fourth terminal assembly 6 contact with the inner surface of the sheet structure 201 of each of the third terminal assembly 5 and the fourth terminal assembly 6.

The base bodies 101 of the first terminal assembly 3, the second terminal assembly 4, the third terminal assembly 5 and the fourth terminal assembly 6 include the first base body 32, the second base body 42, the third base body 52 and the fourth base body 62. The plurality of the terminals 102 include the plurality of the first terminals 31 of the first terminal assembly 3, the plurality of the second terminals 41 of the second terminal assembly 4, the plurality of the third terminals 51 of the third terminal assembly 5 and the plurality of the fourth terminals 61 of the fourth terminal assembly 6. The metal plates 103 of the first terminal assembly 3, the second terminal assembly 4, the third terminal assembly 5 and the fourth terminal assembly 6 include the first metal plate 33, the second metal plate 43, the third metal plate 53 and the fourth metal plate 63. The plurality of the grounding terminals 104 include the plurality of the first grounding terminals 317, the second grounding terminals 415, the third grounding terminals 516 and the fourth grounding terminals 615. The plurality of the differential signal terminals 105 include the plurality of the first differential signal terminals 318, the second differential signal terminals 416, the third differential signal terminals 517 and the fourth differential signal terminals 616. The fastening grooves 106 of the first terminal assembly 3, the second terminal assembly 4, the third terminal assembly 5 and the fourth terminal assembly 6 include the first fastening groove 323, the second fastening groove 423, the third fastening groove 523 and the fourth fastening groove 623. The fastening portions 107 of the plurality of the terminals 102 include the first fastening portions 311 of the plurality of the first terminals 31, the second fastening portions 411 of the plurality of the second terminals 41, the third fastening portions 511 of the plurality of the third terminals 51 and the fourth fastening portions 611 of the plurality of the fourth terminals 61. The contacting portions 108 of the plurality of the terminals 102 include the first contacting portions 313 of the plurality of the first terminals 31, the second contacting portions 413 of the plurality of the second terminals 41, the third contacting portions 512 of the plurality of the third terminals 51 and the fourth contacting portions 612 of the plurality of the fourth terminals 61. The soldering portions 109 of the plurality of the terminals 102 include the first soldering portions 316 of the plurality of the first terminals 31, the second soldering portions 414 of the plurality of the second terminals 41, the third soldering portions 515 of the plurality of the third terminals 51 and the fourth soldering portions 614 of the plurality of the fourth terminals 61. The sheet structures 201 of the third terminal assembly 5 and the fourth terminal assembly 6 include the first sheet structure 56 and the second sheet structure 64. The locating grooves 202 of the third terminal assembly 5 and the fourth terminal assembly 6 include a first locating groove 204 and a second locating groove 205. The clearances 203 of the third terminal assembly 5 and the fourth terminal assembly 6 include the first clearance 563 and the second clearance 643.

In the second preferred embodiment, the metal structure 65 is disposed in a front of a rear end of the base body 101 of the fourth terminal assembly 6. Front surfaces of rear ends of the grounding terminals 104 of the plurality of the terminals 102 of the two sides of the fourth terminal assembly 6 are exposed to the front of the rear end of the base body 101 of the fourth terminal assembly 6. The contacting plates 653 of the metal structure 65 contact with the front surfaces of the rear ends of the grounding terminals 104 of the plurality of the terminals 102 of the two sides of the fourth terminal assembly 6 to form the grounding structure 90.

In the third preferred embodiment, the blocking element 66 is disposed in the front of the rear end of the base body 101 of the fourth terminal assembly 6. The front surfaces of the rear ends of the grounding terminals 104 of the plurality of the terminals 102 of the two sides of the fourth terminal assembly 6 are exposed to the front of the rear end of the base body 101 of the fourth terminal assembly 6. The front surfaces of the rear ends of each two differential signal terminals 105 of the two sides of the fourth terminal assembly 6 are spaced from the inner surface of the blocking element 66 to form the interstice 662.

As described above, the first metal plate 33 of the first terminal assembly 3 contacts with the first grounding terminals 317 of the first terminal assembly 3 to form the grounding structure 90, the second metal plate 43 of the second terminal assembly 4 contacts with the second grounding terminals 415 of the second terminal assembly 4 to form the grounding structure 90, the third metal plate 53 of the third terminal assembly 5 contacts with the third grounding terminals 516 of the third terminal assembly 5 to form the grounding structure 90, and the fourth metal plate 63 of the fourth terminal assembly 6 contacts with the fourth grounding terminals 615 of the fourth terminal assembly 6 to form the grounding structure 90, so the signal noise is able to be effectively absorbed and the signal noise is able to be effectively restrained. Furthermore, the high-speed connector 100 is capable of adjusting a dielectric coefficient of a peripheral structure of the terminal 102 of the high-speed connector 100, the first internal space 3414 and the plurality of the first gaps 3415 of the first dielectric structure 34, the second internal space 5414 and the plurality of the second gaps 5415 of the second dielectric structure 54, the third internal space 562 and the plurality of the first clearances 563 of the first sheet structure 56, and the fourth internal space 642 and the plurality of the second clearances 643 of the second sheet structure 64 are used for adjusting the dielectric coefficient of the peripheral structure of each first terminal 31 of the first terminal assembly 3 to improve the electromagnetic characteristic and the crosstalk interference of the high-speed connector 100. As a result, the transmission quality of the high-frequency signal of the high-speed connector 100 is improved.

What is claimed is:

1. A high-speed connector, comprising:

an insulating housing;

a first terminal assembly received in the insulating housing;

a second terminal assembly received in the insulating housing, the second terminal assembly being opposite to the first terminal assembly along an up-down direction;

a third terminal assembly received in the insulating housing, the third terminal assembly being disposed between the first terminal assembly and the second terminal assembly; and a fourth terminal assembly received in the insulating housing, the fourth terminal assembly being corresponding to the third terminal assembly along the up-down direction, the fourth terminal assembly being disposed between the second terminal assembly and the third terminal assembly, the third terminal assembly and the fourth terminal assembly being positioned between the first terminal assembly and the second terminal assembly;

wherein each of the first terminal assembly, the second terminal assembly, the third terminal assembly and the fourth terminal assembly includes a base body, a plurality of terminals and a metal plate, the plurality of the terminals include a plurality of grounding terminals and a plurality of differential signal terminals, a surface of the base body is recessed inward to form a fastening groove, the plurality of the terminals are fastened to the base body, the metal plate is fastened in the fastening groove, each terminal has a fastening portion, a contacting portion connected to a front end of the fastening portion, and a soldering portion connected to a rear end of the fastening portion, the base body surrounds the fastening portion of each terminal, the contacting portion of each terminal projects beyond a front surface of the base body, the soldering portion of each terminal is exposed to a rear of the base body, the fastening portions of the plurality of the grounding terminals and the differential signal terminals of two sides of each of the first terminal assembly, the second terminal assembly, the third terminal assembly and the fourth terminal assembly are exposed outside to the fastening groove, the metal plate electrically contacts with the fastening portions of the plurality of the grounding terminals of the two sides of each of the first terminal assembly, the second terminal assembly, the third terminal assembly and the fourth terminal assembly to form a grounding structure; and wherein each of the third terminal assembly and the fourth terminal assembly includes a sheet structure, the sheet structure is made of a plastic material, the base body of each of the third terminal assembly and the fourth terminal assembly has a locating groove opposite to the fastening groove of each of the third terminal assembly and the fourth terminal assembly, the fastening portions of the plurality of the grounding terminals and the differential signal terminals of each of the third terminal assembly and the fourth terminal assembly are exposed to the locating groove of each of the third terminal assembly and the fourth terminal assembly, the sheet structure is located in the locating groove, the fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction, the fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly, the fastening portions of the grounding terminals of each of the third terminal assembly and the fourth terminal assembly contact with the inner surface of the sheet structure of each of the third terminal assembly and the fourth terminal assembly.

2. The high-speed connector as claimed in claim 1, wherein the base bodies of the first terminal assembly, the second terminal assembly, the third terminal assembly and the fourth terminal assembly include a first base body, a second base body, a third base body and a fourth base body, the plurality of the terminals include a plurality of first terminals of the first terminal assembly, a plurality of second terminals of the second terminal assembly, a plurality of third terminals of the third terminal assembly and a plurality of fourth terminals of the fourth terminal assembly, the metal plates of the first terminal assembly, the second terminal assembly, the third terminal assembly and the fourth terminal assembly include a first metal plate, a second metal plate, a third metal plate and a fourth metal plate, the plurality of the grounding terminals include a plurality of first grounding terminals, second grounding terminals, third grounding terminals and fourth grounding terminals, the plurality of the differential signal terminals include a plurality of first differential signal terminals, second differential signal terminals, third differential signal terminals and fourth differential signal terminals, the fastening grooves of the first terminal assembly, the second terminal assembly, the third terminal assembly and the fourth terminal assembly include a first fastening groove, a second fastening groove, a third fastening groove and a fourth fastening groove, the fastening portions of the plurality of the terminals include first fastening portions of the plurality of the first terminals, second fastening portions of the plurality of the second terminals, third fastening portions of the plurality of the third terminals and fourth fastening portions of the plurality of the fourth terminals, the contacting portions of the plurality of the terminals include first contacting portions of the plurality of the first terminals, second contacting portions of the plurality of the second terminals, third contacting portions of the plurality of the third terminals and fourth contacting portions of the plurality of the fourth terminals, the soldering portions of the plurality of the terminals include first soldering portions of the plurality of the first terminals, second soldering portions of the plurality of the second terminals, third soldering portions of the plurality of the third terminals and fourth soldering portions of the plurality of the fourth terminals, the sheet structures of the third terminal assembly and the fourth terminal assembly include a first sheet structure and a second sheet structure, the locating grooves of the third terminal assembly and the fourth terminal assembly include a first locating groove and a second locating groove, the clearances of the third terminal assembly and the fourth terminal assembly include a first clearance and a second clearance.

3. The high-speed connector as claimed in claim 2, wherein the insulating housing has a main portion, a middle of a top of the main portion forms a plurality of first penetrating grooves arranged transversely, each first penetrating groove penetrates through the top of the main portion and extends longitudinally, a front end of a bottom of the main portion forms a plurality of second penetrating grooves arranged transversely, each second penetrating groove penetrates through the bottom of the main portion and extends longitudinally, the first fastening portions of the plurality of the first terminals which are located at two sides of the first terminal assembly are corresponding to the plurality of the first penetrating grooves, the second contacting portions of the plurality of the second terminals of two sides of the second terminal assembly are corresponding to the plurality of the second penetrating grooves.

4. The high-speed connector as claimed in claim 3, wherein the first terminal assembly includes the plurality of the first terminals, the first base body, the first metal plate, a first dielectric structure and a first holding element, the plurality of the first terminals are fastened to the first base body, middles of the plurality of the first terminals are surrounded by the first base body, the first metal plate is disposed in the first base body, and the first metal plate is disposed under the plurality of the first terminals, rear ends of the plurality of the first terminals are surrounded by the first dielectric structure, lower portions of the plurality of the first terminals are surrounded by the first holding element.

5. The high-speed connector as claimed in claim 4, wherein each first terminal has the first fastening portion, a front end of the first fastening portion slantwise extends frontward and downward to form a first stepping portion, a front end of the first stepping portion extends frontward and then is arched downward to form the first contacting portion, a rear end of the first fastening portion slantwise extends rearward and downward to form a first extending portion, a rear end of the first extending portion is bent downward to form a first bending portion, a bottom end of the first bending portion is bent rearward to form the first soldering portion, the first fastening portions, the first stepping portions and rear ends of the first contacting portions of the first terminals of a middle of the first terminal assembly are surrounded by a middle of the first base body, the first stepping portion and the rear end of the first contacting portion of each first terminal are exposed out of a front end of the first base body, a front end of the first contacting portion of each first terminal projects beyond a front surface of the first base body, the rear end of the first fastening portion, the first extending portion, the first bending portion and the first soldering portion of each first terminal project beyond a rear surface of the first base body, the first dielectric structure is fastened to the first extending portions of the plurality of the first terminals, tail ends of the first bending portions of the plurality of the first terminals are surrounded by the first holding element, the first dielectric structure has two first covers and a first fastening structure, two sides of an inner surface of each first cover has a plurality of first attaching surfaces protruded beyond the inner surface of each first cover, the first attaching surfaces of one first cover face the first attaching surfaces of the other first cover, the first attaching surfaces of the two first covers are spaced to form a first internal space, the first extending portions of the first differential signal terminals of the two sides of the first terminal assembly pass through the first internal space, upper surfaces and lower surfaces of the first extending portions of the first differential signal terminals of the two sides of the first terminal assembly are spaced from the two inner surfaces of the two first covers to form two first gaps.

6. The high-speed connector as claimed in claim 5, wherein the plurality of the first terminals include the plurality of the first grounding terminals and the plurality of the first differential signal terminals, each two adjacent first differential signal terminals are located between two first grounding terminals, the first base body has a first surrounding portion, the first surrounding portion is disposed to the middle of the first base body, and the first surrounding portion is connected between the front end of the first base body and a rear end of the first base body, the first fastening portion of one first grounding terminal and the first fastening portions of four first differential signal terminals are surrounded by the first surrounding portion, two sides of a rear end of a top surface of the first surrounding portion protrude upward to form two first protruding blocks, two portions of a middle of an inner surface of the top of the main portion are recessed inward to form two abreast sliding grooves, the top of the main portion has two first apertures arranged transversely, the two first apertures vertically penetrate through the top of the main portion, each first protruding block passes through one sliding groove, each first protruding block is fastened in one first aperture, two opposite sides of the first base body extend outward to form two first protruding portions, two upper portions of two opposite inner side surfaces of a rear end of the main portion are recessed oppositely to form two first locating slots, the two first protruding portions are buckled in two front ends of the two first locating slots, a middle of a bottom surface of the rear end of the first base body is recessed inward to form the first fastening groove, the front end of the first base body has two first openings, and the rear end of the first base body has the other two first openings, the two first openings of the front end of the first base body penetrate through two sides of a top surface and two sides of a bottom surface of the front end of the first base body, two tops of two sides of the first fastening groove extend upward to form the other two first openings penetrating through two sides of a top surface of the rear end of the first base body, the first fastening portions of the plurality of the first grounding terminals and the first differential signal terminals of the two sides of the first terminal assembly are exposed to the two first openings of the rear end of the first base body, the rear ends of the first contacting portions and the first stepping portions of the plurality of the first grounding terminals and the first differential signal terminals of the two sides of the first terminal assembly are exposed to the two first openings of the front end of the first base body, the first fastening portions of the plurality of the first grounding terminals and the first differential signal terminals of the two sides of the first terminal assembly are exposed to the first fastening groove from the two first openings of the rear end of the first base body, an upper surface of the first base body has a plurality of first connecting portions longitudinally arranged in three rows, each first connecting portion is disposed between two adjacent first terminals, two opposite sides of the front end of each first fastening portion, two opposite sides of the rear end of each first fastening portion and two opposite sides of the rear end of each first contacting portion are recessed inward to form a plurality of first lacking grooves, the plurality of the first connecting portions are embedded into the plurality of the first lacking grooves.

7. The high-speed connector as claimed in claim 6, wherein the first metal plate is disposed in the first fastening groove, the first metal plate is located under the plurality of the first terminals, the first metal plate has a first main sheet and a limiting hole, the first main sheet is a rectangular frame shape, the first main sheet is fastened to a bottom surface of the first surrounding portion, the limiting hole is formed at a middle of the first main sheet, a middle of the bottom surface of the first surrounding portion extends downward to form a supporting block, several portions of a rear surface and a front surface of the supporting block are arched oppositely to form a plurality of first contact surfaces, the plurality of the first contact surfaces abut against a front inner wall and a rear inner wall of the limiting hole of the first main sheet, two opposite sides of the first main sheet meander oppositely to form two first flank sheets, each first flank sheet is shown as a wave shape, each first flank sheet includes a plurality of first inclining sheets, a plurality of first contact sheets and a plurality of first covering sheets, the two opposite sides of the first main sheet slantwise extend outward and upward to form two of the plurality of the first inclining sheets, the two of the plurality of the first inclining sheets are covered to two outer surfaces of the first surrounding portion, two outer edges of the two of the plurality of the first inclining sheets horizontally extend to form two first contact sheets, each first contact sheet is parallel to the first main sheet, two outer edges of the two first contact sheets slantwise extend outward and downward to form another two of the plurality of the first inclining sheets, two outer edges of the another two of the plurality of the first inclining sheets horizontally extend outward to form two first covering sheets, each first covering sheet and the first main sheet are disposed at the same level, two outer edges of the two first covering sheets slantwise extend upward and outward to form two extra first inclining sheets, two outer edges of the two extra first inclining sheets horizontally extend oppositely to form another two first contact sheets, two outer edges of the another two first contact sheets slantwise extend outward and downward to form two additional first inclining sheets, two outer edges of the two additional first inclining sheets horizontally extend outward to form another two first covering sheets, two outer edges of the another two first covering sheets slantwise extend outward and upward to form two other first inclining sheets, two outer edges of the two other first inclining sheets horizontally extend outward to form two outermost first contact sheets, each two first inclining sheets of the first metal plate are opposite to each other.

8. The high-speed connector as claimed in claim 7, wherein the first contact sheets of the first metal plate contact with the first fastening portions of the plurality of the first grounding terminals of the two sides of the first terminal assembly to form the grounding structure, the first covering sheets of the first metal plate keep distances from the first fastening portions of the first differential signal terminals of the first terminal assembly.

9. The high-speed connector as claimed in claim 7, wherein the first base body has a plurality of first restricting holes penetrating through a top surface and a bottom surface of the two opposite sides of the first base body, several portions of two opposite outer sides of the two outermost first contact sheets of the first metal plate slantwise extend downward and outward, and then are bent outward to form a plurality of first restricting portions, a quantity of the plurality of the first restricting portions is the same as a quantity of the plurality of the first restricting holes, the plurality of the first restricting portions are restricted in the plurality of the first restricting holes, so the first metal plate is fastened in the first base body.

10. The high-speed connector as claimed in claim 7, wherein two sides of an inner surface of the top of the main portion of insulating housing extend downward to form two convex surfaces, the inner surface of the top of the main portion has a concave surface, a quantity of the first openings of the rear end of the first base body of the first terminal assembly is the same as a quantity of the convex surfaces of insulating housing, the two first openings of the rear end of the first base body of the first terminal assembly are corresponding to the two convex surfaces of the insulating housing, the first surrounding portion of the first terminal assembly is corresponding to the concave surface of the insulating housing.

11. The high-speed connector as claimed in claim 10, wherein each first aperture is disposed in front of one sliding groove, each sliding groove extends longitudinally, each first aperture is longitudinally aligned with the one sliding groove, a front end of each sliding groove is connected with one first aperture, a top surface of a top wall of each sliding groove has an inclining zone, a buffering zone and a stopping zone sequentially arranged along a rear-to-front direction, a rear end of the top surface of the top wall of each sliding groove slantwise extends frontward and downward to form the inclining zone, a front end of the inclining zone horizontally extends frontward to form the buffering zone, a front end of the buffering zone protrudes downward, and then horizontally extends frontward and towards the one first aperture to form the stopping zone, a top surface of the inclining zone is an inclined plane, a top surface of the buffering zone is a flat plane, a top surface of the stopping zone is another flat plane, the top surface of the stopping zone and the top surface of the buffering zone form a segment difference, so that a horizontal height of the top surface of the stopping zone is lower than a horizontal height of the top surface of the buffering zone, the concave surface is disposed among the two sliding grooves and the two convex surfaces.

12. The high-speed connector as claimed in claim 10, wherein the second terminal assembly is corresponding to the first terminal assembly along the up-down direction, the second terminal assembly includes the plurality of the second terminals, the second base body and the second metal plate, the plurality of the second terminals are fastened to the second base body, the plurality of the second terminals are partially surrounded by the second base body, the second metal plate is disposed to the second base body.

13. The high-speed connector as claimed in claim 12, wherein each second terminal has the second fastening portion, a front end of the second fastening portion slantwise extends upward and frontward to form a second stepping portion, a front end of the second stepping portion extends frontward and then is arched upward to form the second contacting portion, a rear end of the second fastening portion is bent downward and then extends rearward to form the second soldering portion, two sides of the front end of the second fastening portion, two sides of the rear end of the second fastening portion and two sides of a rear end of the second contacting portion are recessed inward to form a plurality of second lacking grooves, several portions of a front of an inside of the main portion are recessed inward to form a plurality of first terminal slots arranged in an upper row and a lower row, a middle of a front end of the main portion defines an insertion groove, the insertion groove longitudinally penetrates through the front end of the main portion, the insertion groove is communicated between the upper row of the first terminal slots and the lower row of the first terminal slots, the second stepping portions and the rear ends of the second contacting portions of the second terminals of the two sides of the second terminal assembly are exposed to two sides of a front end of the second base body, the second contacting portions of the plurality of the second terminals project beyond a front surface of the second base body, the second contacting portions of the plurality of the second terminals are disposed in the lower row of the first terminal slots, top surfaces of the second contacting portions of the plurality of the second terminals project into the insertion groove, a lower surface of the second base body has a plurality of the second connecting portions, each second connecting portion is disposed between two adjacent second terminals, the plurality of the second connecting portions are longitudinally arranged in three rows, the plurality of the second connecting portions are embedded in the plurality of the second lacking grooves.

14. The high-speed connector as claimed in claim 13, wherein the plurality of the second terminals include the plurality of the second grounding terminals and the plurality of the second differential signal terminals, each two adjacent second differential signal terminals are located between two second grounding terminals, the second fastening portions, the second stepping portions and the rear ends of the second contacting portions of the plurality of the second terminals of a middle of the second terminal assembly are surrounded by a middle of the second base body, the second base body has a second surrounding portion, the second surrounding portion is disposed to the middle of the second base body, the second surrounding portion is connected between the front end of the second base body and a rear end of the second base body, the second fastening portion of one second grounding terminal and the second fastening portions of four second differential signal terminals are surrounded by the second surrounding portion, two sides of a rear end of a bottom surface of the second surrounding portion extend downward to form two second protruding blocks, the bottom of the main portion has two second apertures arranged transversely, the two second apertures vertically penetrate through the bottom of the main portion, the two second protruding blocks are fastened in the two second apertures, two opposite sides of the second base body extend outward to form two second protruding portions, two lower portions of the two opposite inner side surfaces of the rear end of the main portion are recessed oppositely to form two second locating slots, the two second protruding portions are buckled in the two second locating slots, a middle of a top surface of the rear end of the second base body is recessed downward to form the second fastening groove, the second base body has four second openings formed to two sides of the second surrounding portion, the front end of the second base body has two second openings arranged transversely, and the rear end of the second base body has the other two second openings arranged transversely, the two second openings of the front end of the second base body penetrate through two sides of a top surface and two sides of a bottom surface of the front end of the second base body, two bottoms of two sides of the second fastening groove extend downward to form the other two second openings penetrating through two sides of a bottom surface of the rear end of the second base body, the second fastening portions of the plurality of the second grounding terminals and the second differential signal terminals of the two sides of the second terminal assembly are exposed to the other two second openings of the rear end of the second base body, the second fastening portions of the plurality of the second grounding terminals and the second differential signal terminals of the two sides of the second terminal assembly are exposed to the second fastening groove from the other two second openings of the rear end of the second base body.

15. The high-speed connector as claimed in claim 14, wherein the second metal plate is disposed in the second fastening groove, the second metal plate is disposed to top surfaces of the plurality of the second terminals, the second metal plate has a rectangular second main sheet, the second main sheet is covered to an upper surface of the second surrounding portion, several portions of the upper surface of the second surrounding portion extend upward to form a plurality of second contact surfaces, the plurality of the second contact surfaces abut against a front edge and a rear edge of the second main sheet, two opposite sides of the second main sheet form two second flank sheets, each second flank sheet is wavy, each second flank sheet has a plurality of second inclining sheets, a plurality of second contact sheets and a plurality of second covering sheets, the two opposite sides of the second main sheet slantwise extend outward and upward to form two of the plurality of the second inclining sheets, the two of the plurality of the second inclining sheets are covered to two outer surfaces of the second surrounding portion, two outer edges of the two of the plurality of the second inclining sheets horizontally extend to form two second contact sheets, each second contact sheet is parallel to the second main sheet, two outer edges of the two second contact sheets slantwise extend outward and downward to form another two of the plurality of the second inclining sheets, the another two of the plurality of the second inclining sheets of the two outer edges of the two second contact sheets are opposite to each other, two outer edges of the another two of the plurality of the second inclining sheets horizontally extend outward to form two second covering sheets, each second covering sheet and the second main sheet are disposed at the same level, two outer edges of the two second covering sheets extend outward and downward to form two extra second inclining sheets, two outer edges of the two extra second inclining sheets horizontally extend oppositely to form another two second contact sheets, two outer edges of the another two second contact sheets slantwise extend outward and upward to form two additional second inclining sheets, two outer edges of the two additional second inclining sheets horizontally extend outward to form another two second covering sheets, two outer edges of the another two second covering sheets slantwise extend outward and downward to form two other second inclining sheets, two outer edges of the two other second inclining sheets horizontally extend outward to form two outermost second contact sheets, two middles of two opposite outer sides of the two outermost second contact sheets of the second metal plate slantwise extend upward and outward, and then are bent outward to form two second restricting portions, the second base body has two second restricting holes, the two second restricting holes penetrate through two sides of the top surface and two sides of the bottom surface of the second base body, the two second restricting portions are restricted in the two second restricting holes, each two second inclining sheets of the second metal plate are opposite to each other.

16. The high-speed connector as claimed in claim 15, wherein the third terminal assembly includes the plurality of the third terminals, the third base body, the third metal plate, a second dielectric structure, a second holding element and the first sheet structure, the plurality of the third terminals are disposed between the third metal plate and the first sheet structure, the third metal plate is disposed in the third base body, and the third metal plate is disposed under the plurality of the third terminals, the plurality of the third terminals are fastened to the third base body, the first sheet structure is disposed in the third base body, and the first sheet structure is disposed on the plurality of the third terminals, the first sheet structure is mounted under the rear end of the first base body, bottom ends of the plurality of the third terminals are surrounded by the second holding element, the plurality of the third terminals include the plurality of the third grounding terminals and the plurality of the third differential signal terminals, each two adjacent third differential signal terminals are disposed between two third grounding terminals, each third terminal has the third fastening portion, a front end of the third fastening portion extends frontward, and then is arched downward to form the third contacting portion, a rear end of the third fastening portion slantwise extends rearward and downward to form a second extending portion, a rear end of the second extending portion is bent downward to form a second bending portion, a lower surface of the first base body has a transverse row of second terminal slots, the third contacting portions of the plurality of the third terminals are disposed in the plurality of the second terminal slots, two opposite sides of the front end of each third fastening portion, two opposite sides of the rear end of each third fastening portion and two opposite sides of each second bending portion are recessed inward to form a plurality of third lacking grooves, an upper surface of the third base body and an upper surface of the second holding element have a plurality of third connecting portions longitudinally arranged in three rows, each third connecting portion is disposed between two third terminals, the plurality of the third connecting portions are embedded into the plurality of the third lacking grooves, the second dielectric structure includes two second covers, two sides of an inner surface of each second cover has a plurality of second attaching surfaces protruded beyond the inner surface of each second cover, the second attaching surfaces of one second cover face the second attaching surfaces of the other second cover, the second attaching surfaces of the two second covers are spaced to form a second internal space, the second extending portions of the plurality of the third differential signal terminals pass through the second internal space, upper surfaces and lower surfaces of the second extending portions of the third differential signal terminals of two sides of the third terminal assembly are spaced from the two inner surfaces of the two second covers to form two second gaps, an outer surface of the first sheet structure extends outward to form a first strengthening structure, two sides of the first strengthening structure are shown as two cross structures.

17. The high-speed connector as claimed in claim 16, wherein the fourth terminal assembly is mounted under the third terminal assembly, the fourth terminal assembly includes a plurality of fourth terminals, a fourth base body, a fourth metal plate and a second sheet structure, the plurality of the fourth terminals are disposed between the fourth metal plate and the second sheet structure, the plurality of the fourth terminals are fastened to the fourth base body, and the plurality of the fourth terminals are partially surrounded by the fourth base body, the fourth metal plate is disposed in the fourth base body, and the fourth metal plate is disposed under the plurality of the fourth terminals, the second sheet structure is disposed in the fourth base body, and the plurality of the fourth terminals are mounted under the second sheet structure, the second sheet structure is formed by a plastic injection molding technology, the plurality of the fourth terminals include a plurality of fourth grounding terminals and a plurality of fourth differential signal terminals, each two adjacent fourth differential signal terminals are located between two fourth grounding terminals, each fourth terminal has the fourth fastening portion, the rear end of the second base body is formed as a supporting portion, a front of a bottom surface of a front end of the fourth base body abuts against the supporting portion, an upper surface of the second base body has a row of third terminal slots, front ends of the plurality of the fourth terminals are disposed to the row of the third terminal slots, an outer surface of the second sheet structure extends outward to form a second strengthening structure, two sides of the second strengthening structure are shown as the two cross structures.

18. The high-speed connector as claimed in claim 17, wherein several portions of two sides of a bottom surface of the first sheet structure protrude downward to form a plurality of third attaching surfaces, the plurality of the third attaching surfaces contact with top surfaces of the third fastening portions of the third grounding terminals of the two sides of the third terminal assembly, the third metal plate is spaced from an inner surface of the first sheet structure to form a plurality of third internal spaces, the third fastening portions of each two third differential signal terminals of the two sides of the third terminal assembly pass through one third internal space, top surfaces of the third fastening portions of each two third differential signal terminals of the two sides of the third terminal assembly are spaced from the inner surface of the first sheet structure to form the first clearance, several portions of two sides of a top surface of the second sheet structure protrude upward to form a plurality of fourth attaching surfaces, the plurality of the fourth attaching surfaces contact with bottom surfaces of the fourth fastening portions of the fourth grounding terminals of two sides of the fourth terminal assembly, the fourth metal plate is spaced from an inner surface of the second sheet structure to form a plurality of fourth internal spaces, the fourth fastening portions of each two fourth differential signal terminals of the two sides of the fourth terminal assembly pass through one fourth internal space, bottom surfaces of the fourth fastening portions of each two fourth differential signal terminals of the two sides of the fourth terminal assembly are spaced from the inner surface of the second sheet structure to form a second clearance, a distance between a front of the second sheet structure and a front end of the insulating housing is smaller than a distance between a front of the first sheet structure and the front end of the insulating housing along a front-to-rear direction.

19. A high-speed connector, comprising:

an insulating housing;

a first terminal assembly received in the insulating housing;

a second terminal assembly received in the insulating housing, the second terminal assembly being opposite to the first terminal assembly along an up-down direction;

a third terminal assembly received in the insulating housing, the third terminal assembly being disposed between the first terminal assembly and the second terminal assembly; and a fourth terminal assembly received in the insulating housing, the fourth terminal assembly being corresponding to the third terminal assembly along the up-down direction, the fourth terminal assembly being disposed between the second terminal assembly and the third terminal assembly, the fourth terminal assembly including a metal structure;

wherein each of the first terminal assembly, the second terminal assembly, the third terminal assembly and the fourth terminal assembly includes a base body, a plurality of terminals and a metal plate, the metal structure is disposed in a front of a rear end of the base body of the fourth terminal assembly, the plurality of the terminals include a plurality of grounding terminals and a plurality of differential signal terminals, a surface of the base body is recessed inward to form a fastening groove, the plurality of the terminals are fastened to the base body, the metal plate is fastened in the fastening groove, each terminal has a fastening portion, a contacting portion connected to a front end of the fastening portion, and a soldering portion connected to a rear end of the fastening portion, the base body surrounds the fastening portion of each terminal, the contacting portion of each terminal projects beyond a front surface of the base body, the soldering portion of each terminal is exposed to a rear of the base body, the fastening portions of the plurality of the grounding terminals and the differential signal terminals of two sides of each of the first terminal assembly, the second terminal assembly, the third terminal assembly and the fourth terminal assembly are exposed outside to the fastening groove, the metal plate electrically contacts with the fastening portions of the plurality of the grounding terminals of the two sides of each of the first terminal assembly, the second terminal assembly, the third terminal assembly and the fourth terminal assembly to form a grounding structure, front surfaces of rear ends of the grounding terminals of the plurality of the terminals of the two sides of the fourth terminal assembly are exposed to the front of the rear end of the base body of the fourth terminal assembly, the metal structure contacts with front surfaces of rear ends of the grounding terminals of the plurality of the terminals of two sides of the fourth terminal assembly to form the grounding structure; and wherein each of the third terminal assembly and the fourth terminal assembly includes a sheet structure, the sheet structure is made of a plastic material, the base body of each of the third terminal assembly and the fourth terminal assembly has a locating groove opposite to the fastening groove of each of the third terminal assembly and the fourth terminal assembly, the fastening portions of the plurality of the grounding terminals and the differential signal terminals of each of the third terminal assembly and the fourth terminal assembly are exposed to the locating groove of each of the third terminal assembly and the fourth terminal assembly, the sheet structure is located in the locating groove, the fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction, the fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly, the fastening portions of the grounding terminals of each of the third terminal assembly and the fourth terminal assembly contact with the inner surface of the sheet structure of each of the third terminal assembly and the fourth terminal assembly.

20. A high-speed connector, comprising:

an insulating housing;

a first terminal assembly received in the insulating housing;

a second terminal assembly received in the insulating housing, the second terminal assembly being opposite to the first terminal assembly along an up-down direction;

a third terminal assembly received in the insulating housing, the third terminal assembly being disposed between the first terminal assembly and the second terminal assembly; and a fourth terminal assembly received in the insulating housing, the fourth terminal assembly being corresponding to the third terminal assembly along the up-down direction, the third terminal assembly and the fourth terminal assembly being positioned between the first terminal assembly and the second terminal assembly, the fourth terminal assembly including a blocking element;

wherein each of the first terminal assembly, the second terminal assembly, the third terminal assembly and the fourth terminal assembly includes a base body, a plurality of terminals and a metal plate, the plurality of the terminals include a plurality of grounding terminals and a plurality of differential signal terminals, the blocking element is disposed in a front of a rear end of the base body of the fourth terminal assembly, a surface of the base body is recessed inward to form a fastening groove, the plurality of the terminals are fastened to the base body, the metal plate is fastened in the fastening groove, each terminal has a fastening portion, a contacting portion connected to a front end of the fastening portion, and a soldering portion connected to a rear end of the fastening portion, the base body surrounds the fastening portion of each terminal, the contacting portion of each terminal projects beyond a front surface of the base body, the soldering portion of each terminal is exposed to a rear of the base body, the fastening portions of the plurality of the grounding terminals and the differential signal terminals of two sides of each of the first terminal assembly, the second terminal assembly, the third terminal assembly and the fourth terminal assembly are exposed outside to the fastening groove, the metal plate electrically contacts with the fastening portions of the plurality of the grounding terminals of the two sides of each of the first terminal assembly, the second terminal assembly, the third terminal assembly and the fourth terminal assembly to form a grounding structure, front surfaces of rear ends of the grounding terminals of the plurality of the terminals of two sides of the fourth terminal assembly are exposed to the front of the rear end of the base body of the fourth terminal assembly; and wherein each of the third terminal assembly and the fourth terminal assembly includes a sheet structure, the sheet structure is made of a plastic material, the base body of each of the third terminal assembly and the fourth terminal assembly has a locating groove opposite to the fastening groove of each of the third terminal assembly and the fourth terminal assembly, the fastening portions of the plurality of the grounding terminals and the differential signal terminals of each of the third terminal assembly and the fourth terminal assembly are exposed to the locating groove of each of the third terminal assembly and the fourth terminal assembly, the sheet structure is located in the locating groove, the fastening portions of the plurality of the grounding terminals and the differential signal terminals of each of the third terminal assembly and the fourth terminal assembly are clamped between the metal plate and the sheet structure of each of the third terminal assembly and the fourth terminal assembly along the up-down direction, the fastening portions of the differential signal terminals of each of the third terminal assembly and the fourth terminal assembly are spaced from an inner surface of the sheet structure of each of the third terminal assembly and the fourth terminal assembly to form a clearance between the fastening portions of the differential signal terminals and the inner surface of the sheet structure of each of the third terminal assembly and the fourth terminal assembly, the fastening portions of the grounding terminals of each of the third terminal assembly and the fourth terminal assembly contact with the inner surface of the sheet structure of each of the third terminal assembly and the fourth terminal assembly, the front surfaces of the rear ends of each two differential signal terminals of the two sides of the fourth terminal assembly are spaced from an inner surface of the blocking element to form an interstice.

* * * * *